United States Patent
Shigemura

(10) Patent No.: US 9,826,222 B2
(45) Date of Patent: Nov. 21, 2017

(54) STEREOSCOPIC IMAGE DISPLAY DEVICE, TERMINAL DEVICE, STEREOSCOPIC IMAGE DISPLAY METHOD, AND PROGRAM THEREOF

(71) Applicant: NLT TECHNOLOGIES, LTD., Kawasaki, Kanagawa (JP)

(72) Inventor: Koji Shigemura, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 202 days.

(21) Appl. No.: 14/496,665

(22) Filed: Sep. 25, 2014

(65) Prior Publication Data
US 2015/0085089 A1 Mar. 26, 2015

(30) Foreign Application Priority Data

Sep. 26, 2013 (JP) .................................. 2013-200197
Jun. 23, 2014 (JP) .................................. 2014-127895

(51) Int. Cl.
*H04N 13/04* (2006.01)
*G02B 27/22* (2006.01)

(52) U.S. Cl.
CPC ..... *H04N 13/0409* (2013.01); *G02B 27/2214* (2013.01); *H04N 13/0404* (2013.01);
(Continued)

(58) Field of Classification Search
CPC ........... G02B 27/2214; H04N 13/0404; H04N 13/0406; H04N 13/0409; H04N 13/0422;
(Continued)

(56) References Cited

U.S. PATENT DOCUMENTS

2004/0218245 A1* 11/2004 Kean ................... G02B 27/2214
359/232
2010/0225743 A1* 9/2010 Florencio ........... H04N 13/0014
348/46
(Continued)

FOREIGN PATENT DOCUMENTS

| CN | 1534328 A | 10/2004 |
| CN | 102292998 A | 12/2011 |

(Continued)

OTHER PUBLICATIONS

Communication dated Feb. 15, 2017, issued from the State Intellectual Property Office of People's Republic of China in corresponding Application No. 201410505058.1.
(Continued)

*Primary Examiner* — Mohammed Rahaman
*Assistant Examiner* — James Boylan
(74) *Attorney, Agent, or Firm* — Sughrue Mion, PLLC

(57) ABSTRACT

The stereoscopic image display device which displays images corresponding to each of a plurality of viewpoints includes: a stereoscopic image display panel which includes a display panel in which a plurality of pixels are arranged and a light-ray separating module provided on the display panel for separating parallax images from each of the pixels towards a plurality of N-viewpoints (N is a natural number of 2 or larger) according to the layout direction of each of the pixels; an observer position measuring unit which measures an observing position of the observer who is facing the display surface; a relative position calculating unit which calculates a relative position of the observer with respect to the stereoscopic image display panel based on the measurement result; and an image generation processing unit which generates viewpoint image by corresponding to the relative (Continued)

position and outputs the image towards the stereoscopic image display panel.

8 Claims, 45 Drawing Sheets

(52) U.S. Cl.
CPC ..... *H04N 13/0406* (2013.01); *H04N 13/0422* (2013.01); *H04N 13/0447* (2013.01); *H04N 13/0472* (2013.01); *H04N 13/0477* (2013.01); *H04N 13/0481* (2013.01); *H04N 13/0475* (2013.01)

(58) Field of Classification Search
CPC ........... H04N 13/0447; H04N 13/0472; H04N 13/0475; H04N 13/0477; H04N 13/0481
USPC .......................................................... 348/54
See application file for complete search history.

(56) References Cited

U.S. PATENT DOCUMENTS

| | | | | |
|---|---|---|---|---|
| 2011/0221750 | A1* | 9/2011 | Sato | ................... G02B 27/2214 345/419 |
| 2011/0227150 | A1* | 9/2011 | Horita | ............... H01L 29/41708 257/330 |
| 2014/0118509 | A1* | 5/2014 | Kroon | ................ H04N 13/0011 348/51 |
| 2014/0192172 | A1* | 7/2014 | Kang | ................. G02B 27/2214 348/55 |
| 2014/0232837 | A1* | 8/2014 | Kim | ................... H04N 13/0409 348/59 |
| 2015/0015681 | A1* | 1/2015 | Kim | ................... G02B 27/2214 348/51 |
| 2016/0150226 | A1* | 5/2016 | Song | ........................ G06T 3/40 348/54 |

FOREIGN PATENT DOCUMENTS

| | | |
|---|---|---|
| CN | 102857774 A | 1/2013 |
| CN | 103313077 A | 9/2013 |
| JP | 10-333091 A | 12/1998 |
| JP | 2005-91447 A | 4/2005 |
| JP | 2011-215499 A | 10/2011 |
| JP | 2012-60607 A | 3/2012 |
| JP | 2012-120194 A | 6/2012 |
| WO | 2012/176109 A1 | 12/2012 |
| WO | 2013/115444 A1 | 8/2013 |

OTHER PUBLICATIONS

Communication dated Sep. 19, 2017 from the State Intellectual Property Office of the P.R.C. in counterpart application No. 201410505058.1.

* cited by examiner

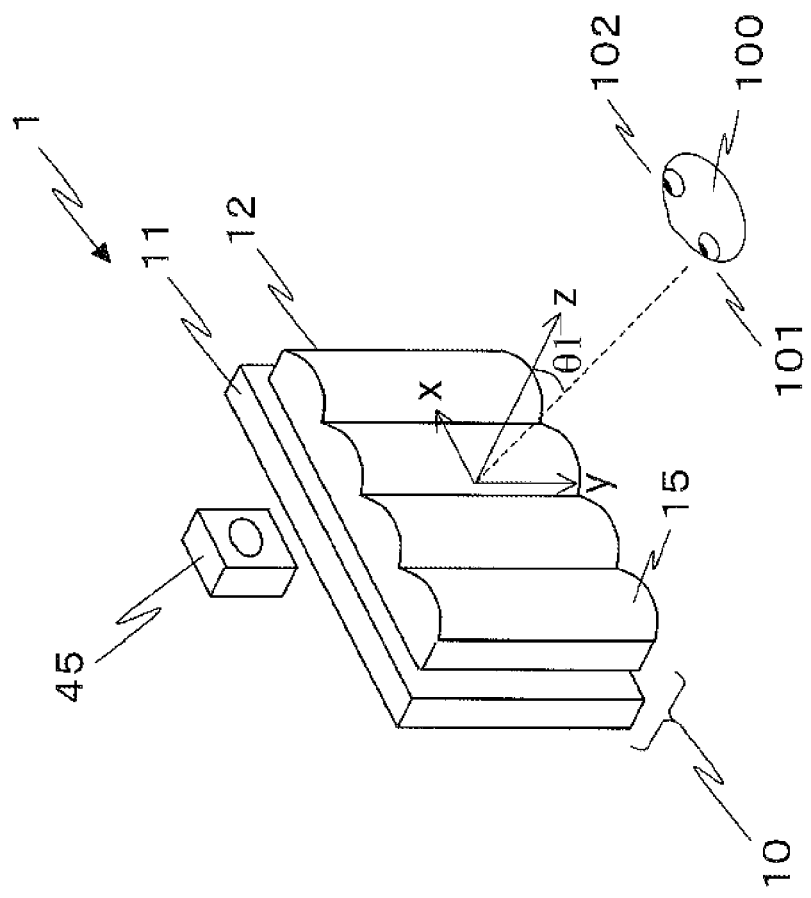

60a  60b

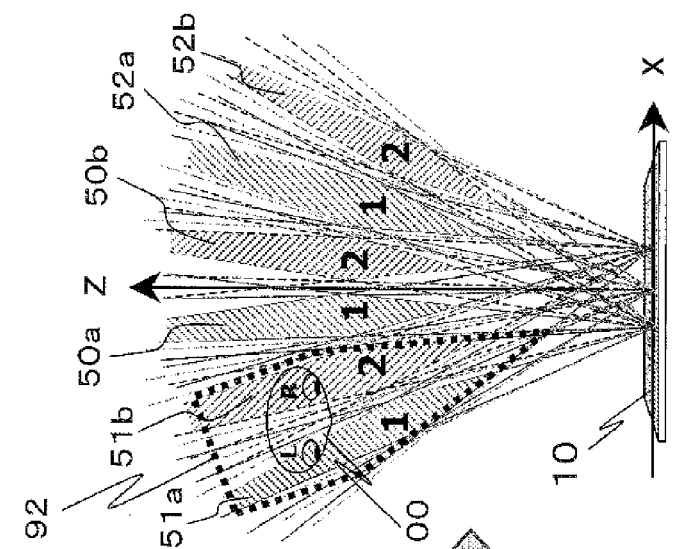
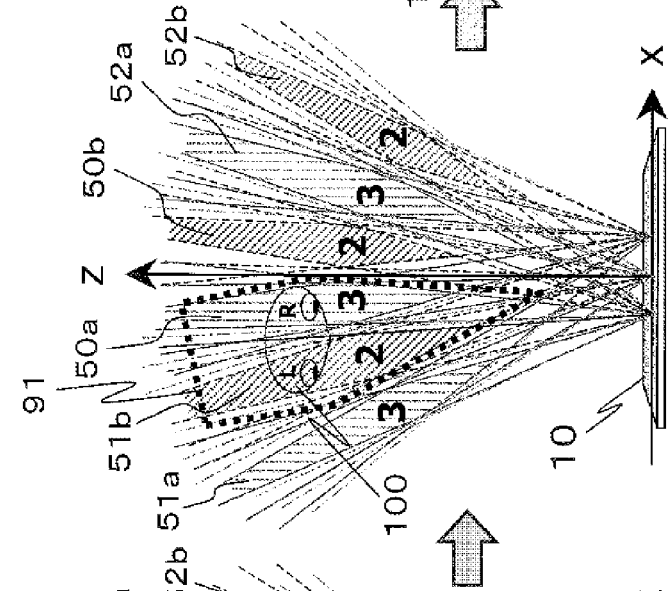
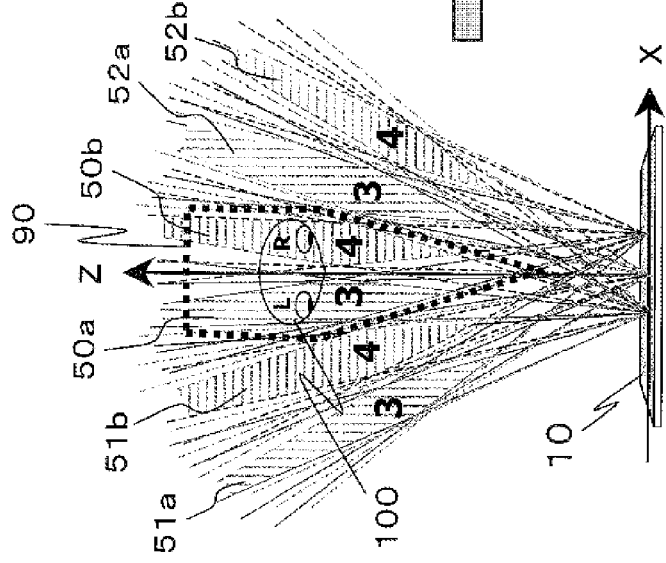

| STEREOPSIS REGION | | VIEWPOINT REGION WHERE LEFT EYE IS LOCATED | VIEWPOINT REGION WHERE RIGHT EYE IS LOCATED | IMAGE DATA OF FIRST-VIEWPOINT REGION | IMAGE DATA OF SECOND-VIEWPOINT REGION | REMARKS (FIG. 3) |
|---|---|---|---|---|---|---|
| A | FIG. 9C 92 | 51a | 51b | 60a | 60b | SIDE ROBE |
| B | FIG. 9B 91 | 51b | 50a | 60b | 60c | REVERSE VIEW REGION |
| C | FIG. 9A 90 | 50a | 50b | 60c | 60d | MAIN ROBE |
| D | NOT SHOWN | 50b | 52a | 60d | 60e | REVERSE VIEW REGION |
| E | NOT SHOWN | 52a | 52b | 60e | 60f | SIDE ROBE |

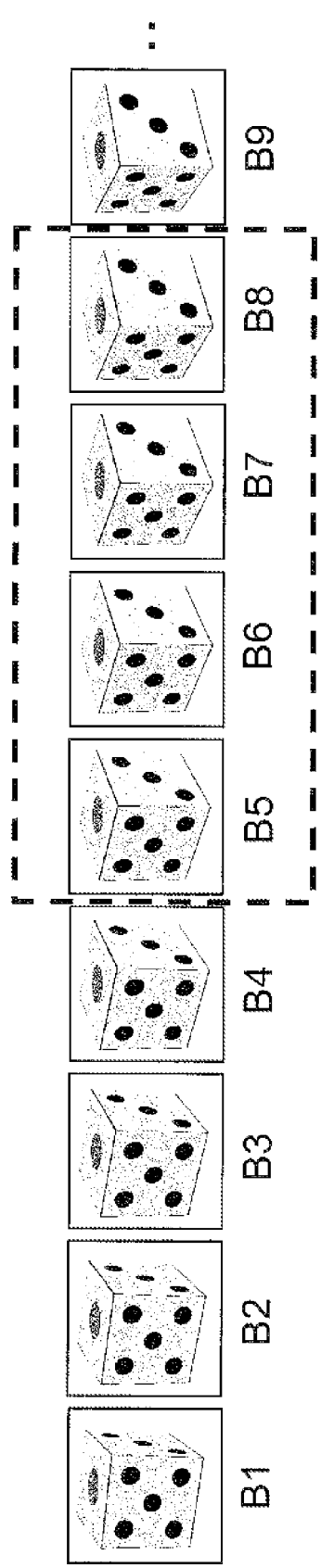

FIG. 15

| OBSERVER POSITION | | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 50a,51a,52a,ETC. | IMAGE DATA OF SECOND-VIEWPOINT REGIONS 50b,51b,52b,ETC. | IMAGE DATA OF THIRD-VIEWPOINT REGIONS 50c,51c,52c,ETC. | REMARKS |
|---|---|---|---|---|---|---|---|
| (A) | FIG. 13 - 110a | 50b | 50c | B5 or B8 | B6 | B7 | MAIN ROBE |
| (B) | NOT SHOWN | 50a | 50b | B5 | B6 | B4 | MAIN ROBE |
| (C) | NOT SHOWN | 51c | 50a | B5 | B3 | B4 | REVERSE VIEW REGION |
| (D) | NOT SHOWN | 51b | 51c | B2 | B3 | B4 | SIDE ROBE |
| (E) | FIG. 13 - 110d | 51a | 51b | B2 | B3 | B1 | SIDE ROBE |

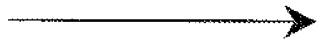

FIG. 16

| OBSERVER POSITION | | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 50a,51a,52a,ETC. | IMAGE DATA OF SECOND-VIEWPOINT REGIONS 50b,51b,52b,ETC. | IMAGE DATA OF THIRD-VIEWPOINT REGIONS 50c,51c,52c,ETC. | REMARKS |
|---|---|---|---|---|---|---|---|
| (A) | FIG. 13 -110a | 50b | 50c | B8 | B6 | B7 | MAIN ROBE |
| (B) | NOT SHOWN | 50a | 50b | B5 | B6 | B7 | MAIN ROBE |
| (C) | NOT SHOWN | 51c | 50a | B5 | B6 | B4 | REVERSE VIEW REGION |
| (D) | NOT SHOWN | 51b | 51c | B5 | B3 | B4 | SIDE ROBE |
| (E) | FIG. 13 -110d | 51a | 51b | B2 | B3 | B1 or B4 | SIDE ROBE |

FIG. 18

| OBSERVER POSITION | | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 50a,51a,52a,ETC. | IMAGE DATA OF SECOND-VIEWPOINT REGIONS 50b,51b,52b,ETC. | IMAGE DATA OF THIRD-VIEWPOINT REGIONS 50c,51c,52c,ETC. | IMAGE DATA OF FOURTH-VIEWPOINT REGIONS 50d,51d,52d,ETC. | REMARKS |
|---|---|---|---|---|---|---|---|---|
| (A) | FIG. 17 ~110a | 50b | 50c | B5 | B6 | B7 | B8 | MAIN ROBE |
| (B) | NOT SHOWN | 50a | 50b | B5 | B6 | B7($\leq$vth) or B3($>$vth) | B4 | MAIN ROBE |
| (C) | NOT SHOWN | 51d | 50a | B5 | B6($\leq$vth) or B2($>$vth) | B3 | B4 | REVERSE VIEW REGION |
| (D) | NOT SHOWN | 51c | 51d | B5($\leq$vth) or B1($>$vth) | B2 | B3 | B4 | SIDE ROBE |
| (E) | FIG. 17 ~110d | 51b | 51c | B1 | B2 | B3 | B4($\leq$vth) or B0($>$vth) | SIDE ROBE |

FIG. 19

| OBSERVER POSITION | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 50a,51a,52a,ETC. | IMAGE DATA OF SECOND-VIEWPOINT REGIONS 50b,51b,52b,ETC. | IMAGE DATA OF THIRD-VIEWPOINT REGIONS 50c,51c,52c,ETC. | IMAGE DATA OF FOURTH-VIEWPOINT REGIONS 50d,51d,52d,ETC. | REMARKS |
|---|---|---|---|---|---|---|---|
| (A) FIG. 17 - 110a | 50b | 50c | B5($\leq$vth) or B9(>vth) | B6 | B7 | B8 | MAIN ROBE |
| (B) NOT SHOWN | 50a | 50b | B5 | B6 | B7 | B4($\leq$vth) or B8(>vth) | MAIN ROBE |
| (C) NOT SHOWN | 51d | 50a | B5 | B6 | B3($\leq$vth) or B7(>vth) | B4 | REVERSE VIEW REGION |
| (D) NOT SHOWN | 51c | 51d | B5 | B2($\leq$vth) or B6(>vth) | B3 | B4 | SIDE ROBE |
| (E) FIG. 17 - 110d | 51b | 51c | B1 | B2 | B3 | B4 | SIDE ROBE |

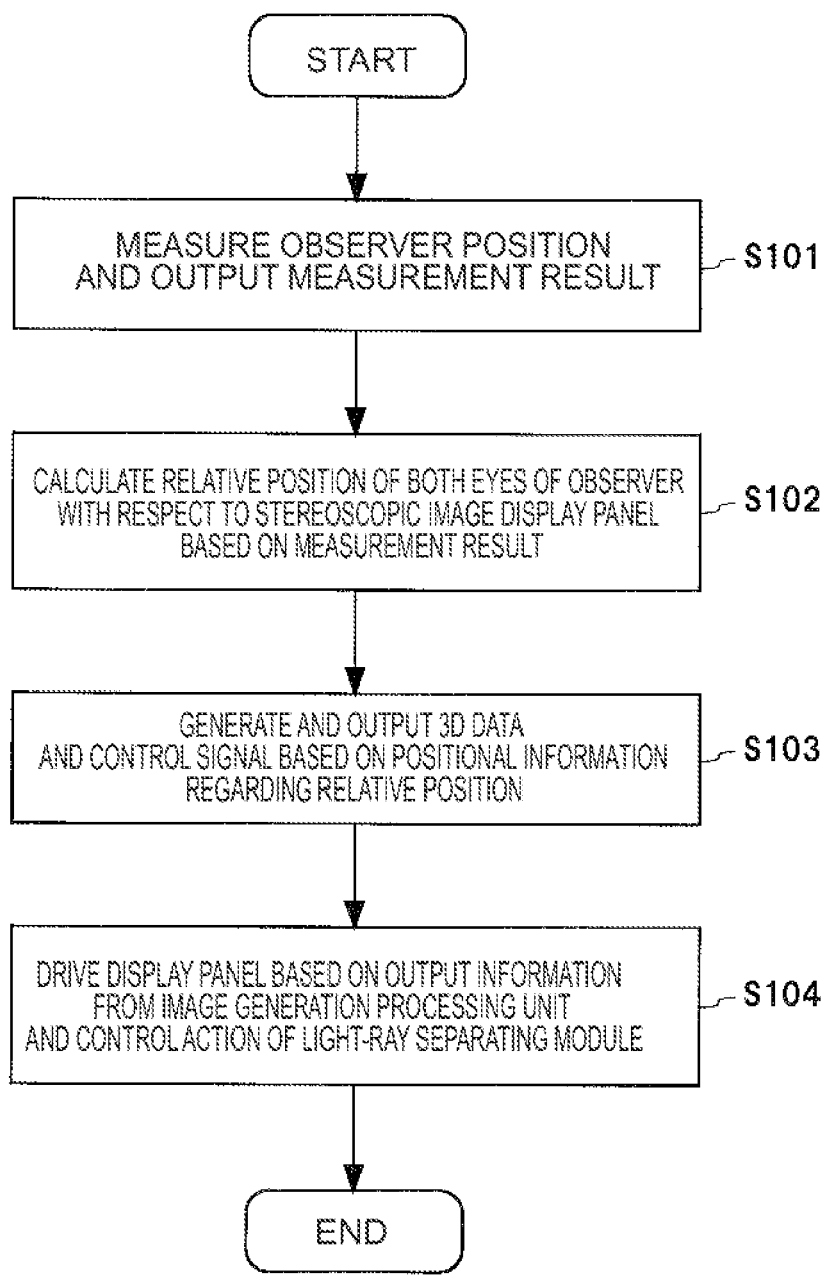

FIG. 24

| OBSERVER POSITION | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 70a,71a, ETC. | IMAGE DATA OF SECOND-VIEWPOINT REGIONS 70b,71b, ETC. | REMARKS |
|---|---|---|---|---|---|
| (A) FIG. 23 -110a | 70a(f) | 70b(f) | 60c(3) | 60d(4) | |
| (B) FIG. 23 -110b | 70a/71b(c) | 70b(f) | 60c(3) | 60d(4) | |
| (C) FIG. 23 -110c | 71b(f) | 70a/70b(c) | 60c(3) | 60b(2) | |
| (D) FIG. 23 -110d | 71b(f) | 70a(f) | 60c(3) | 60b(2) | |

FIG. 26

| OBSERVER POSITION | | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 70a,71a, ETC. | IMAGE DATA OF SECOND-VIEWPOINT REGIONS 70b,71b, ETC. | REMARKS |
|---|---|---|---|---|---|---|
| (A) | FIG. 25 -110a | 70a(f) | 70b(f) | 60c(3) | 60d(4) | |
| (B) | FIG. 25 -110b | 70a(f) | 70a/70b(c) | 60c(3) | 60d(4) | |
| (C) | FIG. 25 -110c | 70a/71b(c) | 70a(f) | 60c(3) | 60b(2) | |
| (D) | FIG. 25 -110d | 71b(f) | 70a(f) | 60c(3) | 60b(2) | |

FIG. 29

| | OBSERVER POSITION | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 50a,51a,52a,ETC. | IMAGE DATA OF SECOND-VIEWPOINT REGIONS 50b,51b,52b,ETC. | IMAGE DATA OF THIRD-VIEWPOINT REGIONS 50c,51c,52c,ETC. | IMAGE DATA OF FOURTH-VIEWPOINT REGIONS 50d,51d,52d,ETC. | REMARKS |
|---|---|---|---|---|---|---|---|---|
| (A) | FIG. 28 -112a | 50a | 50c or 50d | B5 | B6 | B7 | B8 | MAIN ROBE |
| (B) | NOT SHOWN | 51d | 50b or 50c | B5 | B6 | B7 | B4 | REVERSE VIEW REGION |
| (C) | NOT SHOWN | 51c | 50a or 50b | B5 | B6 | B3 | B4 | REVERSE VIEW REGION |
| (D) | FIG. 28 -112d | 51b | 51d or 50a | B5 | B2 | B3 | B4 | REVERSE VIEW REGION OR SIDE ROBE |

FIG. 36

| OBSERVER POSITION | VIEWPOINT REGION WHERE LEFT EYE IS LOCATED | VIEWPOINT REGION WHERE RIGHT EYE IS LOCATED | IMAGE DATA OF FIRST-VIEWPOINT REGIONS 70a,71a,ETC. | IMAGE DATA OF SECOND-VIEWPOINT REGIONS 70b,71b,ETC. | IMAGE DATA OF THIRD-VIEWPOINT REGIONS 70c,71c,ETC. | IMAGE DATA OF FOURTH-VIEWPOINT REGIONS 70d,71d,ETC. | REMARKS |
|---|---|---|---|---|---|---|---|
| (A) FIG. 35 -113a | 70b | 70c | B5 | B6 | B7 | B8 | MAIN ROBE |
| (B) FIG. 35 -113b | 70a | 70b | B5 | B6 | B7 | B8 | MAIN ROBE |
| (C) FIG. 35 -113c | 71d | 70a | B1 | B2 | B3 | B4 | REVERSE VIEW REGION |
| (D) FIG. 35 -113d | 71c | 71d | B1 | B2 | B3 | B4 | SIDE ROBE |

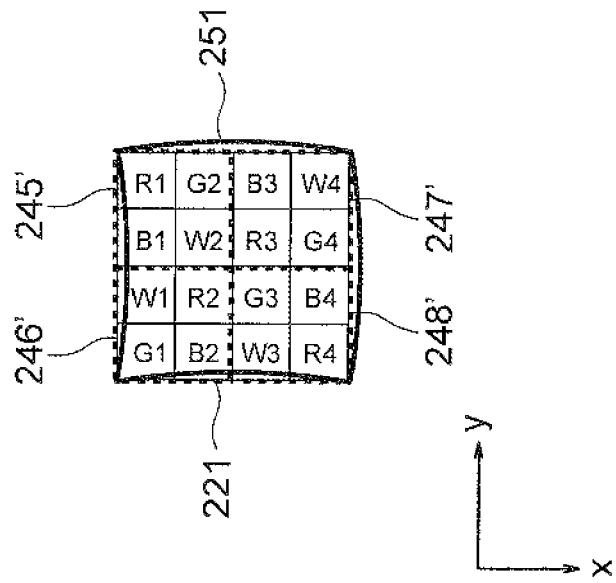
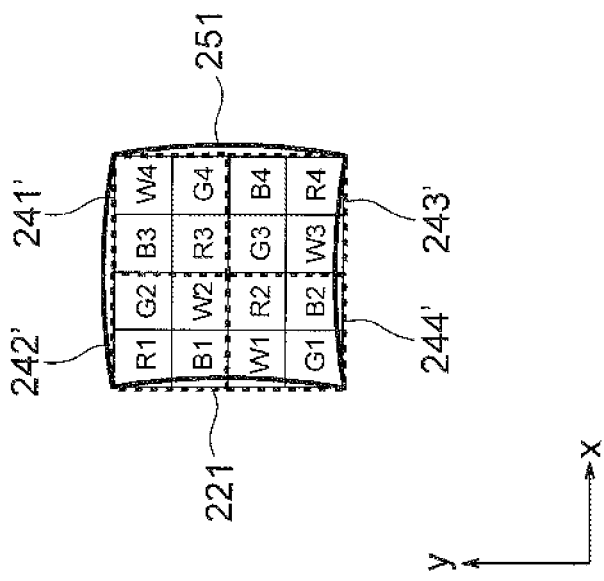

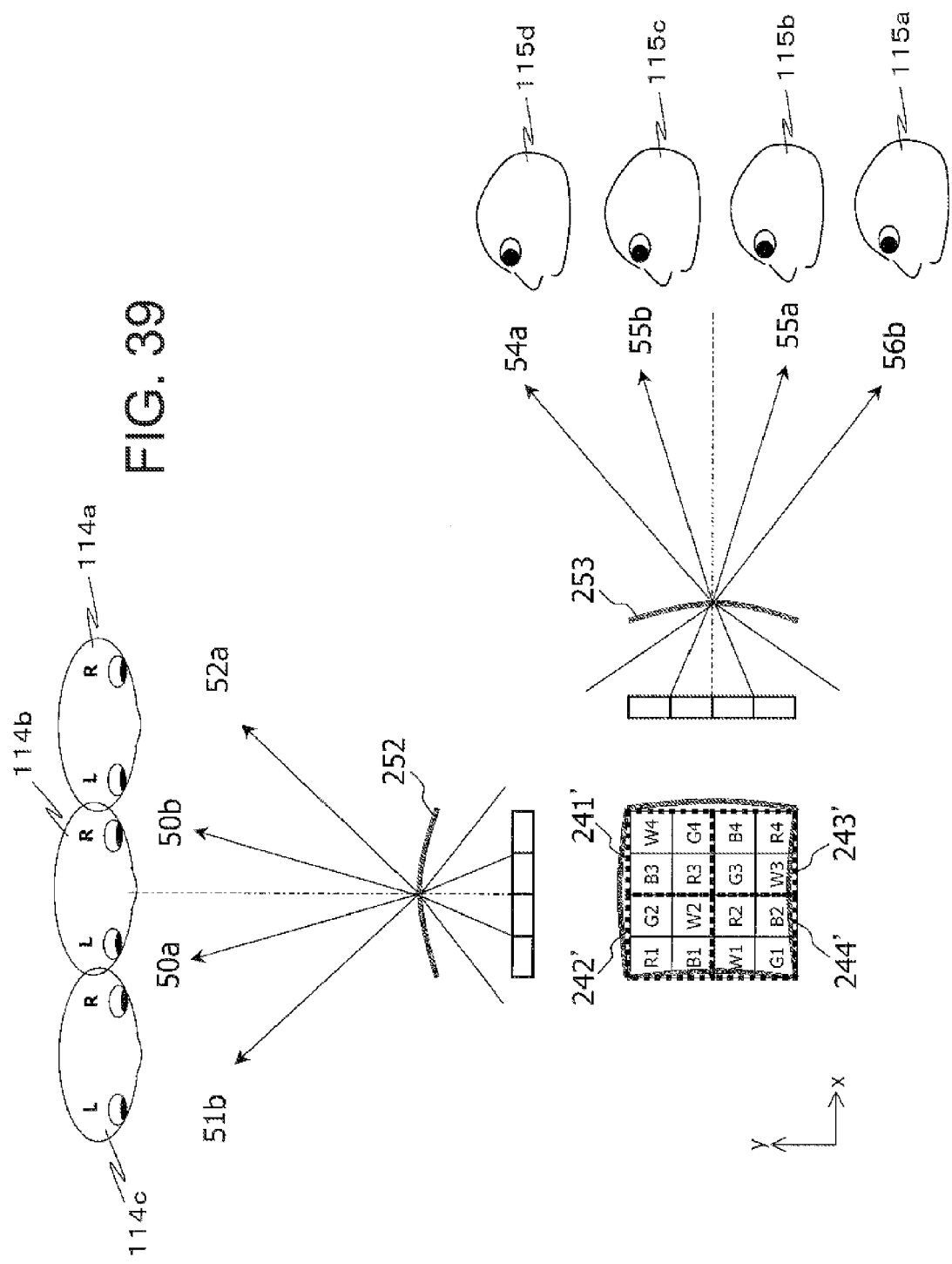

FIG. 40

| OBSERVER POSITION | | VIEWPOINT REGIONS WHERE LEFT AND RIGHT EYES ARE LOCATED | | | IMAGE DATA OF FIRST-VIEWPOINT REGIONS 50a+55a, 51a+55a, 50a+56a, 51a+56a, ETC. | IMAGE DATA OF SECOND-VIEWPOINT REGIONS 50b+55b, 51b+55b, 50b+56b, 51b+56b, ETC. | IMAGE DATA OF THIRD-VIEWPOINT REGIONS 50a+55b, 51a+55b, 50a+56b, 51a+56b, ETC. | IMAGE DATA OF FOURTH-VIEWPOINT REGIONS 50b+55a, 51b+55a, 50b+56a, 51b+56a, ETC. | REMARKS | |
|---|---|---|---|---|---|---|---|---|---|---|
| | HORIZONTAL DIRECTION | PERPENDICULAR DIRECTION | LEFT EYE IN HORIZONTAL DIRECTION | RIGHT EYE IN HORIZONTAL DIRECTION | LEFT AND RIGHT EYE IN PERPENDICULAR DIRECTION | | | | | HORIZONTAL DIRECTION | PERPENDICULAR DIRECTION |
| (A1) | 114a | 115a | 50b | 52a | 56b | B7 | B6 | A7 | A6 | REVERSE VIEW REGION | SIDE ROBE2 |
| (A2) | 114b | 115a | 50a | 50b | 56b | B6 | B5 | A6 | A5 | MAIN ROBE | SIDE ROBE2 |
| (A3) | 114c | 115a | 51b | 50a | 56b | B5 | B4 | A5 | A4 | REVERSE VIEW REGION | SIDE ROBE2 |
| (B1) | 114a | 115b | 50b | 52a | 55a | B7 | B6 | A7 or C7 | A6 or C6 | REVERSE VIEW REGION | MAIN ROBE1 |
| (B2) | 114b | 115b | 50a | 50b | 55a | B6 | B5 | A6 or C6 | A5 or C5 | MAIN ROBE | MAIN ROBE1 |
| (B3) | 114c | 115b | 51b | 50a | 55a | B5 | B4 | A5 or C5 | A4 or C4 | REVERSE VIEW REGION | MAIN ROBE1 |
| (C1) | 114a | 115c | 50b | 52a | 55b | B7 or D7 | B6 or D6 | C7 | C6 | REVERSE VIEW REGION | MAIN ROBE2 |
| (C2) | 114b | 115c | 50a | 50b | 55b | B6 or D6 | B5 or D5 | C6 | C5 | MAIN ROBE | MAIN ROBE2 |
| (C3) | 114c | 115c | 51b | 50a | 55b | B5 or D5 | B4 or D4 | C5 | C4 | REVERSE VIEW REGION | MAIN ROBE2 |
| (D1) | 114a | 115d | 50b | 52a | 54a | D7 | D6 | C7 or E7 NOT SHOWN | C6 or E6 NOT SHOWN | REVERSE VIEW REGION | SIDE ROBE1 |
| (D2) | 114b | 115d | 50a | 50b | 54a | D6 | D5 | C6 or E6 NOT SHOWN | C5 or E5 NOT SHOWN | MAIN ROBE | SIDE ROBE1 |
| (D3) | 114c | 115d | 51b | 50a | 54a | D5 | D4 | C5 or E5 NOT SHOWN | C4 or E4 NOT SHOWN | REVERSE VIEW REGION | SIDE ROBE1 |
| ... | ... | ... | ... | ... | ... | ... | ... | ... | ... | ... | ... |

FIG. 45

| | OBSERVER POSITION | | VIEWPOINT REGIONS WHERE LEFT AND RIGHT EYES ARE LOCATED | | | IMAGE DATA OF FIRST-VIEWPOINT REGIONS 50a, 51a, 52a, ETC. | IMAGE DATA OF SECOND-VIEWPOINT REGIONS 50b, 51b, 52b, ETC. | REMARKS |
|---|---|---|---|---|---|---|---|---|
| | HORIZONTAL DIRECTION | PERPENDICULAR DIRECTION | LEFT EYE IN HORIZONTAL DIRECTION | RIGHT EYE IN HORIZONTAL DIRECTION | LEFT AND RIGHT EYE IN PERPENDICULAR DIRECTION | | | HORIZONTAL DIRECTION |
| (A1) | 114a | 115a | 50b | 52a | 56a | A7 | A6 | REVERSE VIEW REGION |
| (A2) | 114b | 115a | 50a | 50b | 56a | A6 | A5 | MAIN ROBE |
| (A3) | 114c | 115a | 51b | 50a | 56a | A5 | A4 | REVERSE VIEW REGION |
| (B1) | 114a | 115b | 50b | 52a | 55b | B7 | B6 | REVERSE VIEW REGION |
| (B2) | 114b | 115b | 50a | 50b | 55b | B6 | B5 | MAIN ROBE |
| (B3) | 114c | 115b | 51b | 50a | 55b | B5 | B4 | REVERSE VIEW REGION |
| (C1) | 114a | 115c | 50b | 52a | 55c | C7 | C6 | REVERSE VIEW REGION |
| (C2) | 114b | 115c | 50a | 50b | 55c | C6 | C5 | MAIN ROBE |
| (C3) | 114c | 115c | 51b | 50a | 55c | C5 | C4 | REVERSE VIEW REGION |
| (D1) | 114a | 115d | 50b | 52a | 54d | D7 | D6 | REVERSE VIEW REGION |
| (D2) | 114b | 115d | 50a | 50b | 54d | D6 | D5 | MAIN ROBE |
| (D3) | 114c | 115d | 51b | 50a | 54d | D5 | D4 | REVERSE VIEW REGION |
| ... | ... | ... | ... | ... | ... | ... | ... | ... |

STEREOSCOPIC IMAGE DISPLAY DEVICE, TERMINAL DEVICE, STEREOSCOPIC IMAGE DISPLAY METHOD, AND PROGRAM THEREOF

CROSS-REFERENCE TO RELATED APPLICATION

This application is based upon and claims the benefit of priority from Japanese patent applications No. 2013-200197, filed on Sep. 26, 2013, and No. 2014-127895, filed on Jun. 23, 2014, the disclosure of which is incorporated herein in its entirety by reference.

BACKGROUND OF THE INVENTION

1. Field of the Invention

The present invention relates to a stereoscopic image display device. More specifically, the present invention relates to a stereoscopic image display device which displays images that correspond to each of a plurality of viewpoints, a terminal device that is provided with the stereoscopic image display device, a stereoscopic image display method, and a program thereof.

2. Description of the Related Art

Conventionally, there is a stereoscopic image display devices capable of achieving stereopsis without using eyeglasses through providing images different from each other towards a plurality of viewpoints and projecting images of different parallax to the left and right eyes of the observer.

As a stereoscopic image display method employed with such device, known is a method which: synthesizes image data for each of the viewpoints and displays it on a display unit; separates the displayed synthesized image by an optical separating module constituted with a lens or a barrier (a light-shielding plate) having a slit; and provides those to each of the viewpoints of the observer.

As the optical separating device, generally employed are a parallax barrier having a great number of striped slits and a lenticular lens in which cylindrical lenses having the lens effect in one direction are arranged.

With the stereoscopic image display device employing such display method, it is necessary to project appropriate parallax images to each of the left and right eyes of the observer. Thus, the space region (stereopsis region) where the observer can properly observe the stereoscopic image is limited. Therefore, when the positions of the left and right eyes of the observer are shifted out of the stereopsis region, the appropriate stereoscopic image cannot be visually recognized due to the existence of a crosstalk region where the parallax images overlap with each other so that a double image is visually recognized and a reverse view region where each of the parallax images is projected inversely.

As a method for improving such issue, there is a method which detects positions of the eyes of the observer and executes switching control of parallax images by using the detection result, and known is a display device in which the visibility of the stereoscopic images is improved in the crosstalk region and the reverse view region by employing that method (e.g., Japanese Patent Publication H 10-333091 (Patent Document 1), Japanese Unexamined Patent Publication 2011-215499 (Patent Document 2), Japanese Unexamined Patent Publication 2012-120194 (Patent Document 3), Japanese Unexamined Patent Publication 2012-60607 (Patent Document 4), and Japanese Unexamined Patent Publication 2005-91447 (Patent Document 5)).

Patent Document 1 discloses a technical content which executes parallax barrier control and image switching control in a stereoscopic image display device in which the resolution of the parallax barrier is doubled, when the observer is in a crosstalk region or a reverse view region. Further, the display device disclosed in Patent Document 2 includes: a light source unit having definition of four times of 3D resolution on the backlight side; and a light source control unit for controlling the light source unit. Disclosed therein is a technical content with which the light source control unit executes switching control of the functions of the light source that constitutes the light source unit according to the position of the observer.

That is, disclosed in Patent Documents 1 and 2 are the display devices which present images of less sense of uncomfortable feeling according to the detected position of the observer through having a light-ray distribution module exceeding the resolution of the display panel. In those display devices, the number of device viewpoints (the number of regions where the so-called parallax images are to be projected) determined according to the relation between the display panel and the light-ray distribution module is increased to take a countermeasure for reverse view.

In the image display device disclosed in Patent Document 3, a sense of uncomfortableness felt at the time of viewing is suppressed with a technique which sets off the parallax barrier function and outputs 2D images when it is detected that there are a plurality of observers. Further, in the stereoscopic image display device disclosed in Patent Document 4, a sense of uncomfortableness is lightened with a technique which controls the parallax amount according to the position of the observer.

Patent Document 5 discloses a technical content with which a lobe control module constituted by including a parallax barrier executes switching control of the stereopsis region to achieve multi-viewpoints by using side lobes even in a case where tracking is not used. Further, in the stereoscopic display device, a sense of uncomfortableness felt when one of the eyes of the observer is located in the main lobe and the other eye is located in the side lobe through a technique that is a combination of tracking and the processing by the lobe control module.

However, there are following issues with the display devices according to each of Patent Documents described above which employ the switching control of the parallax images based on the detected result regarding the positions of both eyes of the observer.

With the display device disclosed in Patent Document 1 or 2, a high-definition light-ray separating module having the resolution of twice or more of the display panel is required. This causes increase in the cost for the structure or manufacture. Further, while prescribed image processing can be performed within the range of the number of the viewpoints of the device, it is only possible to present repeated videos to be visually recognized for the viewing angles over the number of viewpoints of the device.

Further, Patent Documents 3 and 4 disclose the image display device employing the structure that makes it possible to effectively work within the number of viewpoints of the device. That is, no technical measure for suppressing the deterioration of the image quality in the reverse view region is employed, so that a sense of uncomfortableness is to be felt when visually recognizing the images in the reverse view region. Furthermore, a parallax barrier is provided as a lobe control module in Patent Document 5, so that the transmittance is low.

It is an exemplary object of the present invention to improve the shortcomings of the related techniques and, more specifically, to provide a stereoscopic image display device and a terminal device, which generate and display significant parallax images corresponding to the position of the observer.

DISCLOSURE OF THE INVENTION

In order to achieve the foregoing object, the stereoscopic image display device employs a structure which includes: a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; a relative position calculating unit which calculates a relative position of the observer with respect to the stereoscopic image display panel based on a result of the measurement; and an image generation processing unit which has a function for generating viewpoint images for J-viewpoints (J>N) set in advance, and generates one viewpoint image or more according to each of the viewpoints constituting the N-viewpoints by corresponding to the relative position and outputs the viewpoint image towards the stereoscopic image display panel.

Further, the terminal device according to the present invention employs a structure which includes the stereoscopic image display device which displays images corresponding to each of a plurality of viewpoints, and a casing which houses the stereoscopic image display device inside thereof.

The stereoscopic image display method according to the present invention is used with a stereoscopic image display device which includes: a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; and a display controller which generates the parallax images according to a result of the measurement, and the method is characterized that: the observer position measuring unit measures an observing position of the observer; the display controller calculates a relative position of the observer with respect to the stereoscopic image display panel based on the result of the measurement; the display controller generates viewpoint images for J-viewpoints (J>N) set in advance; the display controller specifies a plurality of viewpoint images according to the relative position from the generated viewpoint images; and the display controller outputs the specified plurality of viewpoint images towards the stereoscopic image display panel.

Further, the stereoscopic image display program according to the present invention is used with a stereoscopic image display device which includes: a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; and a display controller which generates the parallax images according to a result of the measurement, and the program causes a computer provided in advance to the display controller to function as: an observer position measuring module which measures an observing position of the observer; an observer position calculating module which calculates a relative position of the observer with respect to the stereoscopic image display panel based on the result of the measurement; and an image generation processing module which generates viewpoint images for J-viewpoints (J>N) set in advance, specifies a plurality of viewpoint images according to the relative position from the generated viewpoint images, and outputs the specified plurality of viewpoint images towards the stereoscopic image display panel.

BRIEF DESCRIPTION OF THE PREFERRED EMBODIMENTS

FIG. 2 is a schematic view showing a structural example of the stereoscopic image display device disclosed in FIG. 1;

FIGS. 3A and 3B show examples of image information of two viewpoints inputted to pixels of each of the viewpoints of the stereoscopic image display device disclosed in FIG. 1, in which FIG. 3A is a first-viewpoint image and FIG. 3B is a second-viewpoint image;

Figure 1:
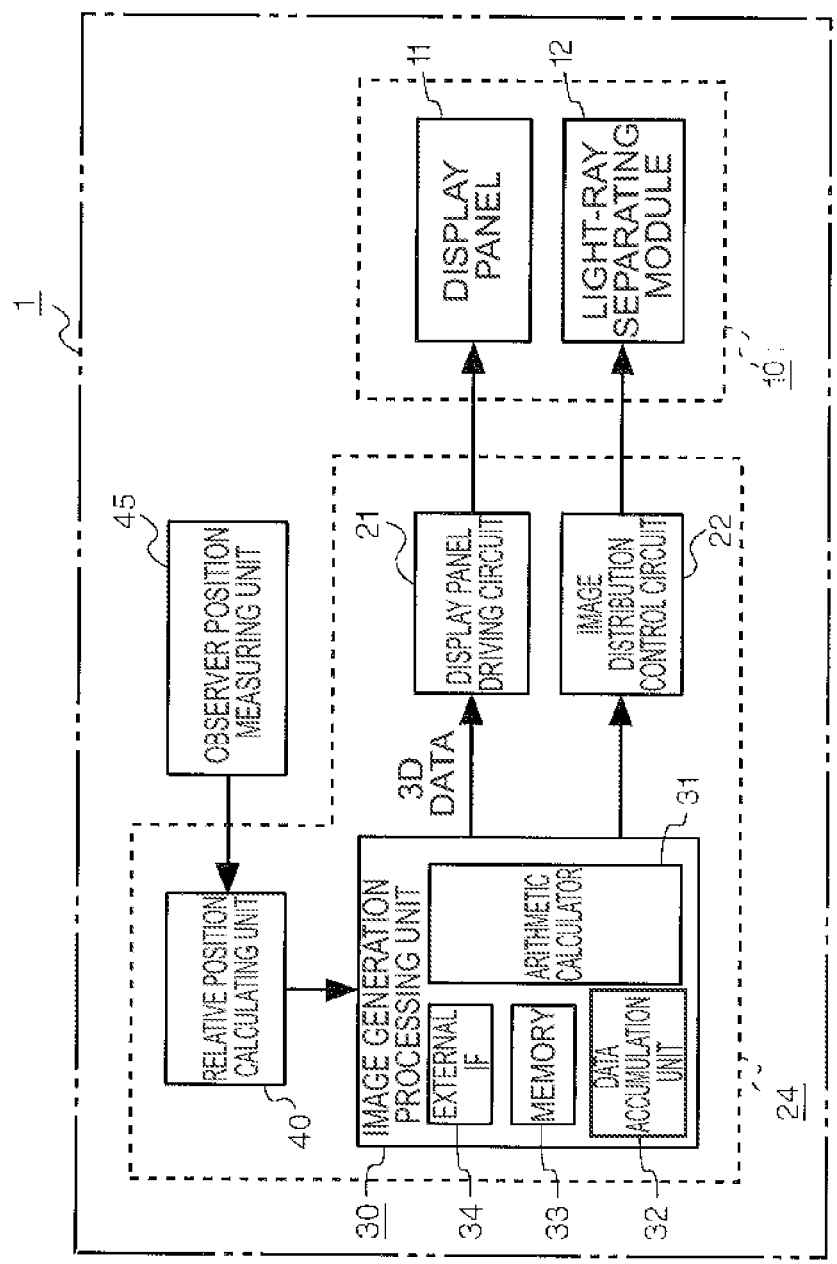
FIG. 1 is a block diagram showing functional structures of a stereoscopic image display device according to a first exemplary embodiment of the present invention.
Figure 7:
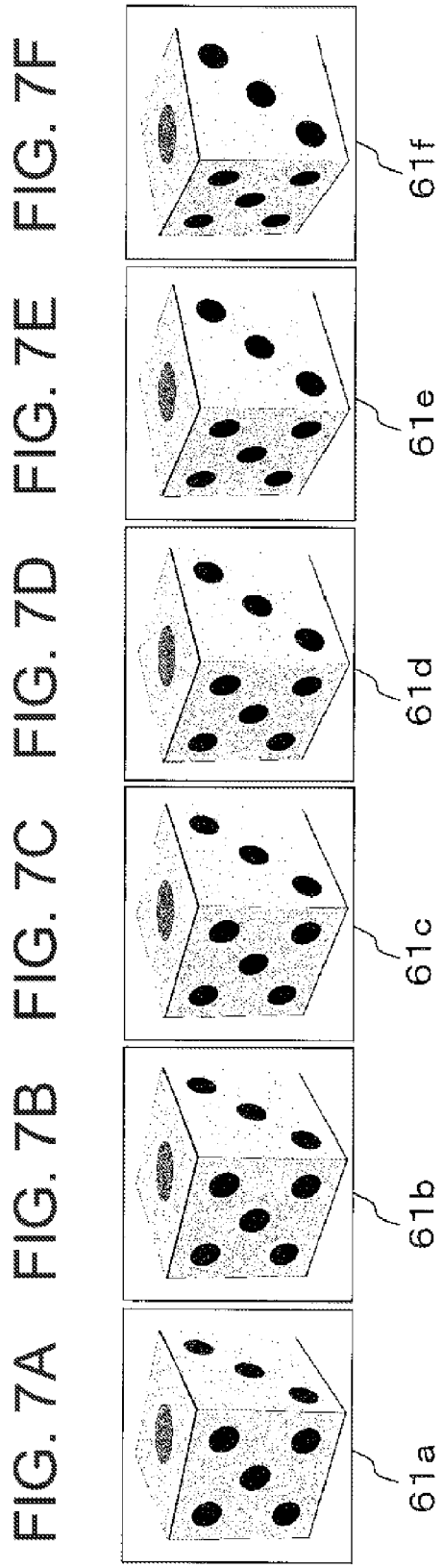
Figure 8:
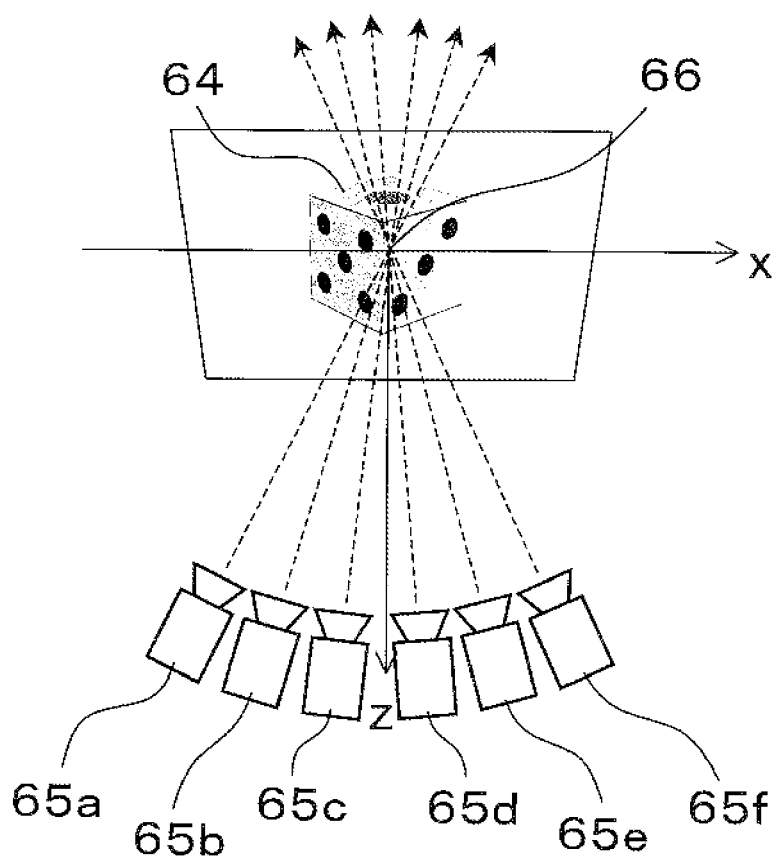
Figure 10:
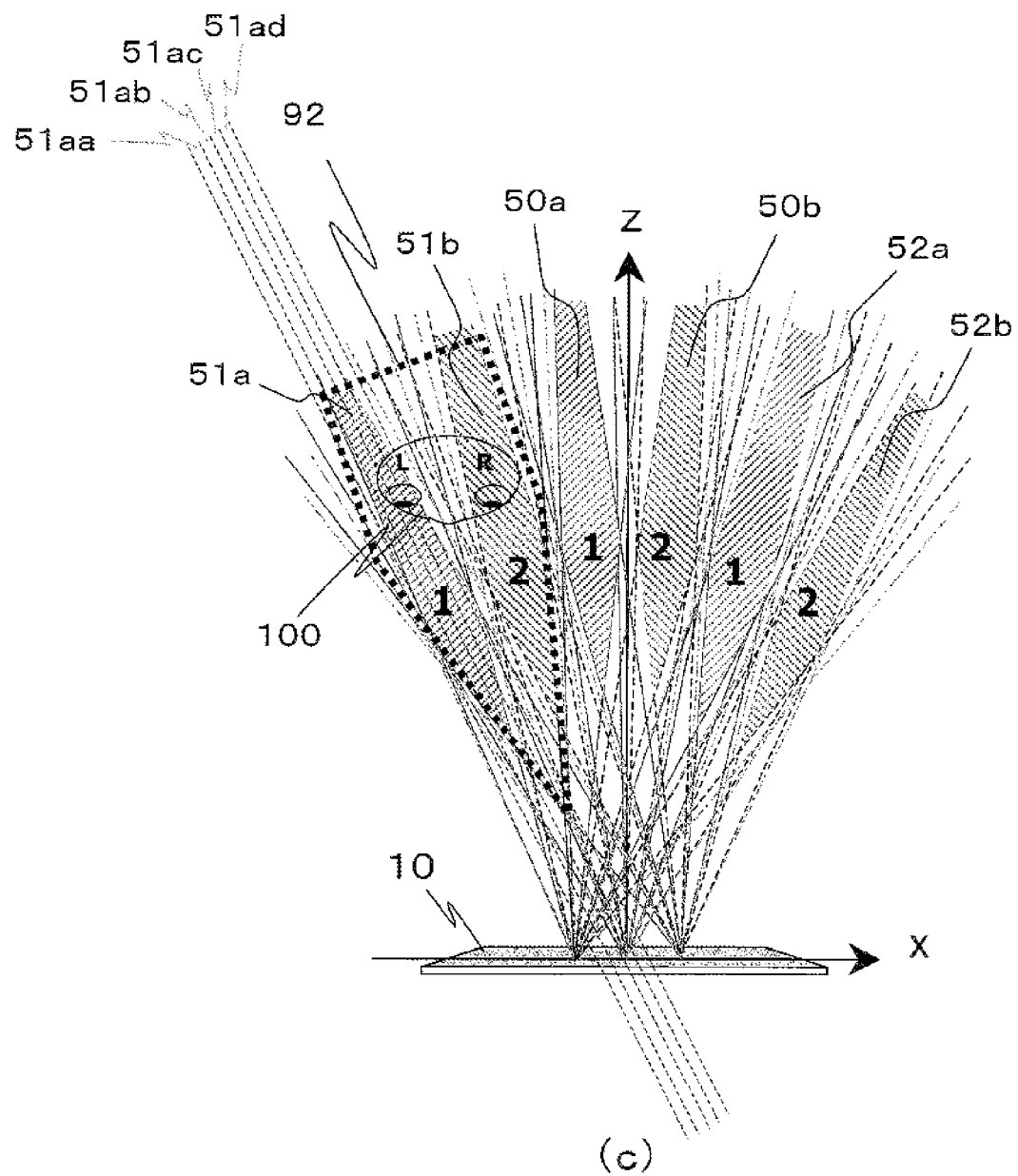
Figure 12:
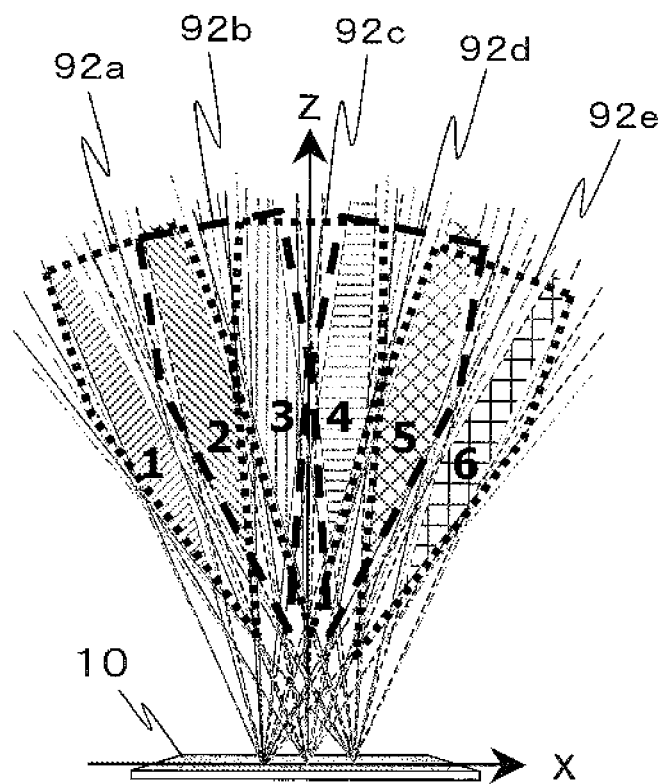
Figure 13:
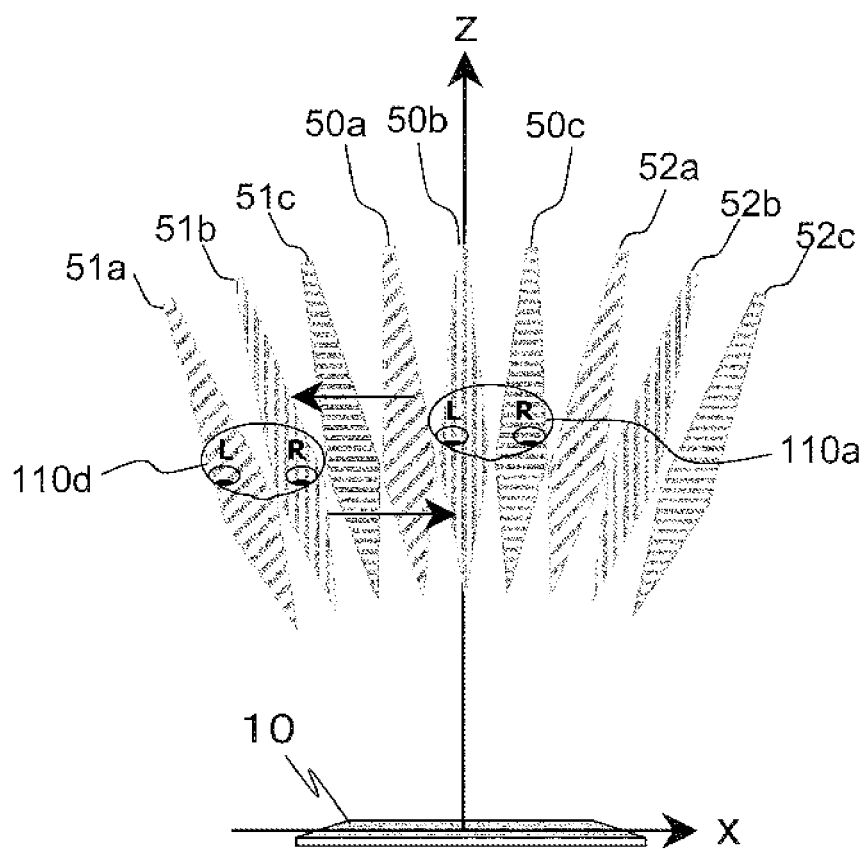
Figure 17:
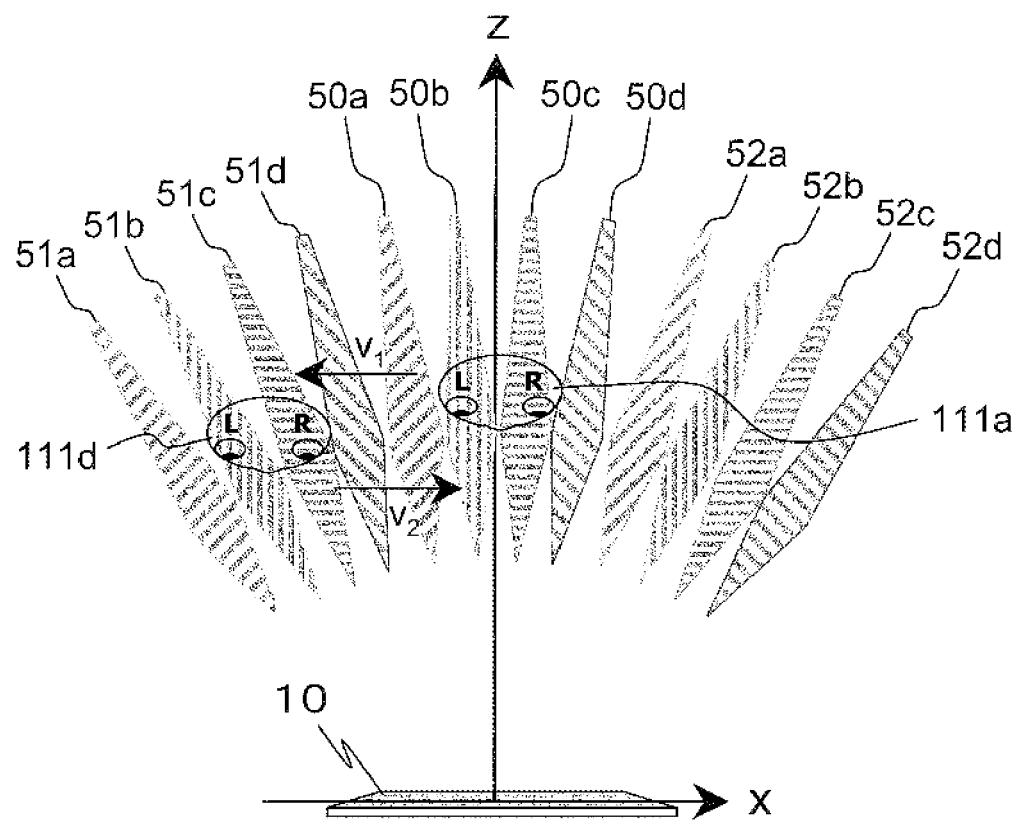
Figure 21:
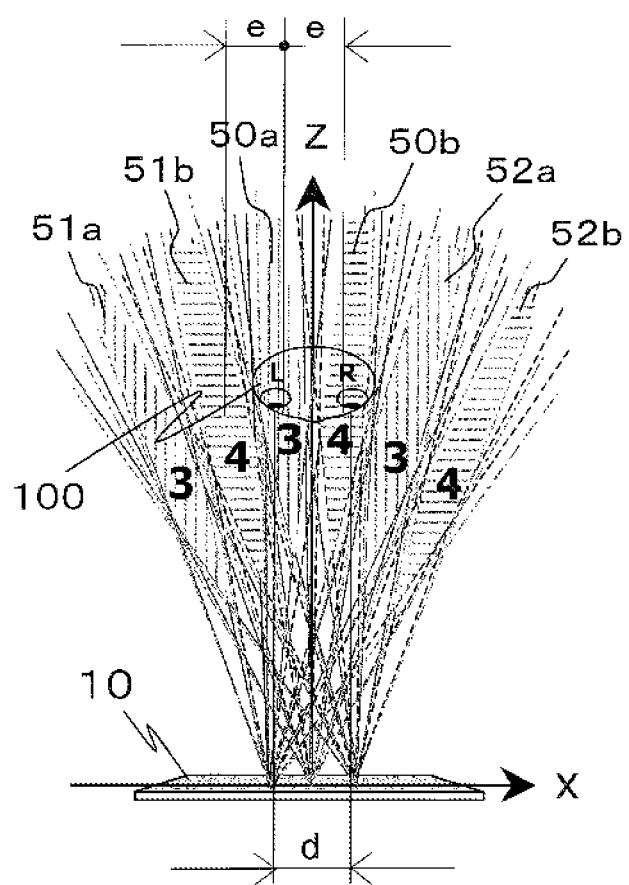
Figure 22:
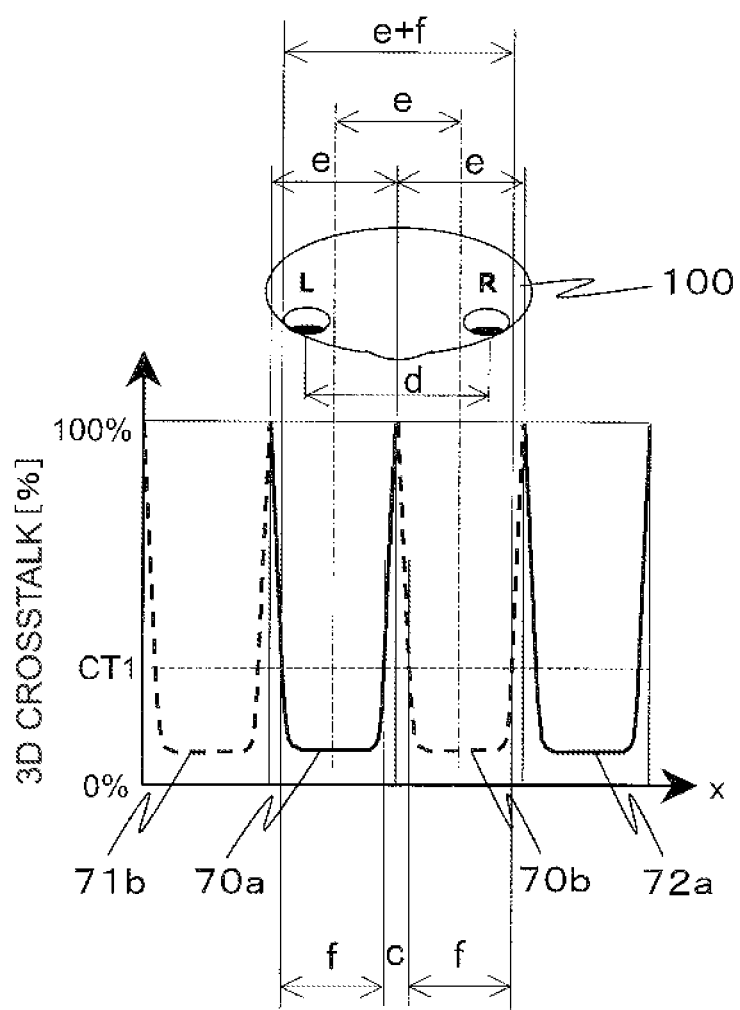
Figure 23:
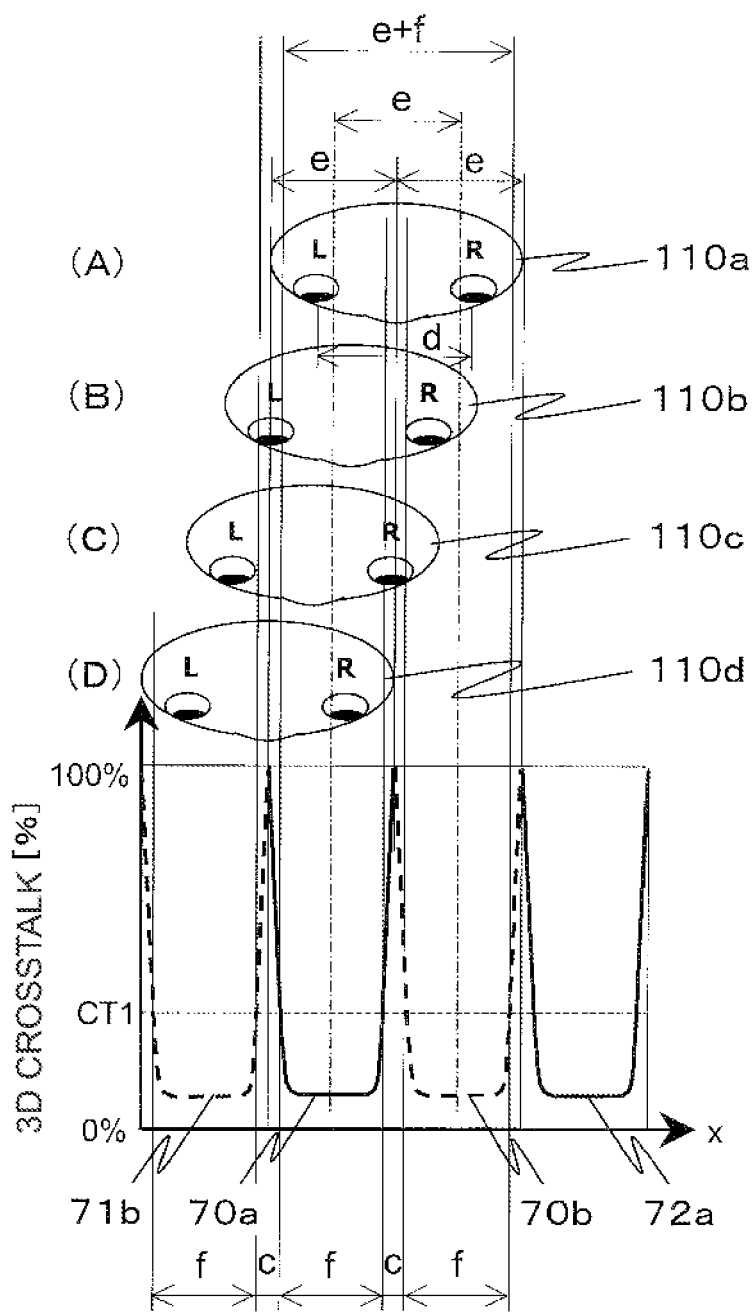
Figure 25:
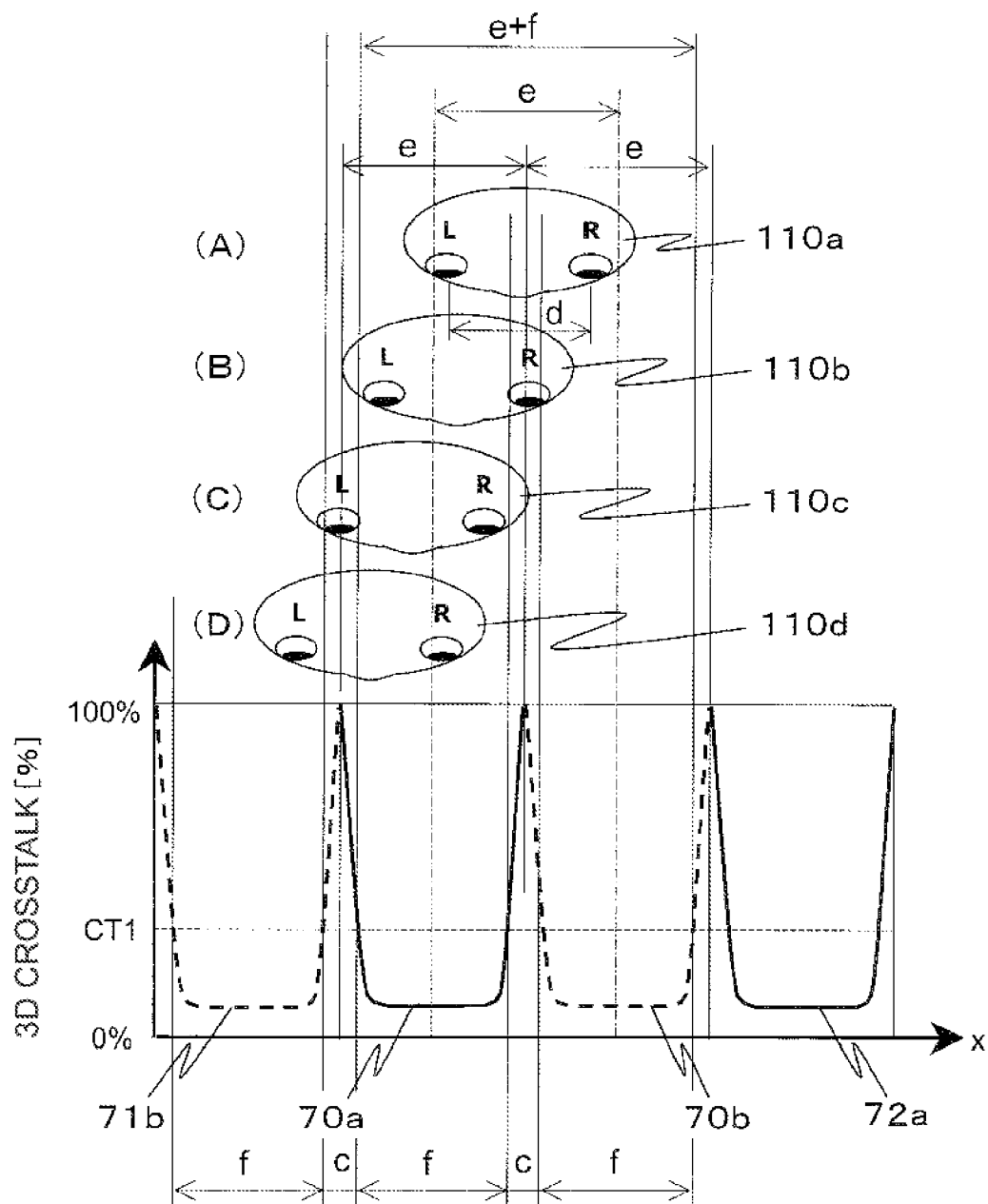
Figure 27:
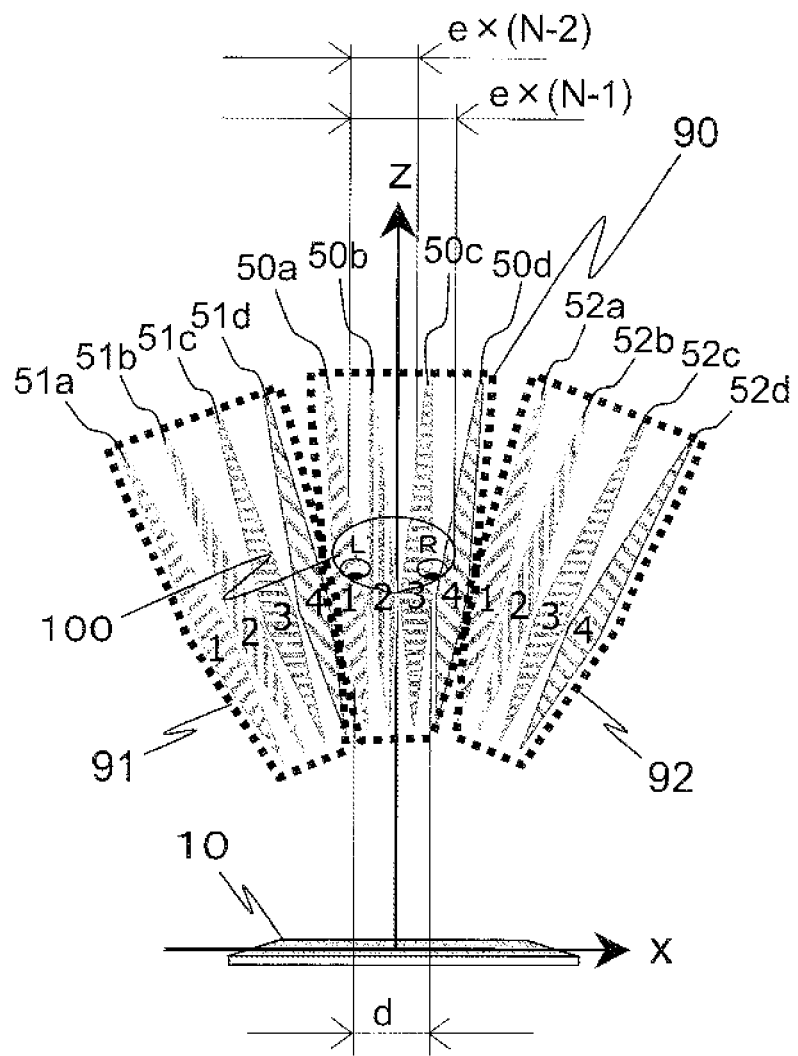
Figure 28:
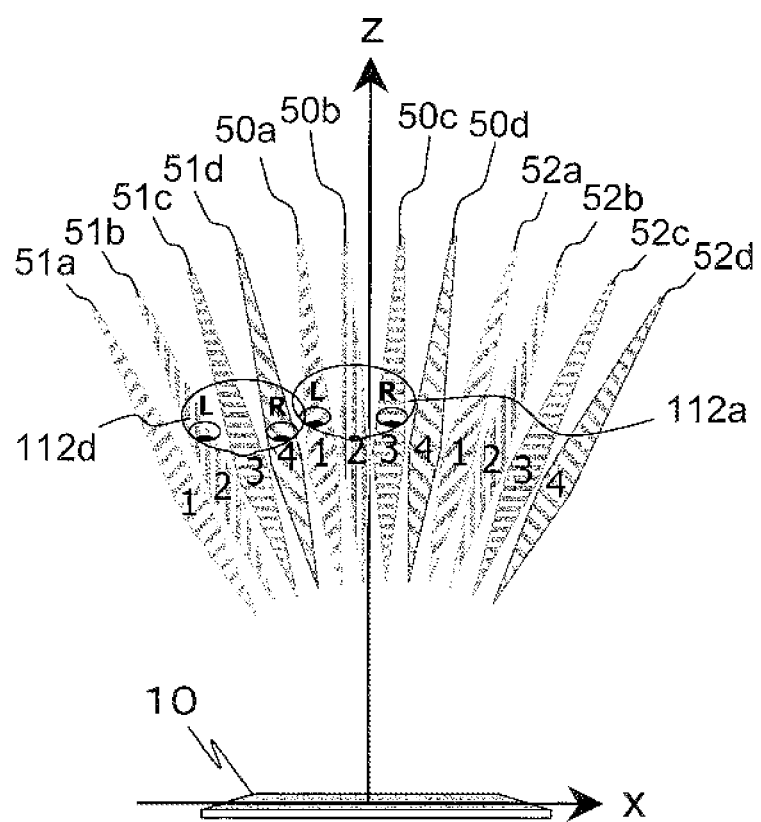
Figure 30:
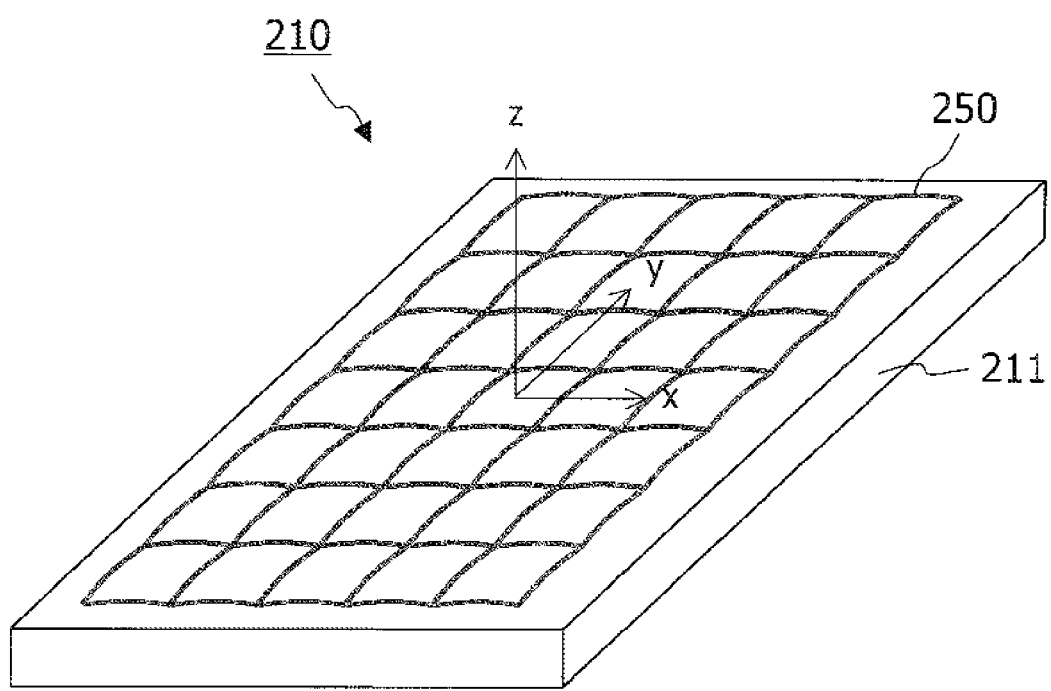
Figure 31B:
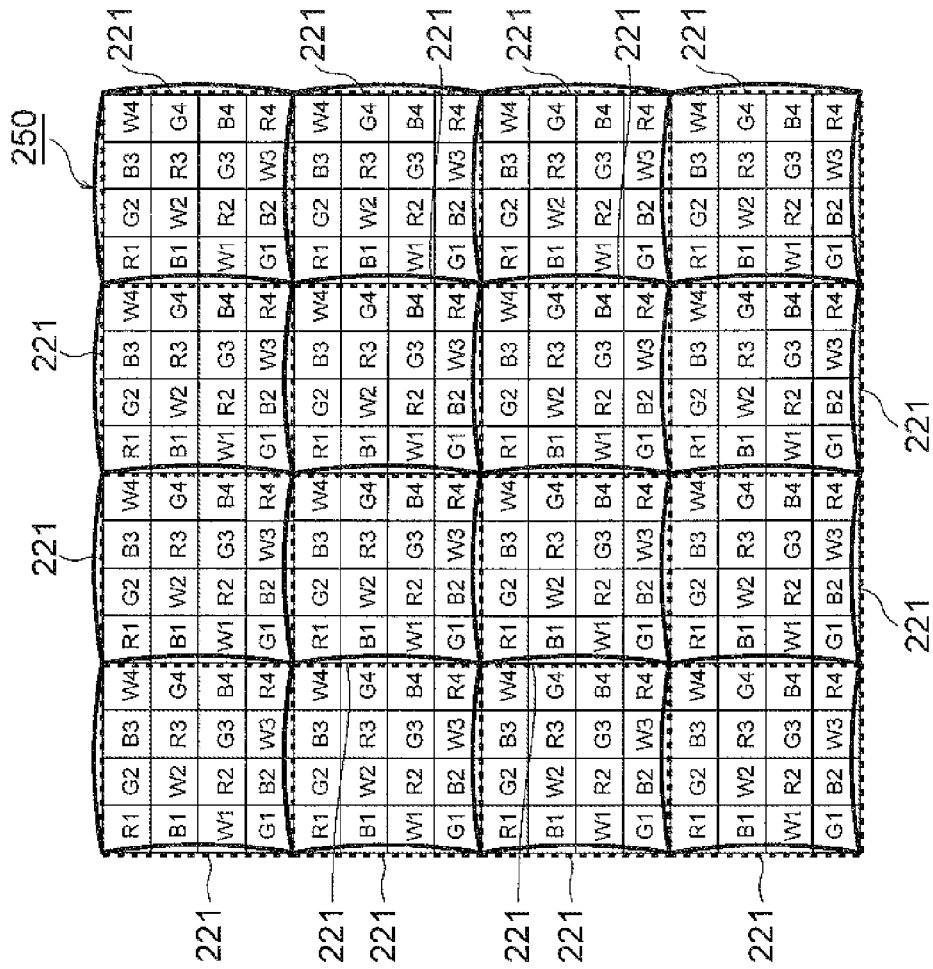
Figure 31A:
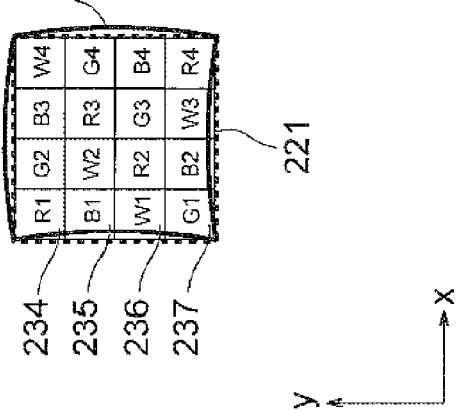
Figure 32:
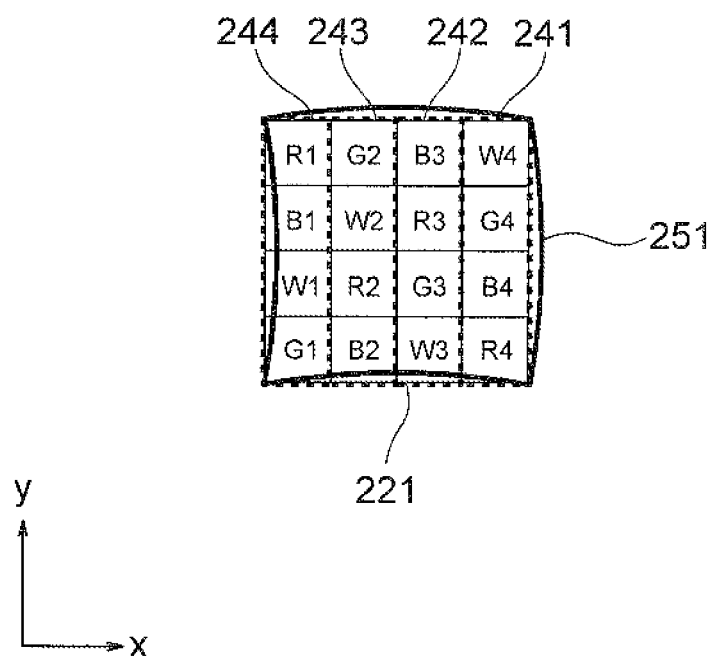
Figure 33:
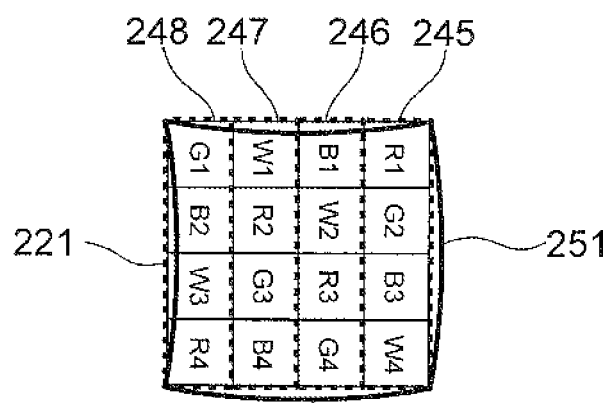
Figure 34:
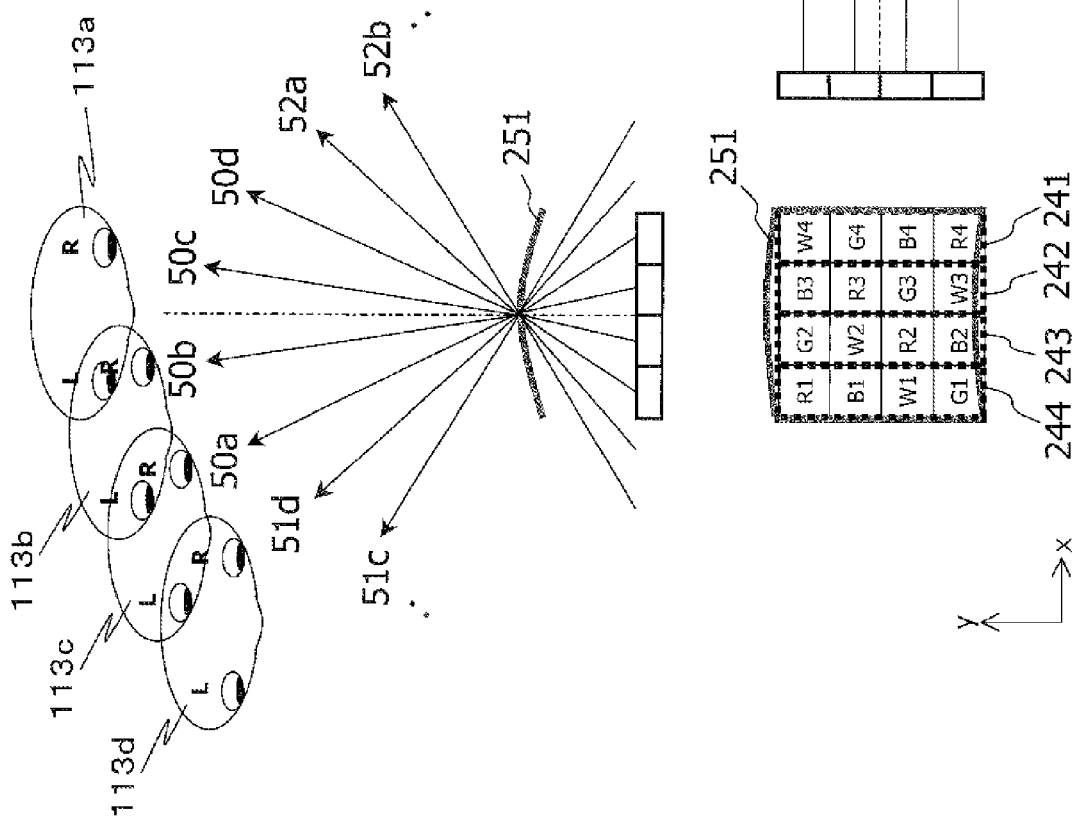
Figure 35:
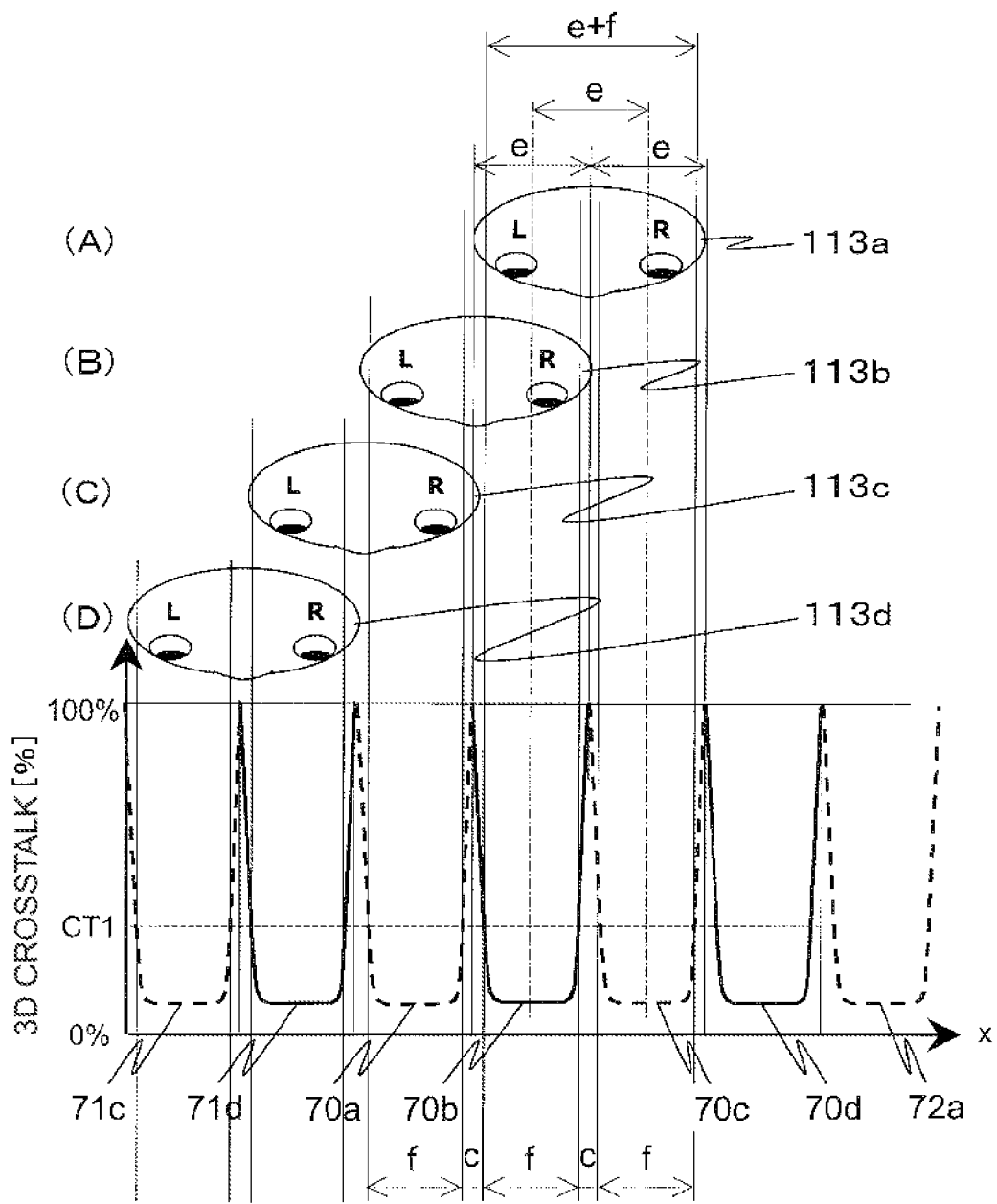
Figure 38:
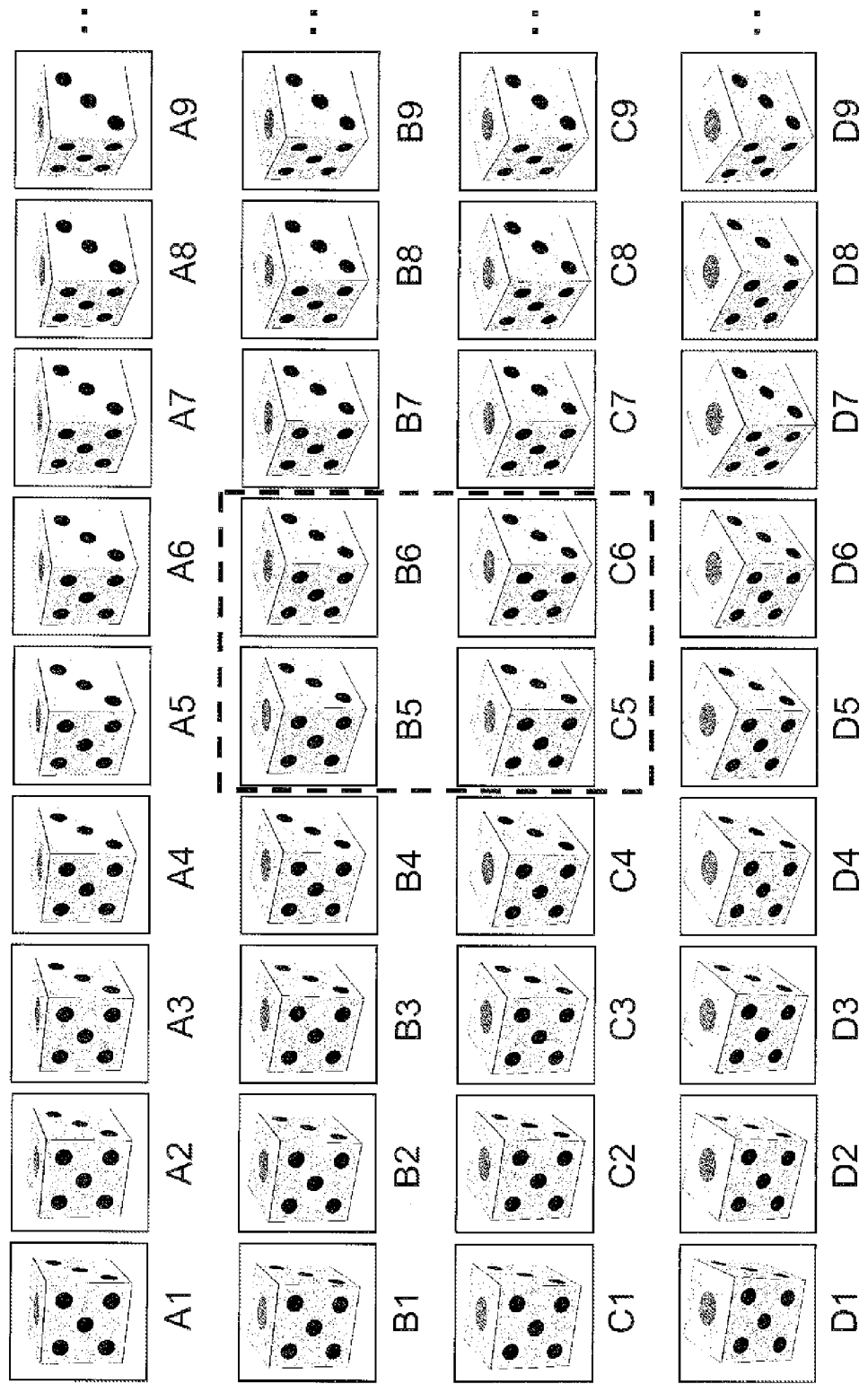
Figure 41:
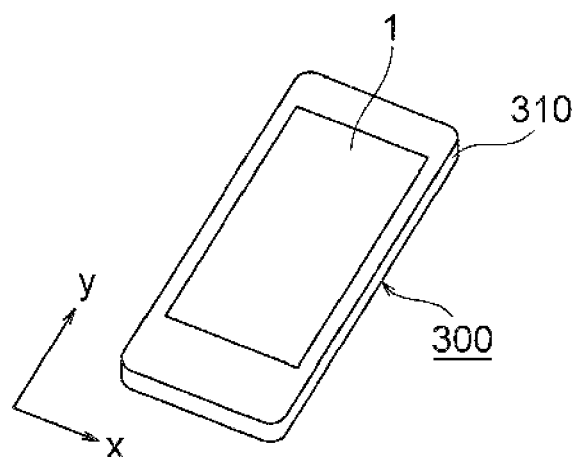
Figure 42:
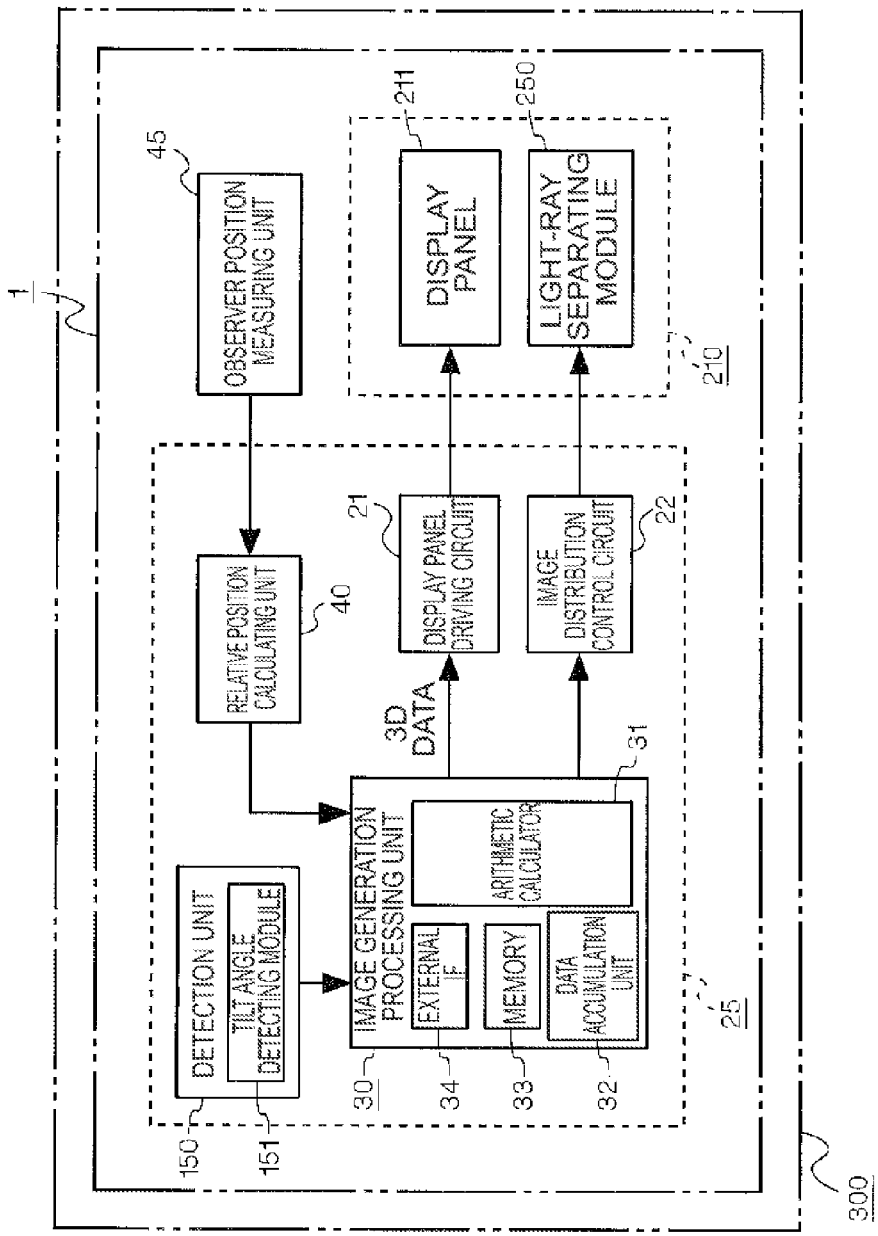
Figure 43:
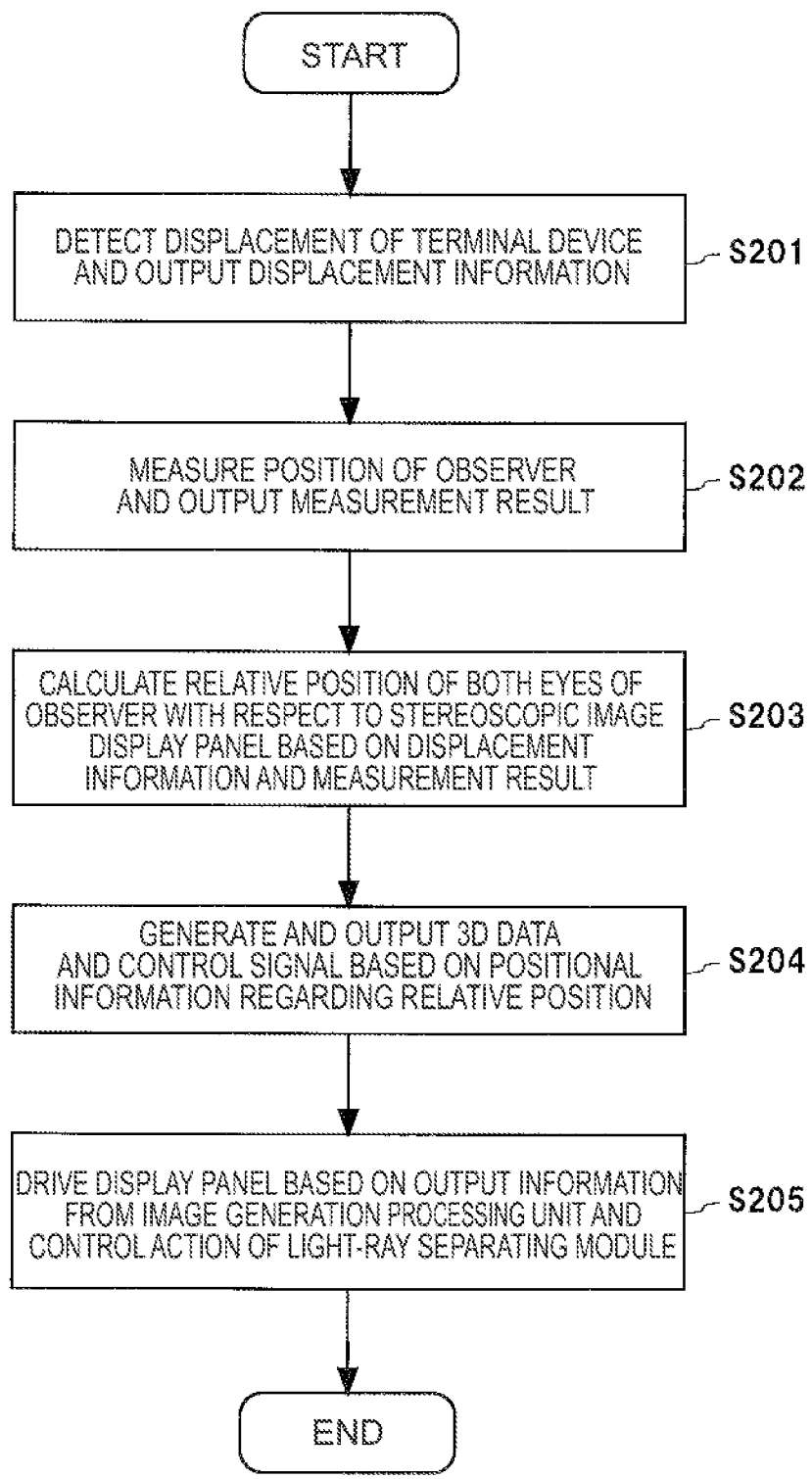
Figure 44:
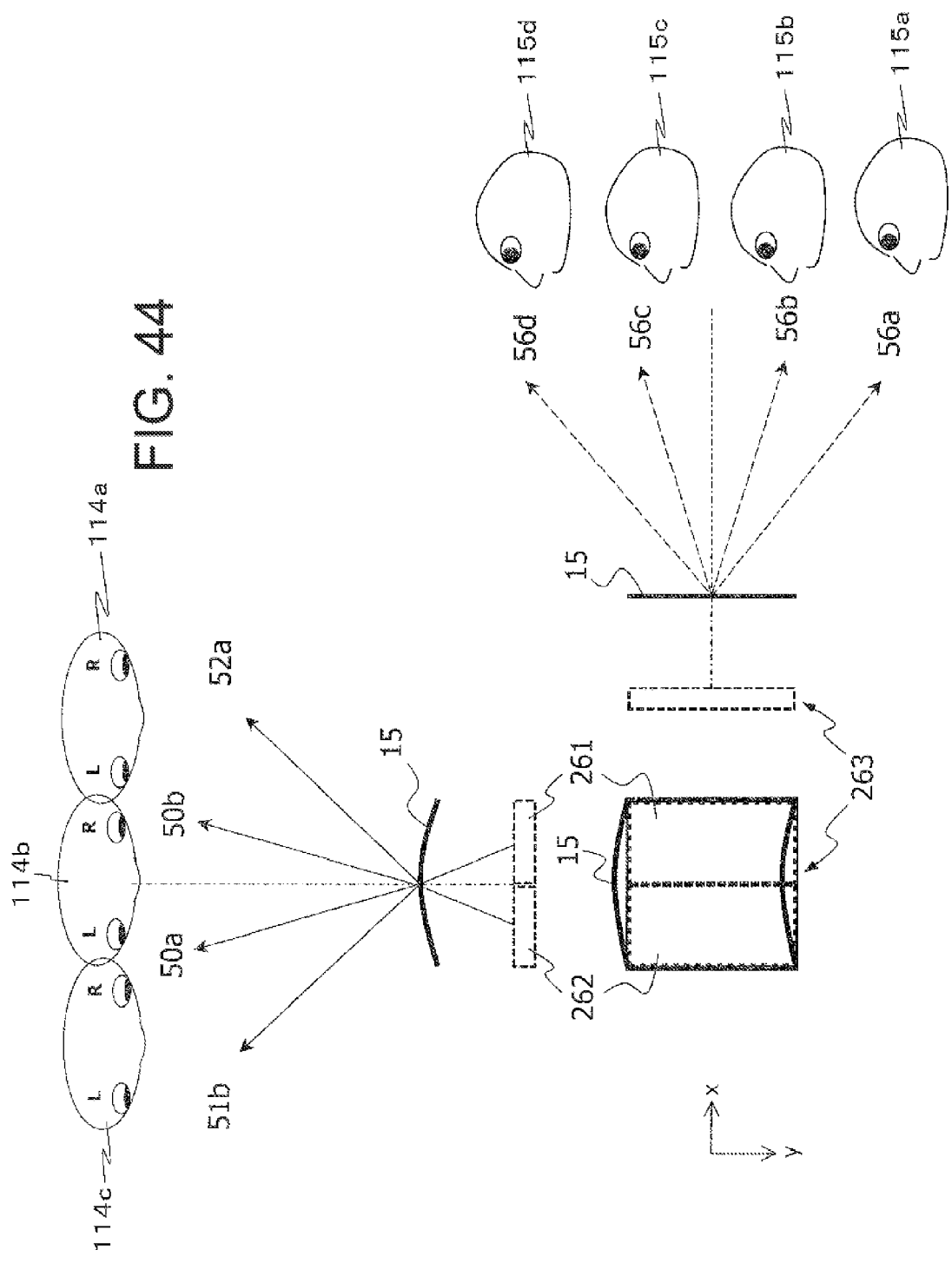

FIGS. 7A-7F show examples of image information inputted to the stereoscopic image display device of two viewpoints disclosed in FIG. 1, in which FIG. 7A is an image corresponding to a first-viewpoint image, FIG. 7B is an image corresponding to a second-viewpoint image, FIG. 7C is an image corresponding to a third-viewpoint image, FIG. 7D is an image corresponding to a fourth-viewpoint image, FIG. 7E is an image corresponding to a fifth-viewpoint image, and FIG. 7F is an image corresponding to a sixth-viewpoint image, FIG. 8 is a chart showing an example of a method for generating the first-viewpoint image to the sixth-viewpoint image shown in FIGS. 7A-7F;

FIGS. 9A-9C show the states regarding the relevancy between the state of light-ray separation done by the stereoscopic image display panel and the positions of the both eyes of the observer, in which FIG. 9A is a case where the left eye is in a first-viewpoint region 50$a$ and the right eye is in a second-viewpoint region 50$b$, FIG. 9B is a case where the left eye is in a first-viewpoint region 51$b$ and the right eye is in a second-viewpoint region 50$a$, and FIG. 9C is a case where the left eye is in a first-viewpoint region 51$a$ and the right eye is in a second-viewpoint region 51$b$;

FIG. 10 is an enlarged chart of FIG. 9C, showing an example of each of sub-regions acquired by dividing the first-viewpoint region into four regions;

FIG. 11 is a table showing the corresponding relation between the viewpoint regions where the left and right eyes of the observer are located and the image data to be displayed in the first-viewpoint region and the second-viewpoint region based on each of the stereopsis region disclosed in FIG. 9;

FIG. 12 is a chart showing a state of light-ray separation done by a typical 6-viewpoint stereoscopic image display panel;

FIG. 13 is a chart showing a state of light-ray separation done by a 3-viewpoint stereoscopic image display panel according to the first exemplary embodiment;

FIG. 14 is a chart showing an example of image data inputted to the 3-viewpoint stereoscopic image display panel shown in FIG. 13 and the stereoscopic image display panels of the second and third exemplary embodiments;

FIG. 15 is a table showing the relation between the viewpoint regions where each of the left and right eyes is located and image data of the first to third viewpoint regions when the observer moves to a minus-direction side of the x-axis as shown in FIG. 13;

FIG. 16 is a table showing the relation between the viewpoint regions where each of the left and right eyes is located and image data of the first to third viewpoint regions when the observer moves to a plus-direction side of the x-axis as shown in FIG. 13;

FIG. 17 is a chart showing a state of light-ray separation done by a 4-viewpoint stereoscopic image display panel according to the first exemplary embodiment;

FIG. 18 is a table showing the relation between the viewpoint regions where each of the left and right eyes is located and image data of the first to fourth viewpoint regions when the observer moves to a minus-direction side of the x-axis as shown in FIG. 17;

FIG. 19 is a table showing the relation between the viewpoint regions where each of the left and right eyes is located and image data of the first to fourth viewpoint regions when the observer moves to a plus-direction side of the x-axis as shown in FIG. 17;

FIG. 20 is a flowchart showing operations of the stereoscopic image display device disclosed in FIG. 1;

FIG. 21 is a chart showing a state of light-ray separation done by a 2-viewpoint stereoscopic image display panel according to the second exemplary embodiment;

FIG. 22 is a chart showing the 3D crosstalk characteristic in the center part of the display surface of the 2-viewpoint stereoscopic image display device disclosed in FIG. 21;

FIG. 23 is a chart showing the viewpoint regions where the left and right eyes are located when the observer moves to the minus side in the x-axis direction from the state disclosed in FIG. 22;

FIG. 24 is a table showing the relation between the viewpoint regions where each of the left and right eyes is located and image data of the first-viewpoint region as well as the second-viewpoint region based on the positions of the observer disclosed in FIG. 23;

FIG. 25 is a chart showing the viewpoint regions where the left and right eyes of the observer are located in a case of using a stereoscopic image display panel having a relation of "d<e (d: distance between both eyes of the observer, e: viewpoint pitch regarding the first-viewpoint region and the second-viewpoint region)" as a comparison example of FIG. 23;

FIG. 26 is a table showing the relation between the viewpoint regions where each of the left and right eyes is located and image data of the first-viewpoint region as well as the second-viewpoint region based on the positions of the observer disclosed in FIG. 25;

FIG. 27 is a chart showing a state of light-ray separation done by a 4-viewpoint stereoscopic image display panel according to the third exemplary embodiment;

FIG. 28 is a chart showing the relation between the observer and the viewpoint regions when the observer moves to a minus-direction side of the x-axis;

FIG. 29 is a table showing the relation between the viewpoint regions where each of the left and right eyes is located and image data of the first to fourth viewpoint regions based on the positions of the observer shown in FIG. 28;

FIG. 30 is a schematic view showing the structure of a stereoscopic image display panel according to a fourth embodiment of the present invention;

FIGS. 31A and 31B show charts of pixels in which sub-pixels constituted with four primary colors are arranged in matrix, in which FIG. 31A is a chart showing a layout relation between a pixel constituted with 4×4 sub-pixels and a lens element and FIG. 31B shows a state where the pixels and the lens elements disclosed in FIG. 31A are arranged in matrix;

FIG. 32 is a chart showing the pixel constituted with 4×4 sub-pixels and the lens array element in a first layout state shown in FIG. 31A;

FIG. 33 is a chart showing the relation between an input image and sub-pixels (a sub-pixel group) in a case where the pixel constituted with 4×4 sub-pixels and the lens array element disclosed in FIG. 32 are rotated clockwise by 90 degrees;

FIG. 34 is a chart showing light-ray separation when an image is separated only in one direction by using an active light-ray separating module corresponding to the pixel constituted with 4×4 sub-pixels disclosed in FIG. 31A;

FIG. 35 is a chart showing the relation between the position of the observer and the 3D crosstalk characteristic corresponding to FIG. 34;

FIG. 36 is a table showing the relation between the viewpoint regions where each of the left and right eyes is located and image data of the first-viewpoint region as well as the second-viewpoint region based on the positions of the observer shown in FIG. 35;

FIGS. 37A and 37B show charts regarding the relations based on the pixel constituted with 4×4 sub-pixels and the lens array element disclosed in FIG. 31A, in which FIG. 37A is a chart showing the relation between an input image and sub-pixels (a sub-pixel group) in a first layout state and FIG. 37B is a chart showing the relation between an input image and sub-pixels (a sub-pixel group) in a second layout state;

FIG. 38 is a chart showing an example of image information inputted to a stereoscopic image display panel of 2×2 viewpoints having pixels disclosed in FIG. 37;

FIG. 39 is a chart showing light-ray separation when an image is separated in two directions by using an active light-ray separating module corresponding to the pixel constituted with 4×4 sub-pixels disclosed in FIG. 31A;

FIG. 40 is a table showing the relation between the viewpoint regions where each of the left and right eyes is located and image data of the first-viewpoint region as well as the second-viewpoint region based on the positions of the observer disclosed in FIG. 39;

FIG. 41 is a schematic view showing a terminal device which includes a stereoscopic image display device according to a fourth exemplary embodiment of the present invention;

FIG. 42 is a block diagram showing the functional structures of the stereoscopic image display device according to the fourth exemplary embodiment of the present invention;

FIG. 43 is a flowchart showing operations of the stereoscopic image display device disclosed in FIG. 42;

FIG. 44 is a chart showing a state where images corresponding to each of the two directions according to the position of the observer are presented to the observer by using the stereoscopic image display device having the unidirectional light-ray separating module disclosed in FIG. 2; and FIG. 45 is a table showing the relation between the viewpoint regions where each of the left and right eyes is located and image data of the first-viewpoint region as well as the second-viewpoint region by corresponding to each of the positions of the observer disclosed in FIG. 44.

DETAILED DESCRIPTION OF THE PREFERRED EMBODIMENTS

First Exemplary Embodiment

A first exemplary embodiment of the stereoscopic image display device according to the present invention will be described by referring to FIG. 1 to FIG. 20.
(Overall Structures)

As shown in FIG. 2, a stereoscopic image display device 1 which displays images corresponding to each of a plurality of viewpoints includes: an observer position measuring unit 45 which is provided with a camera capable of capturing visible light and infrared rays for measuring the position of an observer 100; a display controller (not shown) which generates 3D data based on a measurement result acquired from the observer position measuring unit 45; and a stereoscopic image display panel 10 which separates an image and emits those based on the 3D data and a control signal outputted from the display controller.

The stereoscopic image display panel 10 includes: a display panel 11 in which pixels each containing at least a sub-pixel for displaying a first-viewpoint image and a sub-pixel for displaying a second-viewpoint image are arranged in matrix; and a light-ray separating module 12 which is provided on the display surface side of the display panel 11 for separating parallax images from the pixels towards each of the viewpoints.

The light-ray separating module 12 employs a structure in which a lens 15 corresponding to each of the pixels arranged on the display panel 11 is arranged in an array form, so that images for each of the viewpoints can be separated to prescribed different positions.

With such structure, the stereoscopic image display panel 10 can project different images towards at least two viewpoints, i.e., can execute light-ray separation.

Regarding the direction of the light-ray separation, as shown in FIG. 2, it is defined that the layout direction of the lenses 15 (a first pixel layout direction) is the x-axis, a direction which is orthogonal to the x-axis and extended to the observer 100 from the display panel 11 is the z-axis, and a direction orthogonal to both the x-axis and the z-axis (a second pixel layout direction) is the y-axis. Further, the intersection point (origin) of each of those axes is defined to be located in the center of the stereoscopic image display panel 10. Hereinafter, it is also called as the origin (the center of the display surface) of the stereoscopic image display panel 10. In that case, the straight line connecting the left eye 101 and the right eye 102 of the observer 100 is substantially in parallel to the x-axis.

The observer position measuring unit 45 is structured to capture the observer 100 by the camera provided to itself, and to measure the positions of the left eye 101 and the right eye 102 of the observer 100 based thereupon.

When the observer position measuring unit 45 measures the positions of the both eyes (the left eye 101 and the right eye 102), various methods can be used.

For example, it is possible to employ: a method which measures the position in the x-axis direction and the y-axis direction through detecting the positions of the face and the eyes by using pattern matching from an image captured by visible light, and measures the z-axis position based on the distance between the eyes derived from the measurement result; a method called a TOF method which irradiates infrared sine wave light to the observer 100 and measures the position in the z-axis direction from the time difference (phase difference) of the light flight until the sine wave light that is the reflection light of the irradiated light arrives at the camera; etc.

As the display panel 11, it is possible to use various electro-optical elements such as a liquid crystal display element, an organic electroluminescence display element, an electrophoretic element, or an electrochromic element.

As the light-ray separating module 12, it is possible to use not only an optical element such as a lenticular lens, a fly-eye lens, or a parallax barrier but also an electro-optical element such as a liquid crystal lens having a refractive index control function or a liquid crystal barrier having a light-shield control function. In view of the transmittance, it is preferable to use a lenticular lens, a fly-eye lens, and a liquid crystal lens.

First, for simplifying the explanation, a case of employing a 2-viewpoint stereoscopic image display panel as the stereoscopic image display panel 10 will be described. Note here that an N-viewpoint stereoscopic image display panel (N is a natural number of 2 or larger) is a stereoscopic image display panel which separates and emits two-dimensional image data having parallax for stereoscopic display towards N-viewpoints.

Figures 3A, 3B:
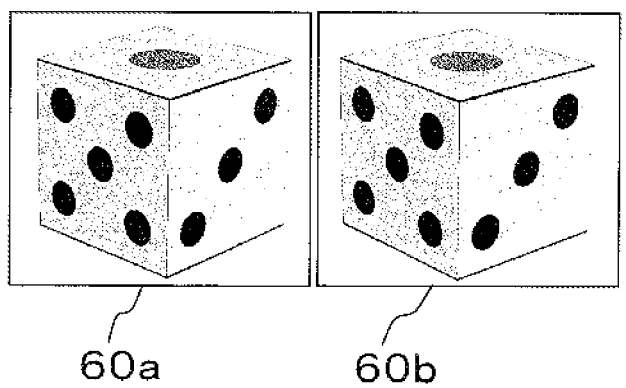

FIGS. 3A and 3B show examples of 2-viewpoint image information inputted to the pixels of each viewpoint of the stereoscopic image display panel 10. FIG. 3A is a first-viewpoint image 60a, and FIG. 3B is a second-viewpoint image 60b.

Between each of the viewpoint images, the size of the faces of "5" of dices and the size of "3" are different, respectively. That is, as shown in FIG. 3, employed is a structure in which the face of "5" is relatively large in FIG. 3A which corresponds to the first-viewpoint image 60a and the face of "3" is relatively large in FIG. 3B which corresponds to the first-viewpoint image 60b.

Figure 4:
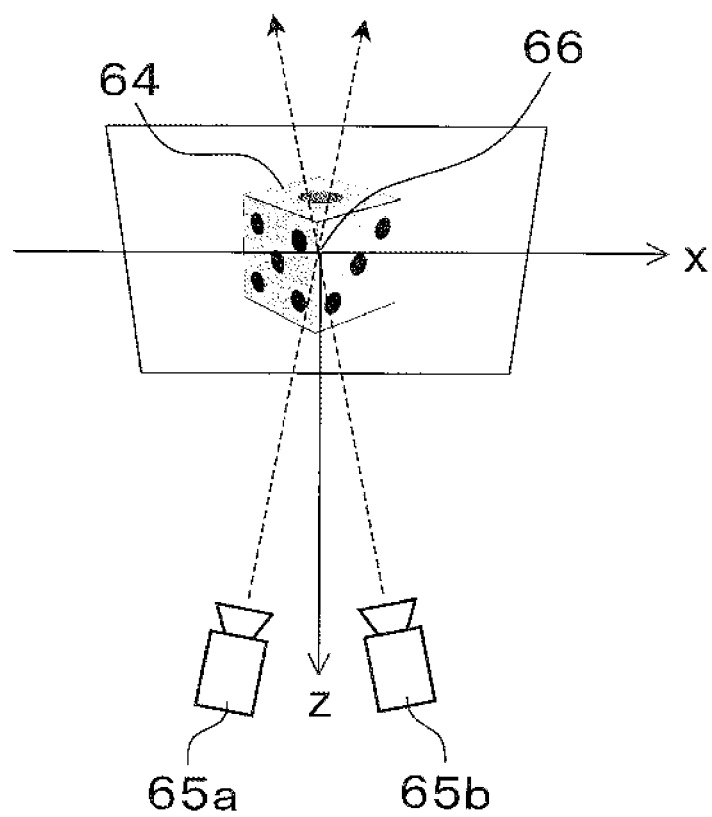
FIG. 4 is a chart showing an example of a method for generating the first-viewpoint image and the second-viewpoint image shown in FIGS. 3A and 3B.

Then, FIG. 4 shows an example of a method for generating the first-viewpoint image and the second-viewpoint image shown in FIGS. 3A and 3B. FIG. 4 is an explanatory chart regarding an image capturing method called an intersection method. Herein, the intersection point 66 between each of the optical axes of a first-viewpoint camera 65a and a second-viewpoint camera 65b is set on a normal screen, i.e., on a reproduction position on a screen surface. Further, it is defined that the horizontal direction of the screen surface is the x-axis, the direction orthogonal to the x-axis is the y-axis (not shown), the direction orthogonal to the xy plane is the z-axis, and the intersection point 66 is the origin at which each of the axes intersects with each other, and the plus and minus directions in the x-axis and the z-axis are as shown in FIG. 4. Note here that the layout positions of the first-viewpoint camera 65a and the second-viewpoint camera 65b are set to take a same value on the y-axis (set to have a same coordinate value on the y-axis: to be in a horizontal state).

Through capturing a 3D object 64 of a dice having three-dimensional information of xyz values in that state by the first-viewpoint and second-viewpoint cameras (65a, 65b), the images as shown in FIG. 3A and FIG. 3B are generated.

Between each of the images captured and generated in this manner, positions of the mutually corresponding points (corresponding points) are different as shown in FIGS. 3A and 3B. That is, the corresponding points in FIG. 3A and FIG. 3B (e.g., each of the vertex points of the dices) are different in both images, and the differences in the size are the parallax amount. The extent of the parallax amount is determined depending on the camera positions (x, z values), the angles of view of the cameras, distance between the cameras, the 3D object position (z value), and the like.

Figure 5:
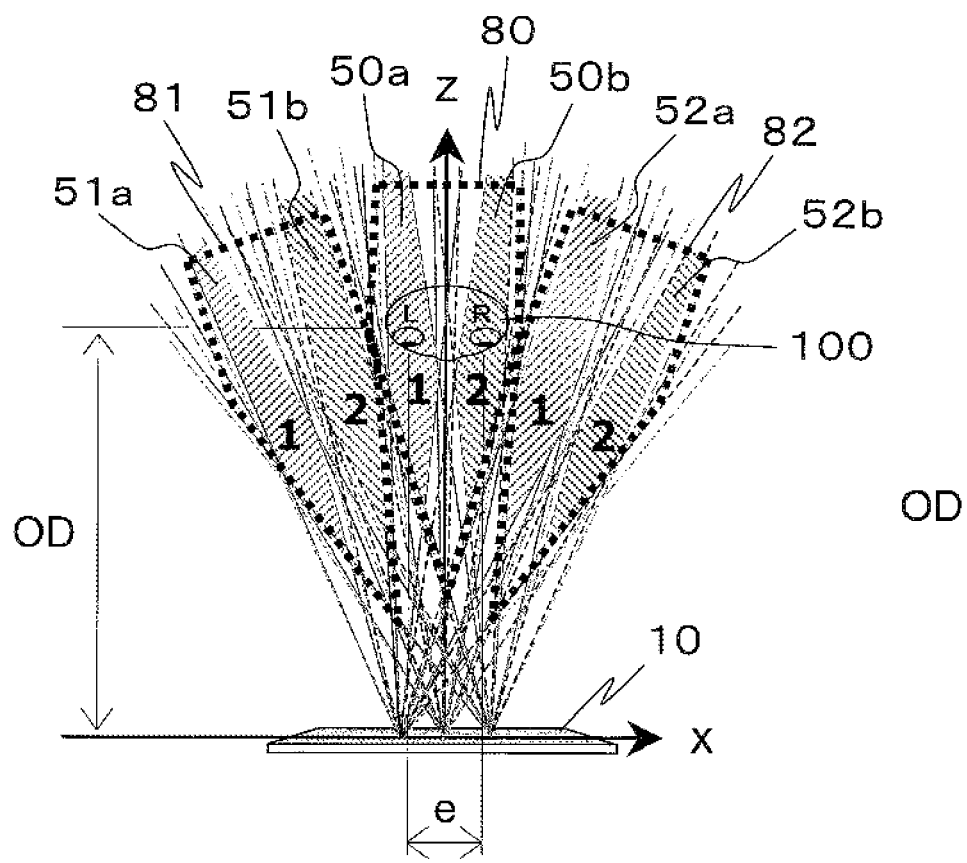
FIG. 5 is a chart showing a state of light-ray separation and a stereopsis region by a stereoscopic image display panel disclosed in FIG. 1.

Subsequently, FIG. 5 shows the state of light-ray separation done by the stereoscopic image display panel 10. This is a sectional view of a zx plane when viewed from the plus direction of the y-axis. In FIG. 5, the left eye of the observer 100 is expressed as "L" and the right eye is expressed as "R". This is the same for each of the following charts.

By a combination of the pixels for each of the above-described viewpoints and the light-ray separating module 12, an image is separated in such a manner that the first-viewpoint regions 50a, 51a, 52a, - - - and the second-viewpoint regions 50b, 51b, 52b, - - - are alternately repeated along the x-axis direction.

When it is defined that each of the first-viewpoint regions (50a, 51a, 52a) is the left-eye region and each of the second-viewpoint regions (50b, 51b, 52b) is the right-eye region and it is assumed that the first-viewpoint image 60a is projected to each of the first-viewpoint regions (FIGS. 3A and 3B) and the second-viewpoint image 60b is projected to each of the second-viewpoint regions (FIGS. 3A and 3B), the stereoscopic image display panel 10 is structured to form a stereopsis region 80 where the observer 100 can sense the stereoscopic images when the left eye 101 is located in the left-eye region 50a and the right eye 102 is located in the right-eye region 50b, respectively.

The observer 100 herein is in a state isolated from the stereoscopic image display panel 10 by the length of an optimum observing distance (optimum viewing distance) OD at which the stereoscopic region becomes the maximum.

Reference code "e" shows a viewpoint pitch between each of the viewpoint regions at the optimum viewing distance, and FIG. 5 shows a case where the viewpoint pitch e is equivalent to the distance d between the both eyes. Further, reference numerals "1" and "2" correspond to the first-viewpoint image 60a and the second-viewpoint image 60b, respectively.

Similarly, the stereoscopic image display panel 10 forms a stereopsis region 81 when the both eyes of the observer 100 correspond to the left-eye region 51a and the right-eye region 51b and forms a stereopsis region 82 when the both eyes of the observer 100 correspond to the left-eye region 52a and the right-eye region 52b based on signals or the like from a display controller.

Note here that the stereopsis region 80 including the z-axis extended vertically from the center of the display surface (the center of the image display) of the stereoscopic image display panel 10 is defined as the main lobe, and the stereoscopic regions 81, 82 which appear when the observer 100 moves in each of the directions on the plus side and the minus side on the x-axis from the main lobe are defined as the side lobes.

Further, other than the above-described two stereopsis regions, it is also possible to structure the stereoscopic image display panel 10 in such a manner that a single or a plurality of side lobes corresponding to the position of the observer 100 appear on the minus-direction side on the x-axis of the stereopsis region 81 and on the plus-direction side on the x-axis of the stereoscopic region 82, respectively.

Figure 6:
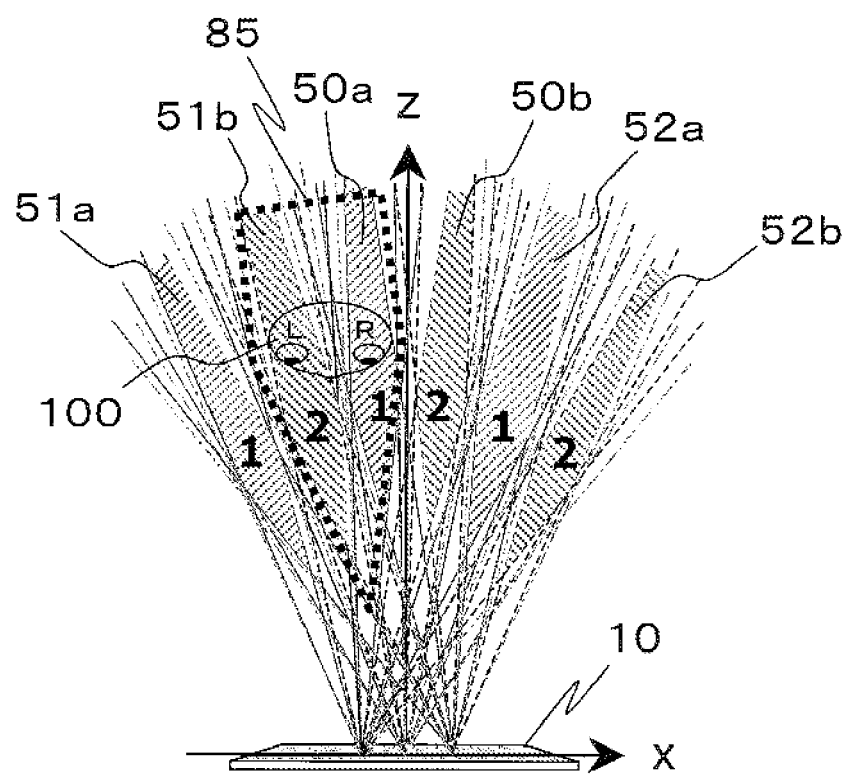
FIG. 6 is a chart showing a state of light-ray separation and a reverse view region by the stereoscopic image display panel disclosed in FIG. 1.

In a region on the way along which the observer 100 moves to the side lobe from the main lobe, as shown in FIG. 6, the observer 100 comes to be in a reverse view state where the right-eye region corresponds to the left eye 101 of the observer 100 and the left-eye region corresponds to the right eye 102, respectively. Thus, a reverse view region 85 is formed therein by the stereoscopic image display panel 10. The observer 100 in that case is in a state where the left eye 101 senses the second-viewpoint image 60b (2) and the right eye 102 senses the first-viewpoint image 60a (1).

Then, each functional structure of the stereoscopic image display device 1 according to the first exemplary embodiment is shown in FIG. 1. As shown in the block diagram, along with the display panel 11, the light-ray separating module 12, and the observer position measuring unit 45 described above, the stereoscopic image display device 1 includes a display controller 24 which has a function for driving the display panel 11 and a function for controlling the light-ray separating module 12.

The display controller 24 includes: a relative position calculating unit 40 which calculates the relative position of the left eye 101 and the right eye 102 of the observer 100 with respect to the stereoscopic image display panel 10 based on the measurement result (measurement information) acquired by the observer position measuring unit 45; an image generation processing unit 30 which generates 3D data (parallax images) and control signals based on the positional information (relative positional information) from the relative position calculating unit 40; a display panel driving circuit (display panel driving unit) 21 which drives the display panel 11 based on the 3D data from the image generation processing unit 30; and an image distribution control circuit (image distribution control unit) 22 which controls operations of the light-ray separating module 12 based on the control signals from the image generation processing unit 30.

More specifically, the relative position calculating unit 40 has a function which calculates coordinate values (x1, y1, z1) showing the relative position of the left eye 101 of the observer with respect to the origin of the stereoscopic image display panel 10 and coordinate values (x2, y2, z2) showing the relative position of the right eye 102 of the observer with respect to the origin based on the measurement information from the observer position measuring unit 45 (see FIG. 2). Further, it is also possible to provide a functional structure for calculating the viewing angle $\theta 1$ (=a tan (x1/z1)) of the left eye 101, for example, to the relative position calculating unit 40 based on the calculated values.

The image generation processing unit 30 is constituted with: an arithmetic calculator 31 which executes image processing; a data accumulation unit 32 which stores display target data to be displayed on the display panel 11; a memory 33 which stores an operation control program and the like of the arithmetic calculator 31; and an external IF (interface) 34 which mediates exchange of information with outside. Because each of those structural members effectively functions, the image generation processing unit 30 can generate significant image data (3D data) corresponding to each viewpoint according to the signals received from the relative position calculating unit 40.

In addition to the operation control program of the arithmetic calculator 31, information regarding the relative position of the left eye 101 and the right eye 102 acquired from the relative position calculating unit 40, information regarding the stereopsis regions of the stereoscopic image display panel 10, and the like are stored in the memory 33. The arithmetic calculator 31 has a function (function for specifying the viewpoint regions where the left and right eyes of the observer are located) which judges which of the viewpoint regions the left and right eyes of the observer 100 are located based on the information accumulated in the memory 33 and the information acquired as appropriate from a sensor (not shown) of the observer position measuring unit 45.

Generation of the image data in the image generation processing unit 30 is achieved when the arithmetic calculator 31 that has read out the display target data stored in the data accumulation unit 32 executes image processing thereon. When the display target data is three-dimensional data containing depth information, employed is a preferable method with which the calculator 31 executes rendering processing on the three-dimensional data to generate two-dimensional image data for each of the viewpoint having parallax (3D data used for stereoscopic display).

That is, the calculator 31 when generating 3D data used for stereoscopic display is structured to have virtual cameras of prescribed viewpoint numbers for three-dimensional data and to execute rendering processing for each of those. For example, the two dimensional image data for each viewpoint having parallax as shown in FIGS. 3A and 3B is generated through executing the rendering processing on each by the arithmetic calculator 31 provided with the virtual cameras of prescribed number of viewpoints (2-viewpoints herein) for the three-dimensional data.

Note here that it is preferable to use the method based on the three-dimensional data containing depth information for generating the image data by the image generation processing unit 30. However, it is also possible to employ a structure with which the display target data on which rendering processing has been executed in advance is stored in the data accumulation unit 32 and it is selectively read out.

That is, it is possible to employ a method with which the display target data in a two-dimensional image data format corresponding to FIGS. 3A and 3B is accumulated in advance to the data accumulation unit 32, and the arithmetic calculator 31 selectively reads out the image data depending on stereoscopic display or flat display. When such method is employed, the rendering processing becomes unnecessary. Thus, it is possible to employ the arithmetic calculator 31 of low processing capacity and calculation speed than the case of using the above-described generation method that requires the rendering processing. This makes it possible to acquire an advantage of being able to constitute the image generation processing unit 30 at a low cost.

Further, the image generation processing unit 30 generates the 3D data according to the positional information received from the relative position calculating unit 40, and outputs it to the display panel driving circuit 21. Further, for outputting the 3D data, the image generation processing unit 30 has a function which outputs control signals (signals for making the liquid crystal lens effective) generated simultaneously with that to the image distribution control circuit 22.

The display panel driving circuit 21 has a function for generating signals (synchronous signals and the like) required for driving the display panel 11, and the image distribution control circuit 22 has a function which generates signals for driving the light-ray separating module 12.

Other than the liquid crystal lens, it is possible to use an active element such as a liquid crystal barrier element that can be controlled by electric signals as the light-ray separating module 12.

Further, it is also possible to use a static element such as a lenticular lens, a fly-eye lens, a parallax barrier, a pin-hole, which cannot be controlled by electric signals as the light-ray separating module 12. With that, it becomes unnecessary to provide the image distribution control circuit 22 to the display controller 24, so that it is possible to decrease the cost and the like due to such simplification of the structure.

Meanwhile, the image generation processing unit 30 employing the above-described structure has a function for generating an image of J-viewpoints (J>N) set in advance based on the display-target data within the data accumulation unit 32.

The contents described heretofore can be summarized as follows. The stereoscopic image display device 1 which displays images corresponding to each of a plurality of viewpoints includes: the stereoscopic image display panel 10 including the display panel 11 in which a plurality of pixels are arranged and the light-ray separating module 12 provided on the display surface side for separating parallax images from each of the pixels towards a plurality of N-viewpoints according to the layout direction (x-axis direction) of each of the pixels; the observer position measuring unit 45 which measures the observing position of the observer who is facing the display surface; the relative position calculating unit 40 which calculates the relative position of the observer with respect to the stereoscopic image display panel 10 based on the measurement result; and the image generation processing unit 30 which has the function for generating viewpoint images for J-viewpoints (J>N) set in advance, and generates the viewpoint images corresponded to the relative position and outputs those towards the stereoscopic image display panel.

Therefore, the image generation processing unit 30 can generate images for more than 2-viewpoints such as images for 6-viewpoints, for example.

Now, as an example of the image information inputted to the 2-viewpoint stereoscopic image display panel 10 according to the first exemplary embodiment, images for 6-viewpoints are shown in FIGS. 7A-7F. FIG. 7A is a first-viewpoint image 61a, FIG. 7B is a second-viewpoint image 61b, FIG. 7C is a third-viewpoint image 61c, FIG. 7D is a fourth-viewpoint image 61d, FIG. 7E is a fifth-viewpoint image 61e, and FIG. 7F is a sixth-viewpoint image 61f.

As shown in 7A-7F, the size of the faces of "5" and the faces of "3" of the dices is different for each of the viewpoints. That is, there is such a characteristic that the face of "5" is the largest in the first-viewpoint image 61a, while the face of "3" is the largest in the sixth-viewpoint image 61f. Further, employed is a structure in which the size of the faces of "5" is gradually decreased while the size of the faces of "3" is gradually increased from FIG. 7A to FIG. 7F.

Then, FIG. 8 shows an example of a method for generating images from the first-viewpoint image to the sixth-viewpoint image shown in FIGS. 7A-7F.

Basically, as in the structural content shown in FIG. 4, the first-viewpoint camera 65a, the second-viewpoint camera 65b, the third-viewpoint camera 65c, the fourth-viewpoint camera 65d, the fifth-viewpoint camera 65e, and the sixth-viewpoint camera 65f are disposed, and a 3D object 64 of the dice having three-dimensional information of xyz values is captured by the first to sixth-viewpoint cameras (65a to 65f) to generate the images shown in FIG. 7A to FIG. 7F. Further, the difference in the size in the positions among each of the corresponding points is the parallax amount among each of the images in FIGS. 7A-7F.

When the observer 100 moves to the outer side of the main lobe of the stereoscopic image display panel 10, the image generation processing unit 30 is structured to perform generation and the like of a new image corresponding to the viewpoints according to the observing direction. That is, in a case of generating the images for 6-viewpoints as shown in FIG. 7, the image generation processing unit 30 generates all the images for 6-viewpoints and performs storing processing thereof in advance, and the images may be selected as appropriate by corresponding to the move of the observer. Alternatively, the image generation processing unit 30 may be structured to generate only the images for the viewpoint in the vicinity of the position of the observer as appropriate.

The light-separation state done by the stereoscopic image display panel 10 when the image generation processing unit 30 generates the images of 6-viewpoints in the manner described above is shown in FIGS. 9A-9C. As in the case of FIG. 5 described above, this is also a sectional view of a zx plane when viewed from the plus direction of the y-axis (see FIG. 2).

FIG. 9A is a chart showing an example of a scene where the image generation processing unit 30 judges that the left eye 101 of the observer 100 exists in the first-viewpoint region 50a and the right eye 102 exists in the second-viewpoint region 50b from the calculation result (positional information) acquired by the relative position calculating unit 40.

In this case, the image generation processing unit 30 generates the image data of the third-viewpoint image 61c (FIG. 7) for the first-viewpoint region 50a and generates the image data of the fourth-viewpoint image 61d (FIG. 7) for the second-viewpoint region 50b, respectively, and outputs those to the display panel driving circuit 21 as the 3D data. That is, "3" and "4" applied therein correspond to the third-viewpoint image 60c and the fourth-viewpoint image 60d, respectively.

Thereby, a stereopsis region 90 where the observer 100 can sense the stereoscopic images can be formed. As shown in FIGS. 9A-9C, the stereopsis region 90 as the main lobe in this case is formed at a position that is roughly consistent with the stereopsis region 80 as the main lobe described by referring to FIG. 5.

Similarly, FIG. 9B is a chart showing an example of a scene where the image generation processing unit 30 judges that the left eye 101 of the observer 100 exists in the second-viewpoint region 51b and the right eye 102 exists in the first-viewpoint region 50a from the calculation result acquired by the relative position calculating unit 40.

In this case, the image generation processing unit 30 generates the image data of the second-viewpoint image 61b (FIG. 7) for the second-viewpoint region 51b and generates the image data of the third-viewpoint image 61c (FIG. 7) for the first-viewpoint region 50a, respectively, and outputs those to the display panel driving circuit 21 as the 3D data. That is, "2" and "3" applied therein correspond to the second-viewpoint image 60b and the third-viewpoint image 60c, respectively.

Thereby, a stereopsis region 91 where the observer 100 can sense the stereoscopic images can be formed. As in the case described above, the position of the stereopsis region 91 is roughly consistent with the position of the reverses view region 85 described by referring to FIG. 6.

Similarly, FIG. 9C is a chart showing an example of a scene where the image generation processing unit 30 judges that the left eye 101 of the observer 100 exists in the first-viewpoint region 51a and the right eye 102 exists in the second-viewpoint region 51b from the calculation result acquired by the relative position calculating unit 40.

In this case, the image generation processing unit 30 generates the image data of the first-viewpoint image 61a (FIG. 7) for the first-viewpoint region 51a and generates the image data of the second-viewpoint image 61b (FIG. 7) for the second-viewpoint region 51b, respectively, and outputs those to the display panel driving circuit 21 as the 3D data. That is, "1" and "2" applied therein correspond to the first-viewpoint image 60a and the second-viewpoint image 60b, respectively.

Thereby, a stereopsis region 92 where the observer 100 can sense the stereoscopic images can be formed. As in the case described above, the position of the stereopsis region 92 is roughly consistent with the position of the side lobe 81 described by referring to FIG. 5.

Now, FIG. 11 shows a table showing the corresponding relation between the viewpoint regions where the left and right eyes of the observer 100 are located and the image data to be displayed in the first-viewpoint region and the second-viewpoint region defining that the stereopsis regions 92, 91, 90 and the two stereopsis regions generated on the plus direction of the x-axis according to the same regularity thereof (FIGS. 9A-9C) as the stereopsis regions A to E, respectively.

In the section of remarks in FIG. 11, the corresponding relation regarding the positions of each of the stereopsis regions A to E and the positions of the stereopsis regions (main lobe and side lobes) as well as the reverse view region shown in FIG. 5 and FIG. 6.

For displaying the images on the 2-viewpoint stereoscopic image display panel 10 based on the image data of 2-viewpoints, the observer 100 can only sense the same video in the main lobe and the side lobes and a reverse view is generated in the regions between the main lobe and the side lobes.

In the meantime, with the use of the above-described structure having the function of generating the images of 6-viewpoints for forming stereopsis regions corresponding to the observer 100 as appropriate based on each of those images, the observer 100 can sense different videos in each of the stereopsis regions A to E even in the case of 2-viewpoint stereoscopic display. That is, motion parallax is given, thereby making it possible to contribute to improving the sense of ambience in the stereoscopic image quality.

In general, as the stereoscopic image display device employing the structure for giving motion parallax, known is a device which forms the stereopsis regions as shown in FIG. 12 by using a 6-viewpoint stereoscopic image display panel. The stereopsis regions 92a to 92e in FIG. 12 are formed at positions corresponding to the stereopsis regions A to E shown in FIG. 11. Further, "1", "2", "3", "4", "5", and "6" applied thereto correspond to the first-viewpoint image 60a, the second viewpoint image 60b, the third-viewpoint image 60c, the fourth-viewpoint image 60d, the fifth-viewpoint image 60e, and the sixth-viewpoint image 60f, respectively.

Such typical 6-viewpoint stereoscopic image display panel is effective in some cases where a great number of people observe the images. However, such device is required to be structured to achieve light-ray separation in the spaces for 6-viewpoints at all times. Thus, compared to the case of the 2-viewpoint stereoscopic image display panel, the 3D resolution is decreased to ⅓ in the lateral direction. Therefore, when the 3D resolution in the vertical direction is adjusted in accordance with the decrease of the resolution in the lateral direction, the resolution as a whole is decreased to ⅑. This deteriorates the stereoscopic image quality greatly.

In this regard, the stereoscopic image display device 1 according to the first exemplary embodiment described by referring to FIG. 7 to FIG. 11 has the function for generating the images for 6-viewpoints and forms the stereoscopic regions as appropriate according to the position of the observer 100 by using each of the images, so that it is possible to give motion parallax effectively without decreasing the resolution unlike the above-described case.

While the cases of the stereoscopic image display using the 2-viewpoint stereoscopic image display panel and the 6-viewpoint image data are described above, the structure of the first exemplary embodiment is not limited to that. That is, it is also possible to employ the structure using a combination of the 2-viewpoint stereoscopic image display panel and 10-viewpoint image data, a combination of a 4-viewpoint stereoscopic image display panel and 12-viewpoint image data, or the like. With the cases of such structures, the effects same as those described above can be acquired as well.

Therefore, the structural content according to the first exemplary embodiment can be generally expressed as follows when the combinations of the stereoscopic image display panel and the image data are taken into consideration and the number of viewpoints of the stereoscopic image display panel is defined as N (N is a natural number of 2 or larger).

When the number of image data of each viewpoint to be inputted to the stereoscopic image display panel is defined as J in the stereoscopic image display panel that is structured so that the main lobe exists in the front side towards the display surface, it is desirable to satisfy a relation of "J>N" and, in addition, to satisfy a relation of "J=s×N (s is an integer of 2 or larger)" Note here that the front side towards the display surface means the direction of the observer 100 when the observer 100 is located on a normal line (referred to as a display normal line hereinafter) from the display surface having the center of the image display as the start point.

As in FIG. 5 which shows a state where the center line of the main lobe and the display normal line are almost consistent, it is so designed that those are almost consistent with each other in most of the cases of the even-number viewpoints (N=2, 4, 6, - - - ).

In the meantime, with the cases of the odd-number viewpoints (first neighboring viewpoint region: N=3, 5, 7, - - - ), the center line of the main lobe may be consistent with the display normal line or the center line may be shifted with respect to the display normal line at an angle corresponding to the viewpoint pitch or angles smaller than that.

In the latter case, when the angle formed roughly between the center line of the main lobe and the display normal line is within a prescribed angle (within an angle of a tan (e/OD) provided that the viewpoint pitch at the optimum viewing distance OD is e, it is desirable to set the value of the coefficient s as an odd number of 3 or larger in view of the symmetry between the main lobe and the side lobes. This makes it possible to have the side lobes appeared almost bilaterally symmetric with each other.

Meanwhile, when the angle formed between the center line of the main lobe and the display normal line is equal to or larger than the prescribed angle, the value of the coefficient s may simply be set as 2 or larger. It is not necessary to set any specific limitation.

The value of the coefficient s may be stored in advance to the memory 33 shown in FIG. 1 or a prescribed value may be loaded as the coefficient s via the external IF 34.

In any case, the image generation processing unit 30 is structured to generate images of J (=s×N) viewpoints based on the value of the coefficient s according to the viewpoint number N of the stereoscopic image display panel 10.

Further, it is also possible to provide an angle measuring function, which measures the angle formed between the center line of the main lobe and the display normal line based on the positional information, to the relative position calculating unit 40 or the image generation processing unit 30 and further to provide a comparing/setting function, which compares the formed angle with a tan (e/OD) and sets the coefficient s as an odd number of 3 or larger when the angle is equal to or smaller than a tan (e/CD), to the image generation processing unit 30. This makes it possible to have the side lobes appeared almost bilaterally symmetric with each other under a specific condition.

For generating the images, there are various methods such as a method with which cameras for the number of viewpoints are disposed virtually from the three-dimensional polygon data stored in the data accumulation unit 32 and real-time rendering is performed by the arithmetic calculator 31, a method with which images for the number of viewpoints are generated from CZ data, etc.

When generating the images, a preset method may be used by the image generation processing unit 30 among each of those kinds of methods or a method may be selected as appropriate according to the use environment and external signals. Further, it is also possible to employ a structure with which images for J-viewpoints are generated in advance by the image generation processing unit 30 and those are saved in the data accumulation unit 32.

This makes it possible to give motion parallax as multi-viewpoints while maintaining the high resolution with smaller number of viewpoints.

Further, in a case where the viewpoint number N is 3 or larger, the image data to be outputted to the target viewpoint region may be updated according to the moving direction of the observer 100.

Now, FIG. 13 shows the relation between the light-ray separation state and the position of the observer when a 3-viewpoint (the viewpoint number N=3) stereoscopic image display panel is used as the stereoscopic image display panel 10. In FIG. 13, the viewpoint regions 50*a*, 51*a*, 52*a* as the first-viewpoint regions, the viewpoint regions 50*b*, 51*b*, 52*b* as the second-viewpoint regions, and the viewpoint regions 50*c*, 51*c*, 52*c* as the third-viewpoint regions are shown as the viewpoint regions formed by corresponding to the position of the observer, and a position 110*a* and a position 110*b* are shown as the positions of the observer.

Further, FIG. 14 shows an example of the image data inputted to each of the viewpoint regions via the 3-viewpoint stereoscopic image display panel 10 in FIG. 13. In FIG. 14, B1, B2, B3, B4, B5, B6, B7, B8, B9, - - - are shown as the image data for each of the viewpoints, and the size of faces of "5" and size of the faces of "3" of the dices are different for each of the viewpoint images as shown in FIGS. 3 and 7. That is, as shown in FIG. 14, employed is the structure with which the face of "5" becomes gradually smaller and the face of "3" becomes gradually larger from B1 towards B9.

The method for generating the images shown in FIG. 14 is basically the same as the method described by referring to FIG. 8. That is, the cameras for each of the viewpoints according to the number of image data are disposed substantially in parallel to the x-axis, and a 3D object is captured with those to generate the images.

Further, FIG. 15 and FIG. 16 show the relation between the viewpoint regions where the left and right eyes of the observer are located and the parallax image data inputted to the first-, second-, and third-viewpoint regions regarding two cases where the observer moves from the position 110a to the position 110d (FIG. 13: ←) and where the observer moves from the position 110d to the position 110a (FIG. 13: →).

FIG. 15 is a table showing a case where the observer moves from the position 110a towards the minus side (left side) of the x-axis direction.

First, a state where the observer is at the position 110a is defined as (A). In the state of (A), the viewpoint region where the left eye of the observer is located is 50b, and the viewpoint region where the right eye is located is 50c. Regarding the image data, the image data B6 is inputted to the viewpoint region 50b, and the image data B7 is inputted to the viewpoint region 50c. The image data B5 or B8 is inputted to the viewpoint region 50a where neither the left eye nor the right eye is located.

Next, a state where the left eye of the observer is located in the viewpoint region 50a and the right eye is located in the viewpoint region 50b, respectively, is defined as (B), and it is assumed that the observer moves from the state of (A) to the state of (B). In the state of (B), the image data B5 is inputted to the viewpoint region 50a, and the image data B6 is inputted to the viewpoint region 50b. Although not shown in FIG. 15, if the observer moves from the state of (A) to the plus side (right side) of the x-axis direction and the viewpoint region where the right eye of the observer is located becomes 52a, the image data B8 is inputted to the viewpoint region 52a.

In the state of (B), it seems that there is naturally no problem even if input of the image data B7 is maintained in the viewpoint region 51c where neither the left eye nor the right eye is located.

However, in the first exemplary embodiment, the display controller 24 employs a structure with which the image data for the viewpoint region 51c where the left eye of the observer may possibly be located by the move of the observer towards the direction continued from the move from (A) to (B) (the left side) is switched in advance to the image data B4 that corresponds to the state of (C).

More specifically, the image generation processing unit 30 has an image data switching processing function (not shown) which estimates a next moving position of the observer based on the moving direction of the observer shown in the chronological positional information from the relative position calculating unit 40 and the information from the sensor (not shown) within the observer position measuring unit 45, and outputs the image data (viewpoint images) corresponding to the estimated position to the display panel driving circuit 21.

That is, in a case where the stereoscopic image display panel 10 separates the parallax image towards three or more viewpoints (N≥3), the image generation processing unit 30 uses the image data switching processing function to select the viewpoint image for the viewpoint region where neither the left eye nor the right eye of the observer is located according to the moving direction of the observer and outputs it towards the stereoscopic image display panel 10.

In the state of (B), for example, the viewpoint region in a relation such as the viewpoint region 51c with respect to the viewpoint region 50a is referred to as a neighboring viewpoint region.

As in the case described above, when the observer moves from the state of (B) to the state of (C) (in a state where the left eye of the observer is located in the viewpoint region 51c and the right eye is located in the viewpoint region 50a, respectively), a state where the image data B4 is inputted to the viewpoint region 51c where the left eye of the observer is located is maintained in the state of (C) as shown in FIG. 15.

Further, by taking the moving direction form (B) to (C), the display controller 24 employs a structure with which the image data for the viewpoint region 51b where the left eye of the observer may possibly be located by the continuous move of the observer towards the same direction is switched in advance to the image data B3 that corresponds to the state of (D).

The display controller 24 also repeats those processing actions in the following states of (D) and (E). Through employing such structure, it becomes possible to present stereoscopic images with an extremely small amount of uncomfortableness felt even in a case where the moving speed of the observer is high.

In FIG. 15, each image data with an underline is the image data on which the switching processing is performed based on the estimation result of the moving position of the observer.

FIG. 16 shows a case where the observer moves from the position 110d towards the plus side (right side) of the x-axis direction. Further, in a state of (E) where the observer is located at the position 110d, the image data B3 is inputted to the viewpoint region 51b where the right eye of the observer is located.

Considering the moving direction from (E) to (D) (right side), the state where the right eye of the observer is located in the first region by the continuous move in the same direction is the state of (C). Thus, in the first exemplary embodiment, it is structured to switch in advance the image data for the first-viewpoint region (the viewpoint region 52a and the like) to the image data B5 that corresponds to the state of (C) when the observer moves from the state of (E) to the state of (D).

When the observer moves from the state of (D) to the state of (C), a state where the image data B5 is inputted to the viewpoint region 50a where the right eye of the observer is located is maintained and that state is maintained also in the state of (C).

Considering the moving direction from (D) to (C) (right side), the state where the right eye of the observer is located in the second-viewpoint region by the continuous move in the same direction is the state of (B). Thus, as in the case described above, it is structured to switch in advance the image data for the second-viewpoint region (the viewpoint region 50b and the like) to the image data B6 that corresponds to the state of (B).

Similarly, in the state of (B), by considering the moving direction (right side) from (C) to (B), it is also structured to switch in advance the image data for the viewpoint region 50c, in which the right eye of the observer may possibly be located due to the continuous move towards the same direction, to the image data B7 that corresponds to the state of (A).

That is, the display controller 24 also repeats those processing actions in the following states of (B) and (A). Through employing such structure, it becomes possible to present stereoscopic images with an extremely small amount of uncomfortableness felt even in a case where the moving speed of the observer is high.

In FIG. 16, each image data with an underline is also the image data on which the switching processing is performed based on the estimation result of the moving position of the observer.

Incidentally, the time required for the processing executed by the observer position measuring unit 45 and the relative position calculating unit 40 described by referring to FIG. 1 and the like is ideally desired to be close to 0 as much as possible. However, in practice, it takes 0.1 second or more for data transfer, calculation, and the like.

In such case, when outputting the image data from the image generation processing unit 30 based on the signals (positional information) from the relative position calculating unit 40, there is a possibility that the observer is not remaining at the measured position. Particularly when the moving speed of the observer is high, the left and right eyes of the observer may be located out of the estimated viewpoint regions. Thus, in worst cases, a prescribed stereoscopic image may not be sensed.

In view of such issue, the first exemplary embodiment employs the structure with which the image data selected in advance by taking the moving direction of the observer into consideration is inputted in advance for the target viewpoint region as described above. Therefore, it is possible to give smooth motion parallax for the observer who is moving at a high speed without deteriorating the stereoscopic visibility, That is, as clearly shown in FIG. 15 and FIG. 16 in which an underline is applied to the image data, significant data according to the moving direction of the observer is inputted prior to the move of the observer. This makes it possible to present stereoscopic images without a sense of uncomfortableness even when the moving speed of the observer is high.

Then, FIG. 17 shows an example of the relation between the light-ray separation state and the observer when a 4-viewpoint (viewpoint number N=4) stereoscopic image display panel is employed as the stereoscopic image display panel 10. In FIG. 17, the viewpoint regions 50a, 51a, 52a as the first-viewpoint regions, the viewpoint regions 50b, 51b, 52b as the second-viewpoint regions, the viewpoint regions 50c, 51c, 52c as the third-viewpoint regions, the viewpoint regions 50d, 51d, 52d as the fourth-viewpoint regions are shown as the viewpoint regions formed by corresponding to the position of the observer, and the position 111a and the position 111b are shown as the positions of the observer.

Further, the parallax image data inputted to each of the viewpoint regions via the stereoscopic image display panel 10 will be described by referring to FIG. 14 as in the case of FIG. 13.

FIG. 18 and FIG. 19 show the relation between the viewpoint regions where the left and right eyes of the observer are located and the parallax image data inputted to the first-, second-, third-, and fourth-viewpoint regions regarding two cases where the observer moves from the position 111a to the position 111d (FIG. 17: ←) and where the observer moves from the position 111d to the position 111a (FIG. 17: →).

FIG. 18 is a table showing a case where the observer moves from the position 111a shown in FIG. 17 towards the minus side (left side) of the x-axis direction.

First, a state where the observer is at the position 111a is defined as (A). In the state of (A), the viewpoint region where the left eye of the observer is located is 50b, and the viewpoint region where the right eye is located is 50c.

Regarding the image data, the image data B6 is inputted to the viewpoint region 50b, and the image data B7 is inputted to the viewpoint region 50c. The image data B5 is inputted to the viewpoint region 50a where neither the left eye nor the right eye is located, and the image data B8 is inputted to the viewpoint region 50d, respectively.

Even in a case where the observer moves from (A) to (B), the image data B5 is continuously inputted to the viewpoint region 50a. That is, as in the case of the state of (A), the image data B5 is inputted to the viewpoint region 50a where the left eye of the observer is located in the state of (B).

Further, when the observer moves from (A) to (B), it seems that there is no problem even if input of the image data B8 and B7 is maintained for the viewpoint regions 51d and 51c where neither the left eye nor the right eye is located. However, as in the case of the 3-viewpoint stereoscopic image display panel described above (FIG. 13), employed is a structure with which, by taking the moving direction (left side) from (A) to (B) into consideration, the image data for the viewpoint region 51d where the left eye of the observer may possibly be located by the continuous move of the observer towards the same direction is switched in advance to the image data B4 that corresponds to the state of (C).

In addition, in the stereoscopic image display device 1 according to the first exemplary embodiment which employs the 4-viewpoint stereoscopic image display panel, the display controller 24 selects and switches the image data for the viewpoint region 51c where the left eye of the observer may possibly be located due to the continuous move made further in the same direction according to the extent of the moving speed v1 from (A) to (B) at the same time as the above-described switching processing.

In the state of (B), for example, the viewpoint regions in a relation such as the viewpoint regions 51d, 51c with respect to the viewpoint regions 50a are referred to as a first neighboring viewpoint region and a second neighboring viewpoint region, respectively.

More specifically, the image generation processing unit 30 has an image data selection processing function (not shown) which generates in advance image data for the viewpoint region where the eyes of the observer may possibly be located due to the continuous move made further based on the chronological positional information from the relative position calculating unit 40 and the information regarding the moving speed of the observer from the sensor (not shown) within the observer position measuring unit 45, and outputs the image data (viewpoint images) corresponding to the estimated position to the display panel driving circuit 21.

That is, in a case where the stereoscopic image display panel 10 separates the parallax image towards four or more viewpoints (N≥4), the image generation processing unit 30 uses the image data selection processing function to select the parallax image for the viewpoint region where neither the left eye nor the right eye of the observer is located according to the moving direction and the moving speed of the observer, and outputs it towards the stereoscopic image display panel 10.

The image data selection processing function is a function which selects the image data by comparing the moving speed v1 with a threshold value vth set in advance. More specifically, it is structured to select the image data B7 when the moving speed v1 is equal to or smaller than the threshold value vth (v1≤vth), and to select the image data B3 when the moving speed v1 is larger than the threshold value vth (v1>vth).

That is, the image data B7 is maintained when the moving speed v1 is equal to or smaller than the threshold value vth, and the image data is switched to B3 when the moving speed v1 is larger than the threshold value vth.

As shown in FIG. 18 by applying underlines, each of the structural members within the display controller 24 is structured to function effectively to execute the same processing actions even when the observer moves from (B) to (C) and further to (D) and (E). This makes it possible to present the stereoscopic images giving no sense of uncomfortableness, which corresponds to the observer whose moving speed is high.

FIG. 19 is a table showing a case where the observer moves from the position 111d shown in FIG. 17 towards the plus side (right side) of the x-axis direction.

First, a state where the observer is at the position 111d is defined as (E). In the state of (E), the viewpoint region where the left eye of the observer is located is 51b, and the viewpoint region where the right eye is located is 51c. Regarding the image data, the image data B2 is inputted to the viewpoint region 51b, and the image data B3 is inputted to the viewpoint region 51c. The image data B1 and B4 are inputted, respectively, to the viewpoint regions 51a and 51d where neither the left eye nor the right eye is located.

When the observer moves from (E) to (D), the image data B5 is continuously inputted from the state of (E) to the viewpoint region 51d where the right eye is located.

At the time of this move, as in the case described by referring to FIG. 18, employed is a structure with which, by taking the moving direction (right side) from (E) to (D) into consideration, the image data for the viewpoint region 50a where the left eye of the observer may possibly be located by the continuous move of the observer towards the same direction is switched in advance to the image data B5 that corresponds to the state of (C) and, at the same time, the image data for the viewpoint region 51b where the left eye of the observer may possibly be located by the continuous move of the observer made further towards the same direction is selected and switched according to the extent of a moving speed v2 from (E) to (D) (the image data selection processing function).

That is, as in the case described above, the display controller 24 is structured to maintain the image data B2 when the moving speed v2 is equal to or smaller than the threshold value vth (v2≤vth) and to select and switch to the image data B6 when the moving speed v2 is larger than the threshold value vth (v2>vth) by the image data selection processing function (not shown) provided within the image generation processing unit 30.

As shown in FIG. 19 by applying underlines, each of the structural members within the display controller 24 is structured to function effectively to execute the same processing actions even when the observer moves from the state of (D) to the state of (C) and further moves to (B) and (A). This makes it possible to present the stereoscopic images giving no sense of uncomfortableness, which corresponds to the observer whose moving speed is high.

Looking into FIG. 18 and FIG. 19, it can be found that the image data with underlines (viewpoint regions regarding the underlined image data) vary depending on the directions to which the observer moves. This shows that the stereoscopic image display device 1 of the first exemplary embodiment can present flexible image data according to the moving direction and the moving speed of the observer.

As described, through employing the structure with which corresponding image data is inputted in advance not only for the next viewpoint region (the first neighboring viewpoint region) where the left eye of the observer moves but also for the next but one viewpoint region (the second neighboring viewpoint region) where the observer may possibly be located by the farther move in a case where the moving speed of the observer is high, it becomes possible to present the stereoscopic images with a sense of a still smaller amount of uncomfortableness.

As described above by referring to FIG. 17 and the like, the processing action for selecting the image data according to the moving direction and the moving speed of the observer is the structural content applied when the viewpoint number N is 4 or larger. The target viewpoint regions (selected input target regions) when selecting and inputting image data by the image data selection processing function (not shown) are the first neighboring viewpoint, the second neighboring viewpoint, - - - , and the (N−2)-th neighboring viewpoint by having the viewpoint region of either the left or right eye as the moving direction is taken as the start point.

That is, in a case where the viewpoint number N is 4 or larger (N≥4), the image generation processing unit 30 selects the first to the (N−2)-th neighboring viewpoints by having, as the start point, the viewpoint region where the observer is located right before the move as the viewpoint region where neither the left nor the right eye of the observer is located by using the image data selection processing function.

Further, while the cases of using a single piece of image data for each viewpoint region is used for explanations presented heretofore, it is also possible to use two or more pieces of image data for each viewpoint region.

As an example thereof, a case of using four pieces of image data for each viewpoint region for a 2-viewpoint stereoscopic image display panel will be described.

Here, a case where the position of the observer 100 is at FIG. 9C will be described first by referring to FIG. 6, FIG. 9, FIG. 14, and FIG. 10 that is an enlarged view of FIG. 9C.

FIG. 10 that is an enlarged view of FIG. 9C shows a state where the first-viewpoint region 51a where the left eye is located is divided into four in the x direction to provide first-viewpoint sub-regions 51aa, 51ab, 51ac, and 51ad.

In accordance with the positions where the left eye of the observer 100 moves from −x towards +x direction (plus direction of the x-axis), one piece of image data selected from the image data B1, B2, B3, and B4 shown in FIG. 14 is displayed for each of the first-viewpoint sub-regions. Specifically, the image data B1 is displayed when the left eye of the observer 100 is located in 51aa, the image data B2 is displayed when the left eye is located in 51ab, the image data B3 is displayed when the left eye is located in 51ac, and the image data B4 is displayed when the left eye is located in 51ad.

Similarly, the second-viewpoint region where the right eye is located is divided into four in the x-axis direction (not shown), and one piece of image data selected from the image data B5, B6, B7, and B8 shown in FIG. 14 is displayed for each of the second-viewpoint sub-regions (not shown) in accordance with the positions where the right eye of the observer 100 moves from −x towards +x direction.

Those image data B1 to B8 are generated by the image generation processing unit 30 shown in FIG. 1, and the image generation processing unit 30 output those to the display panel driving circuit 21 as the 3D data.

Then, when the observer 100 moves to the position shown in FIG. 9B, as in the case of FIG. 9C described above, the image data B5, B6, B7, and B8 shown in FIG. 14 are displayed for each of the sub-regions (not shown) of the second-viewpoint region 51b where the left eye is located and image data B9, B10, B11, and B12 shown in FIG. 14 (B10 and thereafter are not shown) are displayed for each of the sub-regions (not shown) of the first-viewpoint region 50a where the right eye is located, respectively.

Further, when the observer 100 moves to the position shown in FIG. 9A, as in the case of FIG. 9C described above, the image data B9, B10, B11, and B12 shown in FIG. 14 (B10 and thereafter are not shown) are displayed for each of the sub-regions (not shown) of the first-viewpoint region 50a where the left eye is located and image data B13, B14, B15, and B16 (not shown) shown in FIG. 14 are displayed for each of the sub-regions (not shown) of the second-viewpoint region 50b where the right eye is located, respectively.

As described, in a case where the four pieces of image data are used for each viewpoint region, the four pieces of image data are treated as a single piece of image data group (e.g., image data enclosed within a rectangle with a broken line in FIG. 14). Thereby, it is possible to achieve the processing content in which the image data group is switched according to the moving direction of the observer 100 when the viewpoint number N is 3-viewpoints, and the image data group is switched according to the moving direction and the moving speed of the observer 100 when the viewpoint number N is 4-viewpoints or more. This makes it possible to present stereoscopic images in which a sense of uncomfortableness caused due to the move of the observer 100 is greatly eased.

While the case of treating the four pieces of image data as a single piece of image data group is described herein, the stereoscopic image display device 1 according to the first exemplary embodiment is not limited only to that. That is, it is also possible to employ a structure with which each of the viewpoint regions for the first viewpoint to fourth viewpoint regions is divided into four is taken as the apparent viewpoint regions and the image data to be displayed as appropriate on the apparent viewpoint regions are selected and switched according to the moving direction and the moving speed of the observer 100. This makes it possible to present stereoscopic images in which a sense of uncomfortableness is eased more for the move of the observer.

As the number of the image data for each viewpoint region is increased, extremely smooth motion parallax can be acquired. When the number of image data is increased, it is desirable to increase the capacity of the data accumulation unit 32 and the memory 33 within the display controller 24 accordingly to increase the speed of the processing capacity of the arithmetic calculator 31.

For example, in a case where twenty pieces of image data are used for each viewpoint region with the 2-viewpoint stereoscopic image display panel, it is possible to acquire motion parallax which corresponds to a 120-viewpoint stereoscopic image display panel even when only the main lobe and the side lobes on both sides thereof are considered.

Note here that 3D resolution of the 120-viewpoint stereoscopic image display panel generally becomes 1/60 of that of the 2-viewpoint stereoscopic image display panel, so that the 3D image quality is deteriorated extremely.

However, with the structure of the first exemplary embodiment, it is possible to achieve both high 3D resolution and smooth motion parallax as described above.
(Explanations of Operations)

Next, operation contents of the stereoscopic image display device 1 described by referring to FIG. 1 to FIG. 19 will be described briefly based on a flowchart shown in FIG. 20.

First, the observer position measuring unit 45 measures the position of the observer 100 by using a camera provided to itself, and outputs the measurement result (FIG. 20: S101).

Then, the relative position calculating unit 40 calculates the relative position of the left eye 101 and the right eye 102 with respect to the reference point (the center of the image display herein) set in advance on the stereoscopic image display panel 10 based on the measurement result acquired from the observer position measuring unit 45, and outputs the calculation result (positional information) (FIG. 20: S102).

Then, the image generation processing unit 30 generates and outputs 3D data and control signals based on the positional information acquired from the relative position calculating unit 40 (FIG. 20: S103).

Here, the image generation processing unit 30 in a case where the 3-viewpoint stereoscopic image display panel is employed estimates the next moving position of the observer based on the information regarding the moving direction of the observer, generates image data for the viewpoint region where the both eyes of the observer are not located by corresponding to the estimated position, and outputs the image data to the display panel driving circuit 21 (the image data switching processing function) (FIG. 20: S103).

Further, the image generation processing unit 30 in a case where the 4-viewpoint stereoscopic image display panel is employed generates in advance image data for the viewpoint region where the both eyes of the observer are not located based on the information regarding the moving speed of the observer, and outputs the image data to the display panel driving circuit 21 (the image data switching processing function) (FIG. 20: S103).

Subsequently, the display panel driving circuit 21 drives the display panel based on the 3D data acquired from the image generation processing unit 30, and the image distribution control circuit 22 controls the actions of the light-ray separating module 12 according to the control signals from the image generation processing unit 30 (FIG. 20: S104).

It is also possible to put the execution content of each of the above-described steps S101 to S104 (FIG. 20) into programs and have a series of each of the control programs achieved by a computer.

Effects and the Like of First Exemplary Embodiment

In the first exemplary embodiment, the structure for expanding the number of viewpoints determined according to the device structure is employed. Thus, it is possible to provide motion parallax without deteriorating the resolution.

Further, with the stereoscopic image display device which executes image control according to the moving direction and the moving speed of the observer, it becomes possible to provide stereoscopic images with a smaller amount of uncomfortableness.

Furthermore, even when the stereoscopic image display panel of small number of viewpoints is employed, the image switching processing using a plurality of viewpoint images can be executed as appropriate as described above. Therefore, it is possible to project the stereoscopic images of high resolution with smooth motion parallax.

Further, since the relative position calculating unit 40 calculates the relative position of each of the both eyes of the observer based on the measurement result from the observer position measuring unit 45, and the image generation processing unit 30 generates and outputs significant images and control signals based on the calculation result, the stereoscopic image display device according to the first exemplary embodiment can generate and display significant parallax images which correspond to the position of the observer.

As an exemplary advantage according to the invention, the present invention makes it possible to provide in particular a stereoscopic image display device and a terminal device, which generate and display significant parallax images corresponding to the position of the observer.

Second Exemplary Embodiment

A second exemplary embodiment of the image display device according to the present invention will be described by referring to FIG. 21 to FIG. 26. Same reference numerals are used for the structural members and the like equivalent to those of the first exemplary embodiment described above.

First, FIG. 21 shows a state of light-ray separation done by a 2-viewpoint stereoscopic image display panel 10 according to the second exemplary embodiment. As in the case of FIG. 5 and the like described above, FIG. 21 is a sectional view of a zx plane from the front direction of the y-axis (see FIG. 1).

When it is defined that the distance between the both eyes of the observer is d (d=65 mm in general) and the viewpoint pitch between the first-viewpoint region and the second-viewpoint region neighboring thereto is e, it is generally considered to satisfy a relation of "d≤e" for securing a prescribed stereoscopic region in the 2-viewpoint stereoscopic image display panel. Each of the members is structured on the assumption of that.

However, as shown in FIG. 21, it is a feature of the 2-viewpoint stereoscopic image display panel 10 herein that the relation between d that is the distance between the both eyes of the observer and the viewpoint pitch e between the first-viewpoint region 50a and the neighboring second-viewpoint region 50b or 51b satisfies "d>e". Other structural contents are the same as the state of FIG. 9A of the first exemplary embodiment described above.

For describing the viewpoint pitch in terms of the 3D crosstalk, the 3D crosstalk characteristic in the center part of the display surface is shown in FIG. 22. In this case, the lateral axis is the x-axis direction at the optimum viewing distance (OD: see FIG. 5), and the longitudinal axis is the values of the 3D crosstalk (3D crosstalk values).

While the lateral axis is defined as the extent in the x-axis direction (distance in the x-axis direction) in the second exemplary embodiment, the lateral axis regarding the 3D crosstalk characteristic may be structured to show the viewing angles calculated with a tangent of the extent in the x-axis with respect to the optimum viewing distance.

The 3D crosstalk is defined as a leakage and mixture amount of an image of the other eye for each of the left and right eyes. Therefore, a state of 100% crosstalk means a state where a left-eye image and a right-eye image are mixed in a ratio of 1:1. Further, the viewpoint pitch and the x-axis range between the points at which the 3D crosstalk becomes 100% are equivalent, so that those are shown with a same reference code "e" in FIG. 22.

When the value of the 3D crosstalk is increased, a sense of stereopsis is lost and sense of fatigue and other unpleasant influences may be given to the observer. Thus, it is desirable to set the value of the crosstalk (crosstalk amount) to be equal to or less than a reference value CT1 that is set in advance. In general, the reference value CT1 is set to be equal to or less than 10%. Further, when it is set to be equal to or less than 5%, the above-described issues can be lightened more effectively.

Further, out of a viewing field range defined by the reference value CT1, FIG. 22 shows a part thereof by defining a low 3D crosstalk range as f and a high 3D crosstalk range as c. When the left and right eyes of the observer are within the low 3D crosstalk range f, the observer 100 can visually recognize a fine stereoscopic image.

70a and 72a shown with a solid line correspond to the first-viewpoint regions 50a and 52a shown in FIG. 21, respectively, and 70b and 71b shown with a broken line correspond to the second-viewpoint regions 50b and 51b shown in FIG. 21, respectively.

When the value of the distance d between the both eyes exceeds the value of the viewpoint pitch (e+f), the observer 100 cannot visually recognize a stereoscopic image, which means that the so-called stereoscopic region does not exist.

Therefore, the second exemplary embodiment is structured to satisfy the relation of "(e+f)>d>e".

FIG. 23 shows the viewpoint regions (including the crosstalk region) where the left and right eyes of the observer are located when the observer moves from the state of (A) shown in FIG. 22 to the minus side of the x-axis direction, i.e., when the observer moves from the state of (A) to each of the states shown in (B), (C), and (D) in this order.

Further, FIG. 24 shows a corresponding relation between the viewpoint regions where the left and right eyes of the observer are located and the image data of the first-viewpoint region and the second-viewpoint region. Here, shown is a case where the image data shown in FIG. 7 are used.

Further, as a comparative example, FIG. 25 and FIG. 26 show the corresponding relation and the like as those described above in a case of using the stereoscopic image display panel satisfying the relation of "d<e".

"2", "3", and "4" shown in the section of the image data (within parentheses) in FIG. 21, or FIG. 24 and FIG. 26 correspond to the second-viewpoint image 60b, the third-viewpoint image 60c, and the fourth-viewpoint image 60d, respectively. Further, in the section of the viewpoint regions (within parentheses) in FIG. 24 and FIG. 26, shown are the ranges where each of the both eyes of the observer is located (low 3D crosstalk range: f, high 3D crosstalk range: c).

Comparing FIG. 23 with FIG. 25, the both are consistent in respect that both of the left and right eyes are in a state of entering the low 3D crosstalk region in a case where the position of the observer is (A) or (D) and that one of the left and right eyes enters in the low 3D crosstalk region and the other is in a state entering the high 3D crosstalk region in a case where the position of the observer is (B) or (C).

However, when the observer moves from (A) to (B), there is a difference in respect that the high 3D crosstalk region is generated from the left eye in the case of "d>e" (FIG. 23) as in the second exemplary embodiment and that the high 3D crosstalk region is generated from the right eye in the case of "d<e" (FIG. 25) as in the comparative example.

This is the same for the case where the observer moves from (B) to (C).

In the case of (B) or (C), the image data projected in the first-viewpoint region and the second-viewpoint region are determined depending on which of the left and right eyes of the observer exists in the low 3D crosstalk region f after the move based on the state before the observer moves. That is, in such state, the display controller 24 is structured to select the image data by giving priority to the sense of the eye that is located in the low 3D crosstalk region f (an image data priority selecting function).

For example, as shown in FIG. 24, in the case of (A), the left eye exists in 70a that is the first-viewpoint region and the right eye exists in 70b that is the second-viewpoint region. As the image data, 60c that is the third-viewpoint image is projected to the first-viewpoint region, and 60d that is the fourth-viewpoint image is projected to the second-viewpoint region.

When the observer moves from this state to the state of (B), the left eye comes to exist in the high 3D crosstalk region c where the first-viewpoint region 70a and the second-viewpoint region 71b are mixed, and the right eye comes to exist in 70b that is the second-viewpoint region. In that case, the priority is given to the sense of the right eye as described above, so that the display controller 24 uses 60d that is the fourth-viewpoint image same as the state of (A) for the second-viewpoint region and uses the third-viewpoint image 60c same as the state of (A) also for the first-viewpoint region.

Then, when the observer moves from (B) to (C), the left eye comes to exist in 71b that is the second-viewpoint region and the right eye comes to exist in the high 3D crosstalk region c where the first-viewpoint region 70a and the second-viewpoint region 70b are mixed. In that case, as in the above-described case, the priority is given to the sense of the left eye as described above, so that the display controller 24 switches the image used for the second-viewpoint region to the second-viewpoint image 60b different from the state of (B), and continuously uses the third-viewpoint image 60c for the first-viewpoint region.

The second-viewpoint image switching processing is the processing by taking the move of the observer in the minus direction of the x-axis into consideration. That is, it is the processing for forming a stereoscopic region with the third-viewpoint image 60c maintained in the first-viewpoint region (for avoiding a reverse view state) when the observer comes to be in the state of (D).

Thereby, the viewpoint image same as that of the state of (C) can be used as it is in both the first-viewpoint region and the second-viewpoint region, when the observer moves from (C) to (D) and the left eye comes to exist in 71b that is the second-viewpoint region and the right eye comes to exist in the first-viewpoint region 70a.

That is, the second exemplary embodiment is structured to switch the image data only once in the second-viewpoint region while the observer moves from (A) to (D).

The case shown in FIG. 26 is the same. That is, when the observer moves from (A) to (B), the left eye comes to exist in 70a that is the first-viewpoint region, and the right eye comes to exist in the high 3D crosstalk region c where the first-viewpoint region 70a and the second-viewpoint region 71b are mixed. Thus, the priority is given to the sense of the left eye, so that the third-viewpoint image 60c same as the state of (A) is used for the first-viewpoint region and the fourth-viewpoint image 60d same as the state of (A) is used also for the second-viewpoint region.

Then, when the observer moves from (B) to (C), the left eye comes to exist in the high 3D crosstalk region c where the first-viewpoint region 70a and the second-viewpoint region 71b are mixed, and the right eye comes to exist in 70a that is the first-viewpoint region. Thus, the priority is given to the sense of the right eye, switching processing which takes the move of the observer in the minus direction of the x-axis into consideration is executed with which the image used for the second-viewpoint region is switched to the second-viewpoint image 60b and the third-viewpoint image 60c is used as it is for the first-viewpoint region.

As described, in both of the cases satisfying "d>e" (the second exemplary embodiment) and satisfying "d<e" (comparing example), image data is switched in one of the viewpoint regions when the observer moves from (B) to (C).

Incidentally, in a case of "d=e", the states of (B) and (C) in FIG. 26 are mixed. Thus, when the observer moves from the state of (A) to that state, both the left and right eyes come to exist in the high 3D crosstalk region and the state directly transits to the state of (D) when the observer further moves therefrom.

That is, in the state of (B)+(C), neither the left eye nor the right eye enters the low 3D crosstalk region. Thus, an image with a sense of uncomfortableness is inputted momentarily so that the use of the stereoscopic image display panel employing a structure satisfying "d=e" is not considered to be preferable.

As described, with the use of the structure of the second exemplary embodiment, it is possible to execute the image switching processing in the case of "d>e" in the same manner as in the case of "d<e". As a result, a still larger number of viewpoint regions can be provided when the extent of the visible range in the x-axis is constant, so that smooth motion parallax can be presented.

Effects and the Like of Second Exemplary Embodiment

In the second exemplary embodiment, the stereoscopic image display panel is structured in such a manner that the viewpoint pitch e between the neighboring viewpoint regions becomes smaller than the distance d between both eyes of the observer by taking the existence of the low 3D crosstalk range f and the high 3D crosstalk range c into account. That is, significant light-ray separation can be achieved herein by using a small pitch, thereby making it possible to present smooth motion parallax even with 2-viewpoints.

Other structures and operations are the same as those of the first exemplary embodiment described above, and other operating effects to be generated thereby are also the same. In a case where two or more image data are used for each viewpoint region in particular, still smoother motion parallax can be presented.

Third Exemplary Embodiment

A third exemplary embodiment of the image display device according to the third exemplary embodiment will be described by referring to FIG. 27 and FIG. 29.

It is the feature of the third exemplary embodiment to employ a structure of a stereoscopic image display device of 3-viewpoints or more in which a relation of "ex(N−2)≤d≤ex(N−1)" is satisfied, where the number of viewpoints is N (N is a natural number of 2 or larger), each viewpoint pitch is e, and the distance between both eyes of the observer is d. Note here that same reference numerals are used for the structural members and the like same as those of the first exemplary embodiment described above.

First, FIG. 27 shows a state of light-ray separation done by a 4-viewpoint stereoscopic image display panel 10 as an example of the third exemplary embodiment of the present invention.

As shown in FIG. 27, on the display surface side of the stereoscopic image display panel 10, there are regions for outputting image data for 4-viewpoints, which are constituted with the first-viewpoint regions 50a, 51a, 52a, - - -, the second-viewpoint regions 50b, 51b, 52b, - - -, the third-viewpoint regions 50c, 51c, 52c, - - -, and the fourth-viewpoint regions 50d, 51d, 52d, - - -. Further, the main lobe 90 is constituted with 50a, 50b, 50c, and 50d, the side lobe 91 is constituted with 51a, 51b, 51c, and 51d, and the side lobe 92 is constituted with 52a, 52b, 52c, and 52d, respectively.

A case where the left eye of the observer exists in the side lobe 91 and the right eye exists in the main lobe 90 is a reverse view region as in the case described in the first exemplary embodiment.

The above-described relation of "ex(N−2)≤d≤ex(N−1)" in the case of 4-viewpoints (N=4) shown in FIG. 27 is a relation of "2e≤d≤3e".

Next, the relation between the positions of the observer and each of the viewpoint regions is shown in FIG. 28, and a case where the observer moves from the position 112a to the position 112d will be described herein.

First, when the observer exists in the position 112a, the left eye of the observer exists in the first-viewpoint region 50a and the right eye of the observer exists in the third-viewpoint region 50c or the fourth-viewpoint region 50d according to the relation of "ex(N−2)≤d≤ex(N−1)" described above.

As the image data inputted to each viewpoint in this case, the image data shown in FIG. 14 that is referred in the first exemplary embodiment is employed.

FIG. 29 is a table which shows the corresponding relation between the viewpoint regions where the left and right eyes of the observer are located and the image data used for each of the viewpoint regions in a case where the observer moves from the position 112a towards the position 112d successively.

As shown in FIG. 29, in a state of (A) where the observer is in the position 112a, the image B5 is used for the first-viewpoint region 50a, the image B6 is used for the second-viewpoint region 50b, the image B7 is used for the third-viewpoint region 50c, the image B8 is used for the fourth-viewpoint region.

Therefore, fine stereoscopic images can be visually recognized in this state.

Next, a case where the left eye of the observer moves to the fourth-viewpoint region 51d of the side lobe 91 (state of (B) shown in FIG. 29) is investigated. In that state, the right eye of the observer exists in the second-viewpoint region 50b or the third-viewpoint region 50c as in the above-described case. This corresponds to the reverse view region described above. Thus, the third exemplary embodiment employs a structure with which the display controller 24 switches the image used for the fourth-viewpoint region 51d to B4 from B8 based on the observer position measurement information. Through employing such switching processing, it becomes possible to provide fine stereoscopic images also for the observer located in that place.

Similarly, a case where the left eye of the observer moves to the third-viewpoint region 51c of the side lobe 91 (state of (C) shown in FIG. 29) is investigated. In that state, the right eye of the observer exists in the first-viewpoint region 50a or the second-viewpoint region 50b. This corresponds to the reverse view region described above. Thus, the display controller 24 is structured to switch the image used for the third-viewpoint region 51c to B3 from B7 based on the observer position measurement information. Through employing such switching processing, it becomes possible to provide fine stereoscopic images also for the observer located in that place.

Similarly, a case where the left eye of the observer moves to the second-viewpoint region 51b of the side lobe 91 (state of (D) shown in FIG. 29) is investigated. In that state, the right eye of the observer exists in the fourth-viewpoint region 51d or the first-viewpoint region 50a. This corresponds to the side lobe 91 or the reverse view. In such case, the display controller 24 is structured to switch the image used for the second-viewpoint region 51b to B2 from B6 based on the observer position measurement information for allowing the observer to visually recognize finer stereoscopic images.

As described, through employing the structure which executes the image switching processing based on the observer position measurement information, it becomes possible to acquire smooth motion parallax by suppressing deterioration of the resolution even with a multi-viewpoint type stereoscopic image display device of small number of viewpoints.

Effects and the Like of Third Exemplary Embodiment

As described above, with the stereoscopic image display device according to the third exemplary embodiment, it becomes possible to acquire smooth motion parallax by suppressing deterioration of the resolution even with a multi-viewpoint type stereoscopic image display device of small number of viewpoints.

Other structures and operations are the same as those of the first exemplary embodiment described above, and other operating effects to be generated thereby are also the same. In a case where two or more image data are used for each viewpoint region in particular, smooth motion parallax can be presented.

Fourth Exemplary Embodiment

A fourth exemplary embodiment of the image display device will be described by referring to FIG. 30 to FIG. 43. In the first to third exemplary embodiments described above, the case where an image is optically separated for a single observing direction to project parallax images to the observer has been presented. However, in the fourth exemplary embodiment, a structure with which an image is optically separated for two observing directions to project parallax images to the observer is employed.

Note here that same reference numerals are used for the structural members and the like same as those of the first exemplary embodiment described above.

(Overall Structures)

FIG. 30 shows an example of a block diagram of a stereoscopic image display panel 210 according to the fourth exemplary embodiment.

The stereoscopic image display panel 210 includes: a display panel 211 in which pixels (not shown) are arranged in matrix; and a light-ray separating module 250 provided by being corresponded to each pixel on the display surface side of the display panel 211.

The stereoscopic image display panel 210 can provide stereoscopic image display in each of two states which are a first layout state where the x-axis direction is the horizontal direction and a second layout state where the y-axis direction is the horizontal direction. Further, the horizontal direction herein is defined as a substantially parallel direction with a straight line connecting between the left eye and the right eye of the observer, and it is the same in the explanations hereinafter.

Specific examples of a display controller 25, the stereoscopic image display panel 210, the display panel 211, and the light-separating module 250 shown in FIG. 42 to be described later are the same as the structural contents described in the first exemplary embodiment (the display controller 24, the stereoscopic image display panel 10, the display panel 11, and the light-ray separating module 12).

FIG. 31 shows an example of the layout relation regarding pixels 221 provided on the display panel and lens array elements 251 which constitute the light-ray separating module (lens array) 250.

As shown in FIG. 31A, the pixel 221 formed with 4×4 sub-pixels is constituted with four primary colors of a red sub-pixel 234, a blue sub-pixel 235, a green sub-pixel 236, and a white sub-pixel 237.

Further, the 4×4 sub-pixels provided in a single pixel 221 are arranged such that each of the primary colors does not overlap in both the x-axis direction and the y-axis direction.

Here, R1, R2, R3, R4 as the red sub-pixels 234, B1, B2, B3, B4 as the blue sub-pixels 235, G1, G2, G3, G4 as the green sub-pixels 236, and W1, W2, W3, W4 as the white sub-pixels 237 are arranged as in FIG. 31A so that each of the primary colors is not disposed to overlap with each other.

FIG. 31B shows a state where the pixels 221 shown in FIG. 31A are arranged in matrix. Each of the lens array elements 251 constituting the lens array 250 is disposed at a position corresponding to each pixel 221. Therefore, the stereoscopic image display panel 210 can distribute the light into the directions of 4-viewpoints both in the x-axis direction and the y-axis direction.

The pixels 221 and the lens array elements 251 are arranged in parallel with respect to the x-axis direction and the y-axis direction and at a same pitch, respectively.

The structures of the sub-pixels and the pixels according to the fourth exemplary embodiment shown in FIG. 31 can generally be expressed as follows by using the natural number M and N (natural number of 2 or larger) that is a multiple of M.

When sub-pixels constituted with M primary colors, the number of sub-pixels constituting each pixel is a square of N (N-viewpoints×N-viewpoints), and the remainder when N is divided by M is 0. Further, within each pixel, neighboring pixels for the two light-separating directions are not of a same color. Furthermore, within each pixel, the existence probability of the same color for the two light-separating directions is the same for all the M primary colors.

In addition, the layout pitches of the sub-pixels for the two light-separating directions are equivalent.

While a case where a single pixel is constituted with 4×4 sub-pixels is shown in FIG. 31. However, the structure is not limited only to that. For example, a display panel in which pixels each constituted with 3×3 sub-pixels are arranged in matrix, etc., can also be applied as well. Further, while primary colors of RGBW (red, green, blue, white) are used to describe the 4×4 sub-pixels, the colors are not limited only to those. For example, instead of RGBW, RGBY (red, green, blue, yellow), CMYW (cyan, magenta, yellow, white), or the like may be employed as well. Other than those, it is also possible to use fluorescent colors, pearl colors, interference colors as the primary colors.

In the structure of the 4×4 sub-pixels constituted with four primary colors shown in FIG. 31A, the image data shown in FIG. 14 referred in the first exemplary embodiment described above can be used.

Next, the relation between the input image and the sub-pixels will be described by referring to FIG. 32 which shows the sub-pixel structure in the first layout state.

Herein, the pixel 221 shown in FIG. 31 is functioned as a structure which is constituted with: a sub-pixel group 241 where sub-pixels W4, G4, B4, and R4 are disposed; a sub-pixel group 242 where sub-pixels B3, R3, G3, and W3 are disposed; a sub-pixel group 243 where sub-pixels G2, W2, R2, and B2 are disposed; and a sub-pixel group 244 where sub-pixels R1, B1, W1, and G1 are disposed.

That is, in a case of using the input images as shown in FIG. 14, first, signals corresponding to the fifth-viewpoint image B5 are inputted to the sub-pixel group 241, signals corresponding to the sixth-viewpoint image B6 are inputted to the sub-pixel group 242, signals corresponding to the seventh-viewpoint image B7 are inputted to the sub-pixel group 243, and signals corresponding to the eighth-viewpoint image B8 are inputted to the sub-pixel group 244, respectively.

At that time, it is possible to acquire such an effect that there is no difference generated in the number of display colors among each of the viewpoint images within a pixel since all of the sub-pixel groups 241 to 244 are constituted with the four primary colors.

Subsequently, the relation between each of the viewpoint images and the sub-pixels will be described by referring to FIG. 33 regarding the sub-pixel structure in the second layout state that is rotated clockwise by 90 degrees from the first layout state shown in FIG. 32. In FIG. 33, as in the case of FIG. 32, signals corresponding to the fifth-viewpoint image B5 are inputted to the sub-pixel group 245, signals corresponding to the sixth-viewpoint image B6 are inputted to the sub-pixel group 246, signals corresponding to the seventh-viewpoint image B7 are inputted to the sub-pixel group 247, and signals corresponding to the eighth-viewpoint image B8 are inputted to the sub-pixel group 248, respectively.

As described, the same numbers of parallax images (viewpoint images) are generated in the x-axis direction and the y-axis direction within each pixel, and the number of different colors of sub-pixels is equivalent within each viewpoint image. Thus, significant stereopsis can be achieved equivalently both in the first layout state and the second layout state.

Further, with such structure, the 3D resolution can be made equivalent for the first layout state and the second layout state regardless of the number of viewpoints.

Further, since the viewpoint number N is a multiple of M colors as the generally expressed above so that generation of color moiré can be suppressed. Note here that "color moiré" is unevenness in each color sensed when the observer shakes the viewing field angles in the layout directions. When "color moiré" occurs, the display quality is deteriorated greatly.

As the light-ray separating module 250, static optical elements and active optical elements can both be used. However, it is preferable to use active optical elements such as liquid crystal lens elements or liquid crystal barrier elements capable of separating light rays in the x-axis direction and the y-axis direction.

Incidentally, as shown in FIG. 34, through employing a structure with which each of the lens array elements 251 executes light-ray separation only in the x-axis direction (each direction on the zx plane) that is the light-ray separating direction and does not execute light-ray separation in the y-axis direction (each direction on the yz plane) orthogonal thereto for the structural example of the sub-pixel groups shown in FIG. 32, it is possible to avoid color cracking without depending on the separating angles. The state shown in FIG. 34 corresponds to the first layout state described above.

Each of the regions light-ray separated in the x-axis direction is as follows. That is, 50*a*, 51*a*, and 52*a* (not shown) are the first-viewpoint region corresponding to the sub-pixel group 241, 50*b*, 51*b* (not shown) and 52*b* are the second-viewpoint region corresponding to the sub-pixel group 242, 50*c*, 51*c*, and 52*c* (not shown) are the third-viewpoint region corresponding to the sub-pixel group 243, and 50*d*, 51*d*, and 52*d* (not shown) are the fourth-viewpoint region corresponding to the sub-pixel group 244.

In addition, the main lobe is constituted with 50*a*, 50*b*, 50*c*, and 50*d*. A combination of 51*a*, 51*b*, 51*c*, and 51*d* or a combination of 52*a*, 52*b*, 52*c*, and 52*d* correspond to the side lobe. The light rays 59*a*, 59*b*, 59*c*, and 59*d* shown in the y-axis direction are not separated as shown in the drawing.

Further, also in the second layout state (corresponds to the structural example of the sub-pixel group shown in FIG. 33) in which the y-axis direction is the horizontal direction, each of the lens array elements 251 is structured in such a manner that light ray is separated only in the y-axis direction but not in the x-axis direction.

Therefore, with the structure of the fourth exemplary embodiment, it becomes possible to avoid color cracking without depending on the separating angles on both of the layout states. Further, it is possible to suppress such inconvenience that the color moiré tends to become actualized as the separating angle is increased. That is, this structure is an effective means for improving the visibility.

Next, as the state where the observer moves along the x-axis direction from a state of being in a position 113*a* shown in FIG. 34, the 3D crosstalk characteristic in the center part of the display surface of the stereoscopic image display panel 210 is shown in FIG. 35.

The details regarding the 3D crosstalk characteristic are the same as the content described by referring to FIG. 23 and the like in the second exemplary embodiment. Further, 70*a* and 72*a* correspond to the first-viewpoint regions 50*a* and 52*a* shown in FIG. 34, respectively, 70*b* corresponds to the second-viewpoint region 50*b* shown in FIG. 34, 70*c* and 71*c* correspond to the third-viewpoint regions 50*c* and 51*c* shown in FIG. 34, respectively, and 70*d* and 71*d* correspond to the fourth-viewpoint regions 50*d* and 51*d* shown in FIG. 34, respectively.

In FIG. 35, the x-axis direction in the optimum viewing distance is taken on the lateral axis, and the values of the 3D crosstalk are taken on the longitudinal axis as in the case of FIG. 23. Similarly, the lateral axis regarding the 3D crosstalk characteristic may be shown as the viewing field angles calculated by a tangent in the value of the x-axis with respect to the optimum viewing distance.

Here, FIG. 36 shows the corresponding relation between the viewpoint regions where the left and right eyes of the observer are located and the image data for the first-viewpoint region to the fourth-viewpoint region in a case where the observer moves to the minus direction of the x-axis successively as shown in FIG. 35A to FIG. 35D. The image data shown in FIG. 14 of the first exemplary embodiment described above are employed as the image data to be used.

As shown in FIG. 36, when the observer moves from the position 113*b* to the position 113*c*, i.e., when the observer enters the reverse view region from the main lobe, the display controller 24 switches the image data upon receiving the measurement result from the observer position measuring unit 45 that has detected the observer position of that time.

The fourth exemplary embodiment employs the processing for switching all the image data for the fourth-viewpoint regions when the observer reaches the state of (C). Thus, it is unnecessary to switch the image data until the observer enters the next reverse view region even when the observer moves further to the minus direction of the x-axis by going through the state of (D).

When the observer moves from the position 113*a* to the position 113*b* or 113*c* to the position 113*d*, the image data are not switched as shown in FIG. 36.

Further, it is also possible to structure each of the pixels arranged on the display panel with a sub-pixel group shown in FIG. 37, and to allow the observer to sense stereopsis by using those.

In FIG. 37A, the pixel 221 shown in FIG. 31 is constituted with: a sub-pixel group 241' where sub-pixels W4, B3, G4, and R3 are disposed; a sub-pixel group 242' where sub-pixels G2, R1, W2, and B1 are disposed; a sub-pixel group 243' where sub-pixels B4, G3, R4, and W3 are disposed; and a sub-pixel group 244' where sub-pixels R2, W1, B2, and G1 are disposed. Similarly, in FIG. 37B, it is constituted with: a sub-pixel group 245' where sub-pixels G2, R1, W2, and B1 are disposed; a sub-pixel group 246' where sub-pixels R2, W1, B2, and G1 are disposed; a sub-pixel group 247' where sub-pixels W4, B3, G4, and R3 are disposed; and a sub-pixel group 248' where sub-pixels B4, G3, R4, and W3 are disposed.

That is, FIG. 37A shows the sub-pixels within the pixel 221 in the first layout state and the corresponding lens element 251, and FIG. 37B shows each structure in the second layout state in which the y-axis direction is set to the horizontal direction by rotating the first layout state clockwise by 90 degrees.

Further, FIG. 38 shows an example of the image information inputted to each sub-pixel employed in the fourth exemplary embodiment.

In FIG. 38, A1 to A9, B1 to B9, C1 to C9, and D1 to D9 (each of the images lined laterally) are images of different horizontal parallax with each other. For example, each of the images lined longitudinally such as A1, B1, C1, and D1 (images with different alphabets but same numerical number) are images of different vertical parallax with each other.

A significant feature of the image data shown in FIG. 38 is a difference in the size of the faces of "1" in the dices of the four viewpoint images (A to D) lined longitudinally. Note, however, that the size of the faces of "5" and size of the faces of "3" in the dices are different, respectively, among each of the viewpoint images to which the numbers 1 to 9 are applied, as in the case of FIG. 14 and the like described above.

The method for generating the images shown in FIG. 38 is basically the same as the method described by referring to FIG. 8. That is, each of the viewpoint cameras according to the number of image data are disposed substantially in parallel to the x-axis and the y-axis, and a 3D object is captured with those to generate images.

Here, the relation between each of the viewpoint images and the sub-pixels in the first layout state will be described by referring to FIG. 37A and FIG. 38.

In a case of employing the input images shown in FIG. 38, for example, signals corresponding to the image B5 are inputted to the sub-pixel group 241' of FIG. 37A, signals corresponding to the image B6 are inputted to the sub-pixel group 242', signals corresponding to the image C5 are inputted to the sub-pixel group 243', and signals corresponding to the image C6 are inputted to the sub-pixel group 244', respectively. That is, signals corresponding to each of the images surrounded by a broken line in FIG. 38 are inputted to each of the sub-pixel groups 241', 242', 243', and 244'.

Thereby, it becomes possible to display images of 4-viewpoints in total of horizontally 2-viewpoints and vertically 2-viewpoints. At that time, there is no difference generated in the number of display colors among each of the viewpoint images within a pixel since all of the sub-pixel groups 241' to 244' are constituted with the four primary colors.

Next, the relation between each of the viewpoint images and the sub-pixels in the second layout state will be described by referring to FIG. 37B and FIG. 38. As in the case of FIG. 37A, signals corresponding to the image B5 are inputted to the sub-pixel group 245', signals corresponding to the image B6 are inputted to the sub-pixel group 246', signals corresponding to the image C5 are inputted to the sub-pixel group 247', and signals corresponding to the image C6 are inputted to the sub-pixel group 248', respectively.

With such structure, the 3D resolution can be made equivalent for the first layout state and the second layout state regardless of the number of viewpoints. That is, the number of viewpoint becomes the same in the first layout state and the second layout stat due to the regularity of the sub-pixel group within a single pixel. Thereby, same stereopsis can be achieved in each of the layout states.

Based on the content described above, the relations regarding the followings are generally expressed bellow provided that: the number of primary colors is M; the viewpoint number in horizontal parallax display is N (N is a natural number of 2 or larger); the horizontal viewpoint number and the vertical viewpoint number in horizontal/vertical parallax display are L; the total viewpoint number of the horizontal/vertical parallax is J (=L×L); and the number of sub-pixels in a sub-pixel group per direction in the horizontal/vertical parallax display is K.

Note here that the viewpoint number N is the number of viewpoints of a case of horizontal parallax display only, which corresponds to the number of sub-pixels per direction within a pixel.

First, $K=\sqrt{M}$ when $\sqrt{M}$ that is a square root of the primary color number M is an integer, and K=M when $\sqrt{M}$ is not an integer. For example, in a case where M=1, 4, 9, $\sqrt{M}$ becomes an integer so that K=1, 2, 3. In a case where M=2, 3, $\sqrt{M}$ does not become an integer so that K=2, 3.

Next, the horizontal viewpoint number and the vertical viewpoint number L per direction is expressed as "L=N/K (where L is a natural number of 2 or larger). For example, in a case of the pixel 221 shown in FIG. 31, "L=4/2=2". As described, in the horizontal/vertical parallax display, employed is a structure with which the horizontal viewpoint number and the vertical viewpoint number L per direction becomes a multiple of the sub-pixel number K in a sub-pixel group per direction in the horizontal/vertical parallax display. This makes it possible to acquire an effect of having no color moiré generated on the displayed image.

Next, FIG. 39 shows a state of light-ray separation in the x-axis direction and the y-axis direction in the first layout state shown in FIG. 37A. In FIG. 39, the x-axis direction is the horizontal direction and the y-axis direction is the vertical direction.

Further, the light-ray separating module 250 for simultaneously separating the light ray both in the first direction and the second direction is employed herein, so that parallax is given both in the horizontal direction and the vertical direction.

FIG. 39 shows a state of a case where the observer moves to the positions 114a, 114b, 114c, - - - in the horizontal direction (x-axis direction) and a state of a case where the observer moves to the positions 115a, 115b, 115c, 115d, - - - in the vertical direction (y-axis direction) regarding the structure where the parallax is given in both the first direction and the second direction.

The first-viewpoint region is constituted with the horizontal direction 50a and the vertical direction 55a as the exit light from the sub-pixel group 241', the second-viewpoint region is constituted with the horizontal direction 50b and the vertical direction 55a as the exit light from the sub-pixel group 242', the third-viewpoint region is constituted with the horizontal direction 50a and the vertical direction 55b as the exit light from the sub-pixel group 243', and the fourth-viewpoint region is constituted with the horizontal direction 50b and the vertical direction 55b as the exit light from the sub-pixel group 244'.

The main lobe in the horizontal direction is one region where the left eye of the observer is located in 50a and the right eye is located in 50b. In the meantime, in the vertical direction, there are two main lobes where both eyes of the observer are located in 55a or 55b. Note here that the region regarding 55a is defined as a main lobe 1, the region regarding 55b is defined as a main lobe 2, the region regarding 56b is defined as a side lobe 1, and the region regarding 54a is defined as a side lobe 2.

FIG. 40 shows a corresponding relation regarding which of image data (see FIG. 38) is to be inputted to each viewpoint region (each sub-pixel group) when the left and right eyes of the observer are located at each of the viewpoint regions with respect to each of the observer positions (see FIG. 39).

In general, when image data of 4-viewpoints are used for the stereoscopic image display panel of 2×2 viewpoints, only a same view is sensed in the main lobe and the side lobes in the horizontal direction and reverse view is generated between the main lobe and the side lobes. In that case, similarly, only a same view is sensed between the main lobe 1 and the side lobe 1 or between the main lobe 2 and the side lobe 2, respectively, while no reverse view is generated in the vertical direction.

Meanwhile, the use of the structure of the fourth exemplary embodiment makes it possible to allow the observer to sense different videos in the stereoscopic regions A1, A2, A3, - - - , B1, B2, B3, - - - , C1, C2, C3, - - - , and D1, D2, D3, - - - even with the 2×2 viewpoints stereoscopic image display as shown in FIG. 40. That is, motion parallax is given both in the horizontal and vertical directions, which can contribute to improving a sense of ambience in the stereoscopic image quality.

Note here that there is no binocular parallax in the vertical direction, it is also possible to employ a structure with which the separating angle (viewpoint pitch) in the vertical direction becomes smaller with respect to the value of the separating angle (viewpoint pitch) in the horizontal direction.

As described above, in a case of using the active light-ray separating module 250, it is possible with the fourth exemplary embodiment to employ the structure with which light ray is separated only in the x-axis direction for the first layout state as in the case of FIG. 34, for example, and light ray is not separated in the y-axis direction and to employ the structure with which parallax is given both in the horizontal direction and the vertical direction and light ray is separated both in the x-axis direction and the y-axis direction simultaneously as in the case of FIG. 39.

As described above, in a case of employing the structure where the separating angle in the vertical direction is set smaller than the separating angle in the horizontal direction, the lens power (refraction power) of a lens 253 (FIG. 39) showing the state of separating the light ray in the vertical direction is designed to become smaller than the lens power of a lens 252 (FIG. 39) showing the state where light ray is separated in the horizontal direction.

FIG. 41 shows an example of a terminal device 300 to which the stereoscopic image display device 1 according to the fourth exemplary embodiment described above is mounted. That is, the terminal device 300 is constituted with the stereoscopic image display device 1 and a casing 310 which houses the device 1 inside thereof. The stereoscopic image display device 1 is provided with liquid crystal lens elements (not shown) capable of separating light ray in the directions along the x-axis direction and the y-axis direction as the light-ray separating module 250 as described above.

Thus, the structure of the terminal device 300 to which the stereoscopic image display device 1 according to the fourth exemplary embodiment will be described by referring to FIG. 42.

With respect to the structure described in the first exemplary embodiment, a detection unit 150 for detecting displacement caused when the terminal device 300 moves is added to the stereoscopic image display device 1 herein. That is, the detection unit 150 is a structure for identifying that the terminal device 300 is located horizontally or vertically for the observer.

The detection unit 150 is constituted by a sensor which detects the displacement caused when the terminal device 300 moves. Note here that the displacement of the terminal device 300 detected by the detection unit 150 is a change in the tilt angle and a moving amount. For example, in a case where a sensor such as an acceleration sensor or a geomagnetic sensor is used as the detection unit 150, the change in the tilt angle and the moving amount can be calculated on the basis of the gravitational acceleration and geomagnetism. That is, the detection unit 150 includes a tilt angle detecting module 151 for detecting the change in the tilt angle and the moving amount so as to detect the positional relation between the stereoscopic image display panel 10 and the observer.

Further, the detection unit 150 sends the information regarding the tilt angles (displacement information) as the detection result done by the tilt angle detecting module 151 to the image generation processing unit 30.

That is, the image generation processing unit 30 is structured to output the image data according to the horizontal direction of the terminal device 300 and the observer position to the display panel driving circuit 21 according to the measurement result acquired from the relative position calculating unit 40 also shown in the first exemplary embodiment described above and the signals (displacement information) from the detection unit 150.

When outputting 3D data, as described by referring to FIG. 32 and FIG. 33, the sub-pixels corresponding to each viewpoint vary for the first layout state and the second layout state. Thus, the image generation processing unit 30 is structured to output the image data corresponding to the change to the display panel driving circuit 21.

Simultaneously with the output to the display panel driving circuit 21, the image generation processing unit 30 is structured to transmit a command signal for making the light-ray separating module 250 (liquid crystal lenses) effective in the x-axis direction and the y-axis direction to the image distribution control circuit 22 according to each of the layout states when the terminal device 300 is in the first layout state shown in FIG. 32 or in the second layout state shown in FIG. 33.

Further, for selecting the case of the N-viewpoint development only in the horizontal direction as shown in the first exemplary embodiment (referred to as horizontal N-viewpoint development hereinafter) and the case of developing L-viewpoints (L=N/K) each in the horizontal direction and the vertical direction (in total of J-viewpoints) as shown in the fourth exemplary embodiment (referred to as horizontal/vertical J-viewpoint development hereinafter), an external IF 34 within the image generation processing unit 30 is structured to function effectively. For example, it is possible to employ a structure with which a selection signal outputted from outside by a command or the like from the observer is received by the external IF 34, and the image generation processing unit 30 generates the image data based on the information contained in the selection signal.

Therefore, the method for generating the image data by the image generation processing unit 30 of the exemplary embodiment is a method acquired by adding a method of changing the positions of the virtual cameras according to the selection signal received from outside to the generating method described in the first exemplary embodiment.

That is, the arithmetic calculator 31 sets the virtual cameras for the N-viewpoints only in the horizontal direction in the case of the horizontal N-viewpoint development and sets the virtual cameras for the L-viewpoints (total of L×L viewpoints: J-viewpoints) in the horizontal direction and the vertical direction in the case of the horizontal/vertical J-viewpoint development. At the same time, the arithmetic calculator 31 is structured to generate the image data by performing rendering processing in each of the cases.

Further, in the case of the horizontal N-viewpoint development, the relation of "(e+f)>d>e" described in the second exemplary embodiment can be used when N=2. The relation of "e×(N−2)≤d≤e×(N−1)" described in the third exemplary embodiment can be used when N≥3.

Like the contents described in each of those embodiments, when the relation is satisfied, it is possible with the structure of the fourth exemplary embodiment to provide the stereoscopic image display device excellent in motion parallax while securing a prescribed stereoscopic visibility.

Further, in the case of the horizontal/vertical J-viewpoint development shown in FIG. 37, the relation of "(e+f)>d>e" described in the second exemplary embodiment can be used when J=2 (2×2 viewpoints for the horizontal parallax direction). The relation of "e×(J−2)≤d≤e×(J−1)" described in the third exemplary embodiment can be used when J≥3. This makes it possible to provide the stereoscopic image display device excellent in motion parallax while securing a prescribed stereoscopic visibility.

For the vertical parallax direction, a smaller viewpoint pitch than that of the horizontal parallax direction can be used. Thereby, it becomes possible to decrease color moiré further and to give smooth motion parallax. Other operations are the same as those of the first exemplary embodiment (Explanations of Operations)

Next, operation contents of the stereoscopic image display device 1 and the terminal device 300 according to the fourth exemplary embodiment can be described briefly by referring to the flowchart shown in FIG. 43.

The detection unit 150 which has detected the displacement of the terminal device 300 outputs the displacement information as the detection result thereof to the image generation processing unit 30 (FIG. 43: S201).

Further, the observer position measuring unit 45 measures the position of the observer 100 by using the camera provided inside thereof, and outputs the measurement result to the relative position calculating unit (FIG. 43: S202).

Then, the relative position calculating unit 40 calculates the relative position of the left eye 101 and the right eye 102 with respect to the reference point (center of image display herein) set in advance on the stereoscopic image display panel 10 based on the measurement result acquired from the observer position calculating unit 45, and outputs the calculation result (positional information) (FIG. 43: S203).

Then, the image generation processing unit 30 generates and outputs 3D data and control signals based on the displacement information from the detection unit 150 and the positional information from the relative position calculating unit 40 (FIG. 43: S204).

Subsequently, the display panel driving circuit 21 drives the display panel based on the 3D data acquired from the image generation processing unit 30, and the image distribution control circuit 22 controls the operation of the light-separating module 12 according to the control signals from the image generation processing unit 30 (FIG. 43: S205).

For convenience, the operations are described in order of the numbers applied in FIG. 43 (S201 to S205). However, the operation content of the stereoscopic image display device 1 according to the fourth exemplary embodiment is not limited only to that order. Further, it is also possible to put the execution content of each of the above-described steps S201 to S205 (FIG. 43) into programs and have a series of each of the control programs achieved by a computer.

Effects and the Like of Fourth Exemplary Embodiment

The stereoscopic image display device according to the fourth exemplary embodiment employs the structure with which same numbers of parallax images are generated in the x-axis direction and the y-axis direction within each pixel and the numbers of different color sub-pixels are equivalent in each viewpoint image. Thus, the 3D resolution can be made the same for the first and second layout states in both of the cases where parallax is given in either the horizontal or the vertical direction by the active light-ray separating module and where parallax is given simultaneously for both of the two directions, i.e., the horizontal direction and the vertical direction.

Further, the fourth exemplary embodiment is designed in such manner that the viewpoint number N becomes a multiple of the primary color number M in each pixel, so that generation of color moiré can be suppressed. In addition, while the state rotated clockwise by 90 degrees from the first layout state to set the y-axis direction as the horizontal direction is described as the second layout state in the fourth exemplary embodiment, the second layout state is not limited only to that. For example, each of the structural members can function effectively even in a state where the y-axis direction is set as the horizontal direction through rotating the first layout state by 90 degrees counterclockwise, for example, so that the same operating effect as those of the second layout state described herein can be acquired as well.

Other structures and operations are the same as those of the first exemplary embodiment described above, and other operating effects to be generated thereby are also the same. In a case where two or more image data are used for each viewpoint region in particular, smoother motion parallax can be presented both for horizontal parallax and vertical parallax.

Fifth Exemplary Embodiment

While the structural example of projecting the parallax images to the observer by optically separating images towards two observing directions is described in the fourth exemplary embodiment, such structural content can also be applied to the structures of the first to third exemplary embodiments.

Therefore, in the fifth exemplary embodiment, a stereoscopic image display device acquired by applying the structural content for optically separating images towards two observing directions to the structure of the first exemplary embodiment will be described by referring to FIG. 44 and FIG. 45.

The overall structure of the stereoscopic image display device according to the fifth exemplary embodiment is the same as the structural content of the stereoscopic image display device 1 shown in FIG. 1 and FIG. 2, so that each of those drawings is referred expediently for the following explanations. Therefore, same reference numerals are used for the structural members and the like same as those of the first exemplary embodiment, and duplicated explanations are to be omitted.

The stereoscopic image display panel 10 provided inside the stereoscopic image display device 1 includes: a display panel 11 in which pixels each containing at least a sub-pixel for displaying a first-viewpoint image and a sub-pixel for displaying a second-viewpoint image are arranged in matrix; and a light-ray separating module 12 which is provided on the display surface side of the display panel 11 for separating parallax images from the pixels towards each of the viewpoints.

As shown in FIG. 2, the light-ray separating module 12 has a structure in which lenses 15 corresponding to each of the pixels arranged on the display panel 11 are arranged in an array form. That is, it is the structure which separates light rays on one of the directions (light-ray separating direction: x-direction of FIG. 44) of the layout directions of each of the pixels.

Here, a direction in parallel to the straight line connecting between the left eye and the right eye of the observer is defined as the horizontal direction, and a case where the light-ray separating direction (x direction) is substantially in parallel to the horizontal direction is assumed. Thus, the light-ray separating direction is also referred to as the horizontal direction. Also, the direction vertical to the horizontal direction (x direction) within a display surface (within a plane on parallel to the display surface) of the display panel 11 is defined as the vertical direction (y direction of FIG. 44). The vertical direction is the other direction out of the layout directions of each of the above-described pixels.

On the stereoscopic image display panel 10, a plurality of combinations of a pixel 263 constituted with a first-viewpoint sub-pixel 261 and a second-viewpoint sub-pixel 262 and the lens 15 constituting the light-ray separating module provided at a position corresponding to the pixel 263 are disposed in matrix, and each of those is structured to be able to separate the light rays.

FIG. 44 is s view extracted from the structure shown in FIG. 2, which shows the vicinity of the pixel containing sub-pixels for 2-viewpoints. Specifically, it shows a combination of the pixel 263 and the lens 15. Further, FIG. 44 shows an example of the state where corresponding images are presented to each of the two directions according to the position of the observer by using the unidirectional light-ray separating module 12.

With the above-described combinations, images are separated in such a manner that the first-viewpoint regions 50a, 51a, (not shown), 52a, - - - to which the exit light from the sub-pixel group 261 spreads and the second-viewpoint regions 50b, 51b, 52b (not shown), - - - to which the exit light from the sub-pixel group 262 are repeated alternately along the x-axis direction.

Further, FIG. 44 also shows an example of the state of a case where the observer moves to the positions 114a, 114b, 114c, - - - in the horizontal direction (x-axis direction) in such image separating space and the state of a case where observer moves to the positions 115a, 115b, 115c, 115d, - - - in the vertical direction (y-axis direction).

In this case, the main lobe in the horizontal direction is one region where the left eye of the observer is located in 50a and the right eye is located in 50b. Meanwhile, since no lens effect exists in the vertical direction, there is no image separating space such as the main lobe or the side lobes.

Next, FIG. 45 shows a corresponding relation regarding which of image data (see FIG. 38) is to be inputted to each viewpoint region (each sub-pixel group) when the left and right eyes of the observer are located at each of the viewpoint regions with respect to each of the observer positions (see FIG. 44).

As described, even with the stereoscopic image display panel which separates the image only in the horizontal direction of the 2-viewpoints (the stereoscopic image display panel which does not separate the image in the vertical direction), it is possible to provide significant images corresponding to the moves of the observer in the horizontal/vertical directions through switching and displaying the camera capturing images as appropriate according to the position of the observer in the vertical direction.

Specifically, as shown in FIG. 45, through applying the image data A1, A2, A3 - - - in the vertical position 115a, applying B1, B2, B3, - - - in the vertical position 115b, applying C1, C2, C3, - - - in the vertical position 115c, and applying D1, D2, D3, - - - in the vertical position 115d, it is possible to allow the observer to sense different videos as appropriate even when the observer moves in the vertical direction. As a result, motion parallax is given both in the horizontal and vertical directions, which makes it possible to contribute to improving a sense of ambience in the stereoscopic image quality.

Incidentally, as shown in FIG. 1, the stereoscopic image display device 1 according to the fifth exemplary embodiment includes: the observer position measuring unit 45 which measures the position of the observer; the relative position calculating unit 40 which calculates the relative position of the observer with respect to the stereoscopic image display panel 10 based on the measurement result; and the image generation processing unit 30 which executes generation of parallax images and the like based on the relative position information calculated thereby.

Note here that the relative position information calculated by the relative position calculating unit 40 contains the positional information of the observer in the horizontal and vertical directions. Thus, the image generation processing unit 30 can generate the image by taking the move of the observer in the vertical direction into consideration based on the relative position information. That is, through outputting the generated image to the display panel 11 by the image generation processing unit 30 via the display panel driving circuit 21, the switching processing of the images can be achieved.

The image switching angle in the horizontal direction (e.g., the switching angle among A1, A2, A3, - - - in FIG. 38) is determined based on the distance between the camera capturing positions in the horizontal direction, and the image switching angle in the vertical direction (e.g., the switching angle among A1, B1, C1, D1 - - - in FIG. 38) is also determined based on the distance between the camera capturing positions in the vertical direction.

Through setting the image switching angle to be sufficiently smaller than the viewpoint pitch, extremely smooth motion parallax can be acquired. In such case, it is particularly desirable to increase the capacitance of the data accumulation unit 32 and the memory 33 within the display controller 24 according to the image switching angle and to speed up the processing capacity of the arithmetic calculator 31.

While motion parallax to be given both in the horizontal and vertical directions are described herein based on the structural content of the first exemplary embodiment, it is also possible to achieve the structure for giving the motion parallax both in the horizontal and vertical directions by a same method with the structural contents of the second exemplary embodiment and the third exemplary embodiment as described above.

Effects and the Like of Fifth Exemplary Embodiment

As described above, the fifth exemplary embodiment employs the structure with which: the light-ray separating module 12 has the structure for separating the light ray in one direction (x direction) out of the layout directions of each of the pixels; and the image generation processing unit 30 generates the image corresponding to the position of the observer regarding the direction (y direction) vertical to the one direction described above within the display surface of the stereoscopic image display panel 10 and outputs it to the stereoscopic image display panel 10. Therefore, the camera captured image according to the position of the observer in the vertical direction can be presented to the observer.

That is, even with the stereoscopic image display panel which separates the image only in the horizontal direction of 2-viewpoints, the use of the fifth exemplary embodiment makes it possible to present the camera capturing images according to the position of the observer in the vertical direction. Therefore, motion parallax can be given both in the horizontal and vertical directions, which makes it possible to improve a sense of ambience in the stereoscopic images.

Further, through using the image data of the sufficiently smaller image switching angle than the viewpoint pitch based on the position measurement information of the observer, it is possible to suppress deterioration of the resolution and to acquire smooth motion parallax even with the multi-viewpoint stereoscopic image display device of small number of viewpoints. Other structures and operations are the same as those of each of the exemplary embodiments described above, and other operating effects to be generated thereby are also the same.

Each of the above-described embodiments shows specific preferable examples of the stereoscopic image display device, the terminal device, the stereoscopic image display method, and the program thereof, and there may be various kinds of technically preferable limits set thereto. However, the technical scope of the present invention is not limited to those modes unless there is a specific remark mentioned for limiting the present invention.

While new technical contents regarding the above-described exemplary embodiments are summarized as follows, the present invention is not necessarily limited to those.

Supplementary Note 1: First Exemplary Embodiment (J=s×N)

A stereoscopic image display device which includes:

a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels;

an observer position measuring unit which measures an observing position of an observer who is facing the display surface;

a relative position calculating unit which calculates a relative position of the observer with respect to the stereoscopic image display panel based on a result of the measurement; and an image generation processing unit which has a function for generating viewpoint images for J-viewpoints (J>N) set in advance, and generates one viewpoint image or more according to each of the viewpoints constituting the N-viewpoints by corresponding to the relative position and outputs the viewpoint image towards the stereoscopic image display panel.

Supplementary Note 2: First Exemplary Embodiment (J=s×N)

The stereoscopic image display device as depicted in Supplementary Note 1, wherein the viewpoint number N and the viewpoint number J satisfy a relation of J=s×N (a coefficient s is a natural number of 2 or larger) (the relation of J=s×N (a coefficient s is a natural number of 2 or larger) exists between the N-viewpoints and the J-viewpoints).

Supplementary Note 3: First Exemplary Embodiment (Side Lobes are Almost Laterally Symmetric; s is an Odd Number of 3 or Larger)

The stereoscopic image display device as depicted in Supplementary Note 2, wherein:

the stereoscopic image display panel has a lobe forming function which forms a stereopsis region containing a display normal line that is a normal line from the display surface by having the center of image display as a start point as a main lobe and forms stereopsis regions neighboring to the main lobe as side lobes;

provided that an optimum viewing distance at which a stereopsis visible range becomes maximum is OD and a viewpoint pitch between each of viewpoint regions at the OD is e, the coefficient s is set in advance as an odd number of 3 or larger in a case where an angle formed between a center line of the main lobe and the display normal line is equal to or less than a tan (e/OD); and the image generation processing unit generates viewpoint images for the J-viewpoints based on the set coefficient s.

Supplementary Note 4: First Exemplary Embodiment (Side Lobes are Almost Laterally Symmetric; s is an Odd Number of 3 or Larger)

The stereoscopic image display device as depicted in Supplementary Note 2, wherein:

the stereoscopic image display panel has a lobe forming function which forms a stereopsis region containing a display normal line that is a normal line from the display surface by having the center of image display as a start point as a main lobe and forms stereopsis regions neighboring to the main lobe as side lobes;

the image generation processing unit has a function which calculates an angle formed between the center line of the main lobe and the display normal line based on the positional information and, provided that an optimum viewing distance at which a stereopsis visible range becomes maximum is OD and a viewpoint pitch between each of viewpoint regions at the OD is e, the coefficient s is set in advance as an odd number of 3 or larger, sets the coefficient s as an odd number of 3 or larger when the calculated angle is equal to or less than "a tan (e/OD)".

Supplementary Note 5: First Exemplary Embodiment (Select Image Data According to Moving Direction; N≥3)

The stereoscopic image display device as depicted in any one of Supplementary Notes 1 to 4, wherein:

when the viewpoint number N is 3 or larger (N≥3), the image generation processing unit selects a viewpoint image for a viewpoint region where neither the left eye nor the right eye of the observer is located based on a moving direction of the observer, and outputs the selected viewpoint image towards the stereoscopic image display panel.

Supplementary Note 6: First Exemplary Embodiment (Select Image Data According to Moving Direction; N≥3)

The stereoscopic image display device as depicted in any one of Supplementary Notes 1 to 4, wherein:

the image generation processing unit includes an image data switching processing function which, when the viewpoint number N is 3 or larger (N≥3), estimates a next moving position of the observer based on the moving direction of the observer shown in the chronological positional information from the relative position calculating unit and outputs the viewpoint images corresponding to the estimated position towards the stereoscopic image display panel.

Supplementary Note 7: First Exemplary Embodiment (Select Image Data According to Moving Direction and Moving Speed; N≥4)

The stereoscopic image display device as depicted in any one of Supplementary Notes 1 to 4, wherein:

when the viewpoint number N is 4 or larger (N≥4), the image generation processing unit selects a viewpoint image for a viewpoint region where neither the left eye nor the right eye of the observer is located based on a moving direction and a moving speed of the observer, and outputs the selected viewpoint image towards the stereoscopic image display panel.

Supplementary Note 8: First Exemplary
Embodiment (Select Image Data According to
Moving Direction and Moving Speed; N≥4)

The stereoscopic image display device as depicted in any one of Supplementary Notes 1 to 4, wherein:
the image generation processing unit includes an image data switching processing function which, when the viewpoint number N is 4 or larger (N≥4), estimates a next moving position of the observer based on the moving direction of the observer shown in the chronological positional information from the relative position calculating unit and outputs the viewpoint images corresponding to the estimated position towards the stereoscopic image display panel.

Supplementary Note 9: First Exemplary
Embodiment (Select Image Data According to
Moving Direction and Moving Speed; N≥4)

The stereoscopic image display device as depicted in any one of Supplementary Note 7 or 8, wherein:
as the viewpoint region where neither the left eye nor the right eye of the observer is located, the image generation processing unit selects first to (N−2)-th neighboring viewpoint regions by having the viewpoint region where the observer is located before moving as a start point.

Supplementary Note 10: Second Exemplary
Embodiment (Viewpoint Pitch in a Case of
2-Viewpoints)

The stereoscopic image display device as depicted in any one of Supplementary Notes 1 to 4, wherein
the stereoscopic image display panel is structured in such a manner that a viewpoint pitch between each of the viewpoint regions at the optimum observing distance at which the stereopsis visible range becomes maximum becomes smaller than a distance between both eyes of the observer, when the viewpoint number N is 2 (N=2).

Supplementary Note 11: Second Exemplary
Embodiment (Crosstalk Region is Taken into
Account)

The stereoscopic image display device as depicted in Supplementary Note 10, wherein
the stereoscopic image display panel is structured to satisfy a relation of "(e+f)>d>e", where the viewpoint pitch is e, the distance between both eyes is d, and a range of the viewpoint region that is equal to or less than a 3D crosstalk value set in advance is f.

Supplementary Note 12: Second Exemplary
Embodiment (Crosstalk Region is Taken into
Account)

The stereoscopic image display device as depicted in any one of Supplementary Notes 1 to 4, wherein
the stereoscopic image display panel is structured to satisfy a relation of "(e+f)>d>e", where the viewpoint pitch between each of the viewpoint regions at the optimum viewing range where the stereoscopic viewing range becomes the maximum is e, the distance between both eyes of the observer is d, and a range of the viewpoint region that is equal to or less than a 3D crosstalk value set in advance is f.

Supplementary Note 13: Third Exemplary
Embodiment (Viewpoint Pitch in Multi-Viewpoints)

The stereoscopic image display device as depicted in any one of claims 1 to 9, wherein
in a case where the viewpoint number N is 3 or larger, a viewpoint pitch between each of the viewpoint regions at the optimum viewing range where the stereopsis visible range becomes maximum is e, and a distance between both eyes of the observer is d, the stereoscopic image display device is structured to satisfy a relation of "e×(N−2)≤d≤e×(N−1)".

Supplementary Note 14: Fourth Exemplary
Embodiment (Vertical/Lateral 3D)

The stereoscopic image display device as depicted in any one of Supplementary Notes 1 to 13, wherein:
each of the pixels includes N×N pieces (N is a natural number of 2 or larger) of sub-pixels colored in M kinds (M is a natural number of 1 or larger) primary colors, and the pixels are arranged in matrix on the display panel;
the light-ray separating module includes optical elements which distribute exit light from each of the pixels according to the parallax image to a first direction and a second direction along layout of the pixels;
the optical elements are arranged in matrix by being corresponded to each of the pixels;
the sub-pixels neighboring to each other within each of the pixels are of different colors from each other;
layout pitches of the sub-pixels are uniform in the first direction and the second direction; and
same numbers of the parallax images are displayed for the first direction and the second direction within each of the pixels, and numbers of sub-pixels of different colors are equivalent within the parallax images.

Supplementary Note 15: Fourth Exemplary
Embodiment (Detection Unit)

The stereoscopic image display device depicted in Supplementary Note 14, which further includes a detection unit which detects displacement of a main body of the device including the display panel, wherein
the image generation processing unit has a function which generates the viewpoint images based on the relative position and displacement information from the detection unit.

Supplementary Note 16: Fourth Exemplary
Embodiment (Display in Horizontal and Vertical
Directions)

The stereoscopic image display device as depicted in Supplementary Note 15, wherein:
the detection unit has a function which judges whether it is in a first layout state where a horizontal direction that is a direction in parallel to a straight line connecting between the left eye and the right eye of the observer and the first direction are in parallel or a second layout state where the horizontal direction and the second direction are in parallel; and
the image generation processing unit,
in a case where $\sqrt{M}$ that is a square root of the M is an integer, takes a quotient (L) acquired by dividing the N with the $\sqrt{M}$ as the viewpoint number in the horizontal direction and in the vertical direction, and generates images having parallax for the viewpoint number according to each of the first and second directions, and in a case where √M that is a square root of the M that is the number of primary colors is not an integer, takes a quotient (L) acquired by dividing the N with the M as the viewpoint number in the horizontal direction and in the vertical direction that is in an orthogonal relation thereof, and generates images having parallax for the viewpoint number according to each of the first and second directions.

Supplementary Note 17: Fourth Exemplary Embodiment (Horizontal-Direction Viewpoint Pitch>Vertical-Direction Viewpoint Pitch)

The stereoscopic image display device as depicted in any one of Supplementary Notes 14 to 16, wherein
when either the first direction or the second direction is in a state along the horizontal direction that is a direction in parallel to the straight line connecting between the left eye and the right eye of the observer and the other is in a state along the vertical direction that is vertical to the horizontal direction,
the stereoscopic image display panel is structured in such a manner that a parallax pitch in the horizontal direction becomes larger than a parallax pitch in the vertical direction.

Supplementary Note 18: Fifth Exemplary Embodiment, Etc.

The stereoscopic image display device as depicted in any one of Supplementary Notes 1 to 13, wherein:
the light-ray separating module has a structure which separates light ray in one (x direction: light-ray separating direction) of the directions out of the layout directions of each of the pixels; and
the image generation processing unit generates an image according to the position of the observer regarding the other direction (Direction vertical to the one direction within the display surface: y direction) out of the layout directions of each of the pixels and outputs the image towards the stereoscopic image display panel.

Supplementary Note 19 First to Fourth Exemplary Embodiments

A terminal device which includes:
the stereoscopic image display device as depicted in any one of Supplementary Notes 1 to 18, and
a casing which houses the stereoscopic image display device inside thereof.

Supplementary Note 20

A stereoscopic image display method used with a stereoscopic image display device which includes: a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; and a display controller which generates the parallax images according to a result of the measurement, wherein:
the observer position measuring unit measures an observing position of the observer;
the display controller calculates a relative position of the observer with respect to the stereoscopic image display panel based on the result of the measurement;
the display controller generates viewpoint images for J-viewpoints (J>N) set in advance;
the display controller specifies a plurality of viewpoint images according to the relative position from the generated viewpoint images; and
the display controller outputs the specified plurality of viewpoint images towards the stereoscopic image display panel.

Supplementary Note 21

A stereoscopic image display method used with a stereoscopic image display device which includes: a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; and a display controller which generates the parallax images according to a result of the measurement, wherein:
the observer position measuring unit measures an observing position of the observer;
the display controller calculates a relative position of the observer with respect to the stereoscopic image display panel based on the result of the measurement;
the display controller specifies a plurality of viewpoints for emitting images based on the relative position from J-viewpoints (J>N) set in advance; and
the display controller generates viewpoint images according to the specified plurality of viewpoints and outputs the images towards the stereoscopic image display panel.

Supplementary Note 22

A stereoscopic image display program used with a stereoscopic image display device which includes: a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; and a display controller which generates the parallax images according to a result of the measurement, and the program causes a computer provided in advance to the display controller to function as:
an observer position measuring module which measures an observing position of the observer;
an observer position calculating module which calculates a relative position of the observer with respect to the stereoscopic image display panel based on the result of the measurement; and
an image generation processing module which generates viewpoint images for J-viewpoints (J>N) set in advance, specifies a plurality of viewpoint images according to the relative position from the generated viewpoint images, and outputs the specified plurality of viewpoint images towards the stereoscopic image display panel.

Supplementary Note 23

A stereoscopic image display program used with a stereoscopic image display device which includes: a stereoscopic image display panel including a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; and a display controller which generates the parallax images according to a result of the measurement, and the program causes a computer provided in advance to the display controller to function as:

an observer position measuring module which measures an observing position of the observer;

an observer position calculating module which calculates a relative position of the observer with respect to the stereoscopic image display panel based on the result of the measurement; and an image generation processing module which specifies a plurality of viewpoints for emitting images based on the relative position from J-viewpoints (J>N) set in advance, generates viewpoint images according to the specified plurality of viewpoints, and outputs the images towards the stereoscopic image display panel.

INDUSTRIAL APPLICABILITY

The stereoscopic image display device according to the present invention can be applied to various kinds of display devices which display images.

What is claimed is:

1. A stereoscopic image display device, comprising:
a stereoscopic image display panel comprising a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels;
an observer position measuring unit which measures an observing position of an observer who is facing the display surface;
a relative position calculating unit which calculates a relative position of the observer with respect to the stereoscopic image display panel based on a result of measuring the observing position; and
an image generation processing unit comprising a function configured to generate viewpoint images for J-viewpoints (J>N) set in advance, and to generate one viewpoint image or more according to each of viewpoints constituting the N-viewpoints by corresponding to the relative position and outputs the viewpoint image towards the stereoscopic image display panel, wherein
in a case in which a number of the plurality of N-viewpoints is 3 or larger, the image generation processing unit estimates a next moving position of the observer based on a moving direction of the observer, and outputs a viewpoint image corresponding to the estimated next moving position towards the stereoscopic image display panel, wherein the number of the plurality of N-viewpoints and a number of the J-viewpoints satisfy a relation of J=s×N (a coefficient s is a natural number of 2 or larger), wherein the stereoscopic image display panel has a lobe forming function which forms a stereopsis region containing a display normal line that is a normal line from the display surface by having the center of image display as a start point as a main lobe and forms stereopsis regions neighboring to the main lobe as side lobes, wherein provided that an optimum observing distance at which a stereopsis visible range becomes maximum is OD and a viewpoint pitch between each of viewpoint regions at the OD is e, the coefficient s is set in advance as an odd number of 3 or larger in a case where an angle formed between a center line of the main lobe and the display normal line is equal to or less than a tan (e/OD), and wherein the image generation processing unit generates viewpoint images for the J-viewpoints based on the set coefficients.

2. The stereoscopic image display device as claimed in claim 1, wherein:
in the case in which the number of the plurality of N-viewpoints is 3 or larger, the image generation processing unit selects a viewpoint image of a viewpoint region where neither a left eye nor a right eye of the observer is located based on the moving direction of the observer, and outputs the selected viewpoint image towards the stereoscopic image display panel.

3. The stereoscopic image display device as claimed in claim 1, wherein:
in a case in which the number of the plurality of N-viewpoints is 4 or larger, the image generation processing unit estimates a next moving position of the observer based on the moving direction and a moving speed of the observer, and outputs the viewpoint image corresponding to the estimated moving position towards the stereoscopic image display panel.

4. The stereoscopic image display device as claimed in claim 3, wherein:
as the viewpoint region where neither the left eye nor the right eye of the observer is located, the image generation processing unit selects first to (N−2)-th neighboring viewpoint regions by having the viewpoint region where the observer is located before moving as a start point.

5. The stereoscopic image display device as claimed in claim 1, wherein:
the light-ray separating module has a structure which separates light rays in one of the directions out of the layout directions of each of the pixels; and
the image generation processing unit generates an image according to a position of the observer regarding other directions out of the layout directions, other than the one of the directions, of each of the pixels and outputs the image towards the stereoscopic image display panel.

6. A terminal device, comprising:
the stereoscopic image display device as claimed in claim 1, and
a casing which houses the stereoscopic image display device inside thereof.

7. A stereoscopic image display method used with a stereoscopic image display device which comprises: a stereoscopic image display panel comprising a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels; an observer position measuring unit which measures an observing position of an observer who is facing the display surface; and a display controller which generates the parallax images according to a result of the measurement, the method comprising:

measuring, by the observer position measuring unit, an observing position of the observer;
  calculating, by the display controller, a relative position of the observer with respect to the stereoscopic image display panel based on the result of measuring the observing position;
  generating, by the display controller, viewpoint images for J-viewpoints (J>N) set in advance;
  specifying, by the display controller, a plurality of viewpoint images according to the relative position from the generated viewpoint images;
  outputting the specified plurality of viewpoint images towards the stereoscopic image display panel; and
  in a case in which a number of the plurality of N-viewpoints is 3 or larger, estimating, by the image generation processing unit, a next moving position of the observer based on a moving direction of the observer, and outputting a viewpoint image corresponding to the estimated next moving position towards the stereoscopic image display panel,
  wherein the number of the plurality of N-viewpoints and a number of the J-viewpoints satisfy a relation of J=s×N (a coefficient s is a natural number of 2 or larger),
  wherein the stereoscopic image display panel has a lobe forming function which forms a stereopsis region containing a display normal line that is a normal line from the display surface by having the center of image display as a start point as a main lobe and forms stereopsis regions neighboring to the main lobe as side lobes,
  wherein provided that an optimum observing distance at which a stereopsis visible range becomes maximum is OD and a viewpoint pitch between each of viewpoint regions at the OD is e, the coefficient s is set in advance as an odd number of 3 or larger in a case where an angle formed between a center line of the main lobe and the display normal line is equal to or less than a tan (e/OD), and
  wherein the image generation processing unit generates viewpoint images for the J-viewpoints based on the set coefficients.

8. A stereoscopic image display device, comprising:
  a stereoscopic image display panel comprising a display panel in which a plurality of pixels are arranged and a light-ray separating module provided on a display surface side of the display panel for separating parallax images from each of the pixels towards a plurality of N-viewpoints (N is a natural number of 2 or larger) according to layout direction of each of the pixels;
  an observer position measuring unit which measures an observing position of an observer who is facing the display surface;
  a relative position calculating unit which calculates a relative position of the observer with respect to the stereoscopic image display panel based on a result of the measurement; and
  an image generation processing unit comprising a function configured to generate viewpoint images for J-viewpoints (J>N) set in advance, and to generate one viewpoint image or more according to each of viewpoints constituting the N-viewpoints by corresponding to the relative position and outputs the viewpoint image towards the stereoscopic image display panel, wherein
  the stereoscopic image display panel has a lobe forming function which forms a stereopsis region containing a display normal line that is a normal line from the display surface by having the center of image display as a start point as a main lobe and forms stereopsis regions neighboring to the main lobe as side lobes,
  a number of the plurality of N-viewpoints and a number of the J-viewpoints satisfy a relation of J=s×N (a coefficient s is a natural number of 2 or larger),
  provided that an optimum observing distance at which a stereopsis visible range becomes maximum is OD and a viewpoint pitch between each of viewpoint regions at the OD is e, the coefficient s is set in advance as an odd number of 3 or larger in a case where an angle formed between a center line of the main lobe and the display normal line is equal to or less than a tan (e/OD), and
  the image generation processing unit generates viewpoint images for the J-viewpoints based on the set coefficient s.

* * * * *